(12) United States Patent
Temkin et al.

(10) Patent No.: US 11,682,390 B2
(45) Date of Patent: Jun. 20, 2023

(54) INTERACTIVE INTERFACE FOR ANALYTICS

(71) Applicant: MicroStrategy Incorporated, Vienna, VA (US)

(72) Inventors: Charlie Temkin, Vienna, VA (US);
Christophe Touret, Vienna, VA (US);
Ellen Wang, Great Falls, VA (US);
Feng Ding, Vienna, VA (US); Jose Nocedal, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 298 days.

(21) Appl. No.: 16/783,998

(22) Filed: Feb. 6, 2020

(65) Prior Publication Data

US 2020/0251111 A1 Aug. 6, 2020

Related U.S. Application Data

(60) Provisional application No. 62/810,498, filed on Feb. 26, 2019, provisional application No. 62/802,047, filed on Feb. 6, 2019.

(51) Int. Cl.
| | |
|---|---|
| *G10L 15/22* | (2006.01) |
| *G06F 16/332* | (2019.01) |
| *G06F 3/16* | (2006.01) |
| *G06F 16/242* | (2019.01) |
| *G10L 15/197* | (2013.01) |

(52) U.S. Cl.
CPC .............. *G10L 15/22* (2013.01); *G06F 3/167* (2013.01); *G06F 16/2423* (2019.01); *G06F 16/3329* (2019.01); *G10L 15/197* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 6,006,242 | A | 12/1999 | Poole et al. |
| 6,209,005 | B1 | 3/2001 | Harker et al. |

(Continued)

FOREIGN PATENT DOCUMENTS

| | | |
|---|---|---|
| GB | 2354851 | 4/2001 |

OTHER PUBLICATIONS

U.S. Office Action in U.S. Appl. No. 16/723,413, dated Dec. 29, 2021 23 pages.

(Continued)

*Primary Examiner* — Jonathan C Kim
(74) *Attorney, Agent, or Firm* — Fish & Richardson P.C.

(57) ABSTRACT

Method, systems, and apparatus, including computer-readable media, for an interactive interface for analytics. In some implementations, the data is accessed identifying an information card configured to present data objects of a data set. User input data is received indicating user input to enable voice response interaction for the information card or the data set. A voice response application is generated based on the information card, the voice response application being configured to provide responses to voice queries using values for data objects. The voice response application is deployed to enable one or more users to use the voice response application to initiate voice interactions involving the data objects.

19 Claims, 45 Drawing Sheets

(56) References Cited

U.S. PATENT DOCUMENTS

| | | | |
|---|---|---|---|
| 6,584,479 B2 | 6/2003 | Chang et al. | |
| 7,630,965 B1 | 12/2009 | Erickson et al. | |
| 7,673,282 B2 * | 3/2010 | Amaru | G06F 16/25 |
| | | | 717/104 |
| 7,747,648 B1 * | 6/2010 | Kraft | G06F 16/288 |
| | | | 709/219 |
| 7,827,527 B1 | 11/2010 | Chiluvuri | |
| 8,413,045 B2 | 4/2013 | Lemonik et al. | |
| 8,539,336 B2 | 9/2013 | Griffiths et al. | |
| 8,782,552 B2 | 7/2014 | Batman et al. | |
| 9,165,406 B1 | 10/2015 | Gray et al. | |
| 9,412,208 B2 | 8/2016 | Greenberg et al. | |
| 9,582,154 B2 | 2/2017 | Greenberg et al. | |
| 9,582,913 B1 | 2/2017 | Kraft et al. | |
| 9,710,123 B1 | 7/2017 | Gray | |
| 10,051,107 B1 | 8/2018 | Prasad et al. | |
| 10,122,763 B2 | 11/2018 | Lawson et al. | |
| 10,165,015 B2 | 12/2018 | Lawson et al. | |
| 10,230,772 B2 | 3/2019 | Lawson et al. | |
| 10,318,995 B2 | 6/2019 | King et al. | |
| 10,503,821 B2 * | 12/2019 | Brunswig | G06F 40/295 |
| 10,554,590 B2 * | 2/2020 | Cabrera-Cordon | G06N 5/022 |
| 10,560,495 B2 | 2/2020 | Lawson et al. | |
| 10,848,482 B1 | 11/2020 | Eisen et al. | |
| 10,915,455 B2 | 2/2021 | Jayaraman et al. | |
| 11,003,323 B1 * | 5/2021 | Fan | G06F 40/166 |
| 11,120,057 B1 * | 9/2021 | McNabney | G06F 16/38 |
| 11,138,518 B1 * | 10/2021 | Yu | G06F 9/44526 |
| 11,176,139 B2 * | 11/2021 | Li | G06F 16/2379 |
| 11,194,717 B2 | 12/2021 | Soini et al. | |
| 11,238,210 B2 * | 2/2022 | Ziraknejad | G06F 21/6218 |
| 11,288,637 B2 | 3/2022 | Pena et al. | |
| 2002/0160805 A1 | 10/2002 | Laitinen et al. | |
| 2004/0168171 A1 | 8/2004 | Comparato et al. | |
| 2004/0172616 A1 | 9/2004 | Rothschiller et al. | |
| 2004/0230447 A1 | 11/2004 | Schwerin-Wenzel et al. | |
| 2004/0249659 A1 | 12/2004 | Schwerin-Wenzel et al. | |
| 2006/0047646 A1 * | 3/2006 | Maluf | G06F 16/8358 |
| 2006/0065707 A1 | 3/2006 | Kanatani et al. | |
| 2006/0293904 A1 * | 12/2006 | Ramanathan | G06Q 10/00 |
| | | | 709/206 |
| 2007/0040813 A1 | 2/2007 | Kushler et al. | |
| 2007/0057037 A1 | 3/2007 | Woronec | |
| 2007/0157076 A1 | 7/2007 | Lin et al. | |
| 2007/0174350 A1 | 7/2007 | Pell et al. | |
| 2007/0174761 A1 | 7/2007 | Lin et al. | |
| 2007/0180377 A1 | 8/2007 | Gittelman et al. | |
| 2007/0271376 A1 | 11/2007 | Yach | |
| 2007/0280179 A1 | 12/2007 | Van Belle et al. | |
| 2008/0005659 A1 | 1/2008 | Fujimaki | |
| 2008/0086455 A1 | 4/2008 | Meisels et al. | |
| 2008/0086700 A1 | 4/2008 | Rodriguez et al. | |
| 2008/0104052 A1 | 5/2008 | Ryan et al. | |
| 2008/0104501 A1 | 5/2008 | Sattler et al. | |
| 2008/0209329 A1 | 8/2008 | DeFranco et al. | |
| 2008/0243834 A1 | 10/2008 | Rieman et al. | |
| 2008/0258881 A1 | 10/2008 | Manson et al. | |
| 2008/0294624 A1 | 11/2008 | Kanigsberg et al. | |
| 2009/0158200 A1 | 6/2009 | Palahnuk et al. | |
| 2009/0164564 A1 | 6/2009 | Willis | |
| 2009/0221268 A1 | 9/2009 | Yach | |
| 2010/0017478 A1 | 1/2010 | Mejia et al. | |
| 2010/0095240 A1 | 4/2010 | Shiplacoff et al. | |
| 2010/0138271 A1 | 6/2010 | Henkin et al. | |
| 2010/0174998 A1 * | 7/2010 | Lazarus | G06Q 10/109 |
| | | | 715/751 |
| 2010/0176194 A1 | 7/2010 | Hodgkinson et al. | |
| 2010/0228624 A1 | 9/2010 | Morris et al. | |
| 2010/0278453 A1 | 11/2010 | King | |
| 2011/0055250 A1 | 3/2011 | Nandy et al. | |
| 2011/0119165 A1 | 5/2011 | Zee | |
| 2011/0196851 A1 | 8/2011 | Vadlamani et al. | |
| 2011/0246880 A1 | 10/2011 | Horton et al. | |
| 2012/0054211 A1 | 3/2012 | Arsenault et al. | |
| 2012/0131451 A1 | 5/2012 | Abe | |
| 2012/0144286 A1 | 6/2012 | Bank et al. | |
| 2012/0203753 A1 | 8/2012 | Biran et al. | |
| 2012/0212337 A1 | 8/2012 | Montyne et al. | |
| 2012/0233256 A1 | 9/2012 | Shaham et al. | |
| 2012/0254369 A1 | 10/2012 | Gillard et al. | |
| 2012/0265779 A1 | 10/2012 | Hsu et al. | |
| 2012/0278164 A1 | 11/2012 | Spivack | |
| 2012/0278305 A1 | 11/2012 | Wei et al. | |
| 2013/0031453 A1 | 1/2013 | Griffiths et al. | |
| 2013/0031454 A1 | 1/2013 | Griffiths et al. | |
| 2013/0031457 A1 | 1/2013 | Griffiths et al. | |
| 2013/0046544 A1 | 2/2013 | Kay et al. | |
| 2013/0054617 A1 * | 2/2013 | Colman | G06Q 50/01 |
| | | | 707/748 |
| 2013/0117653 A1 | 5/2013 | Sukhanov et al. | |
| 2013/0159848 A1 | 6/2013 | Banke et al. | |
| 2013/0179209 A1 | 7/2013 | Milosevich | |
| 2013/0275120 A1 | 10/2013 | DeGross | |
| 2013/0283194 A1 | 10/2013 | Kopp et al. | |
| 2013/0325839 A1 | 12/2013 | Goddard et al. | |
| 2013/0332962 A1 | 12/2013 | Moritz et al. | |
| 2013/0344468 A1 | 12/2013 | Lindsay et al. | |
| 2014/0046976 A1 | 2/2014 | Zhang et al. | |
| 2014/0115070 A1 | 4/2014 | Virtanen et al. | |
| 2014/0115456 A1 * | 4/2014 | White | G10L 15/22 |
| | | | 715/708 |
| 2014/0122289 A1 * | 5/2014 | Beck | G06Q 30/0621 |
| | | | 705/26.5 |
| 2014/0143202 A1 | 5/2014 | Rekula et al. | |
| 2014/0149896 A1 | 5/2014 | Los et al. | |
| 2014/0172418 A1 | 6/2014 | Puppin | |
| 2014/0173501 A1 | 6/2014 | Wu | |
| 2014/0177819 A1 | 6/2014 | Vymenets et al. | |
| 2014/0218385 A1 | 8/2014 | Carmi | |
| 2014/0229462 A1 * | 8/2014 | Lo | G06F 16/9038 |
| | | | 707/707 |
| 2014/0236978 A1 | 8/2014 | King et al. | |
| 2014/0278349 A1 | 9/2014 | Grieves et al. | |
| 2014/0304103 A1 | 10/2014 | Barton et al. | |
| 2014/0334721 A1 | 11/2014 | Cervin et al. | |
| 2014/0365395 A1 | 12/2014 | Arguelles et al. | |
| 2014/0365944 A1 | 12/2014 | Moore et al. | |
| 2015/0006564 A1 | 1/2015 | Tomkins et al. | |
| 2015/0012279 A1 * | 1/2015 | Kim | G10L 15/22 |
| | | | 704/275 |
| 2015/0019221 A1 | 1/2015 | Lee et al. | |
| 2015/0074138 A1 | 3/2015 | Nam et al. | |
| 2015/0082219 A1 * | 3/2015 | Beck | G06Q 10/0639 |
| | | | 715/771 |
| 2015/0160806 A1 | 6/2015 | Fey et al. | |
| 2015/0180875 A1 | 6/2015 | Kay | |
| 2015/0189347 A1 | 7/2015 | Oztaskent et al. | |
| 2015/0213074 A1 | 7/2015 | Varakin et al. | |
| 2015/0356085 A1 | 12/2015 | Panda et al. | |
| 2016/0044132 A1 | 2/2016 | Croft | |
| 2016/0048698 A1 * | 2/2016 | Sahu | G06F 16/90335 |
| | | | 707/783 |
| 2016/0070686 A1 | 3/2016 | Yu et al. | |
| 2016/0103883 A1 | 4/2016 | Ramani et al. | |
| 2016/0117593 A1 * | 4/2016 | London | G06N 5/04 |
| | | | 706/11 |
| 2016/0117782 A1 * | 4/2016 | Stibel | G06Q 50/01 |
| | | | 705/319 |
| 2016/0124924 A1 | 5/2016 | Greenberg et al. | |
| 2016/0124928 A1 | 5/2016 | Fink et al. | |
| 2016/0170981 A1 | 6/2016 | Morimoto et al. | |
| 2016/0261658 A1 | 9/2016 | Taylor et al. | |
| 2016/0294755 A1 | 10/2016 | Prabhu | |
| 2016/0352891 A1 | 12/2016 | Niu et al. | |
| 2016/0379117 A1 | 12/2016 | Faaborg | |
| 2017/0097926 A1 * | 4/2017 | Ben-Tzur | H04L 67/1097 |
| 2017/0109334 A1 | 4/2017 | Anglin et al. | |
| 2017/0178144 A1 | 6/2017 | Follet et al. | |
| 2017/0188213 A1 | 6/2017 | Nirantar et al. | |
| 2017/0243132 A1 | 8/2017 | Sainani et al. | |
| 2017/0308291 A1 | 10/2017 | Luipold | |
| 2017/0315711 A1 | 11/2017 | Adams | |
| 2017/0329466 A1 * | 11/2017 | Krenkler | G06F 9/453 |

(56) References Cited

U.S. PATENT DOCUMENTS

| | | | |
|---|---|---|---|
| 2017/0330195 | A1* | 11/2017 | Lange .................. G06F 3/04817 |
| 2017/0366579 | A1 | 12/2017 | Aguiar et al. |
| 2018/0020076 | A1 | 1/2018 | Porwal |
| 2018/0060302 | A1 | 3/2018 | Liang et al. |
| 2018/0092547 | A1 | 4/2018 | Tzvieli et al. |
| 2018/0113865 | A1 | 4/2018 | Najork et al. |
| 2018/0129941 | A1* | 5/2018 | Gustafson .............. G06N 20/00 |
| 2018/0190274 | A1* | 7/2018 | Kirazci ............... G10L 15/1822 |
| 2018/0218042 | A1* | 8/2018 | Krishnan ............ G06F 16/2455 |
| 2018/0225341 | A1 | 8/2018 | Merg et al. |
| 2018/0329878 | A1* | 11/2018 | Hirzel ...................... G06F 40/35 |
| 2018/0337967 | A1* | 11/2018 | Ritchie .................. H04L 67/55 |
| 2018/0350144 | A1 | 12/2018 | Rathod |
| 2019/0035403 | A1* | 1/2019 | Ramasamy ............. G10L 15/30 |
| 2019/0042601 | A1* | 2/2019 | Ashe ........................ H04L 67/02 |
| 2019/0042988 | A1* | 2/2019 | Brown ................... G06N 5/022 |
| 2019/0057165 | A1 | 2/2019 | Rosen et al. |
| 2019/0073350 | A1* | 3/2019 | Shiotani ................ G06F 40/106 |
| 2019/0080416 | A1 | 3/2019 | Smith et al. |
| 2019/0130468 | A1* | 5/2019 | Lerman ............. G06F 16/90332 |
| 2019/0164063 | A1* | 5/2019 | Moura ...................... G06N 5/02 |
| 2019/0197916 | A1 | 6/2019 | Park |
| 2019/0236205 | A1* | 8/2019 | Jia ........................ G06F 16/3329 |
| 2020/0005117 | A1* | 1/2020 | Yuan .................. G06Q 30/0201 |
| 2020/0029113 | A1 | 1/2020 | Dacus et al. |
| 2020/0065122 | A1 | 2/2020 | Ziraknejad et al. |
| 2020/0065307 | A1 | 2/2020 | Roy et al. |
| 2020/0065342 | A1* | 2/2020 | Panuganty ............ G06F 16/632 |
| 2020/0126540 | A1* | 4/2020 | Panchamgam ......... G10L 15/26 |
| 2020/0143102 | A1* | 5/2020 | Ziraknejad .......... G06F 16/9038 |
| 2020/0160612 | A1 | 5/2020 | Bowen |
| 2020/0192965 | A1 | 6/2020 | Imtiaz et al. |
| 2020/0251111 | A1* | 8/2020 | Temkin ................... G10L 15/22 |
| 2020/0327564 | A1 | 10/2020 | Simard et al. |
| 2020/0387550 | A1* | 12/2020 | Cappetta ................. H04L 51/02 |
| 2020/0389317 | A1 | 12/2020 | Dunjic et al. |
| 2020/0395001 | A1* | 12/2020 | Mohanty ............. G06F 16/3344 |
| 2020/0395016 | A1* | 12/2020 | Kapila ............... G06Q 30/0621 |
| 2020/0401580 | A1 | 12/2020 | Fitzpatrick et al. |
| 2020/0401593 | A1* | 12/2020 | Panuganty ............ G06F 9/4881 |
| 2021/0081902 | A1 | 3/2021 | Pena et al. |
| 2021/0084032 | A1* | 3/2021 | Ding ........................ G06F 9/54 |
| 2021/0133269 | A1 | 5/2021 | Shah et al. |
| 2021/0141794 | A1 | 5/2021 | Picorel et al. |
| 2021/0142763 | A1 | 5/2021 | Notani et al. |
| 2021/0149906 | A1 | 5/2021 | Li et al. |
| 2021/0201916 | A1* | 7/2021 | Touret ..................... G10L 15/26 |
| 2021/0224345 | A1 | 7/2021 | Shah et al. |
| 2021/0240759 | A1 | 8/2021 | Hwang et al. |
| 2021/0240773 | A1 | 8/2021 | Chen et al. |
| 2021/0248135 | A1 | 8/2021 | Rigney et al. |
| 2021/0263916 | A1 | 8/2021 | Niu et al. |
| 2021/0271727 | A1 | 9/2021 | Fan et al. |
| 2021/0278938 | A1 | 9/2021 | Fan et al. |
| 2021/0342338 | A1 | 11/2021 | Nocedal et al. |
| 2021/0357378 | A1* | 11/2021 | Urdiales ........... G06F 16/24556 |
| 2022/0222418 | A1 | 7/2022 | Ziraknejad et al. |

OTHER PUBLICATIONS

U.S. Office Action in U.S. Appl. No. 16/730,417, dated Aug. 4, 2020, 22 pages.

U.S. Office Action in U.S. Appl. No. 16/247,892, dated Jan. 13, 2020, 20 pages.

U.S. Office Action in U.S. Appl. No. 16/247,892, dated Jun. 4, 2020, 26 pages.

U.S. Office Action in U.S. Appl. No. 16/247,892, dated Mar. 10, 2021, 29 pages.

U.S. Office Action in U.S. Appl. No. 16/248,659, dated Dec. 17, 2020, 5 pages.

U.S. Office Action in U.S. Appl. No. 16/248,659, dated Feb. 17, 2021, 14 pages.

U.S. Office Action in U.S. Appl. No. 16/730,417, dated Feb. 11, 2021, 19 pages.

"Screenshots Showing Example of Grammarly Web Browser Extension", Aug. 19, 2019, 2 pages.

community.microstrategy.com [online] "Amazon's Alexa: Key Analytics Applications That Deliver Voice-activated Reporting," May 2017, retrieved on May 21, 2020, retrieved from URL <https://community.microstrategy.com/s/article/Amazon-s-Alexa-Key-Analytics-Applications-That-Deliver-Voice-activated-Reporting?language=en_US>, 4 pages.

community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.

community.microstrategy.com [online], "HyperVoice and Hyper Vision." Feb. 2019, retrieved on May 21, 2020, retrieved from URL <https://community.microstrategy.com/s/question/0D544000073QxyCCAS/hypervoice-and-hypervision?language=en_US>.

community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.

Constellationr.com [online], "MicroStrategy Embeds Analytics Into Any Web Interface" Feb. 12, 2019, retrieved on Jan. 15, 2020, retrieved from URL <https://www.constellationr.com/blog-news/microstrategy-embeds-analytics-any-web-interface>, 8 pages.

Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.

Developer.mozilla.org [online], "High-level view," Jan. 29, 2018, retrieved on Jan. 15, 2020, retrieved from URL <https://developer.mozilla.org/enUS/docs/Web/Web_Components/Using_shadow_DOM>, 6 pages.

doughenschen.com [online], "MicroStrategy Embeds Analytics Into Any Web Interface" Feb. 2019, retrieved on May 21, 2020, retrieved from UR: <https://doughenschen.com/2019/02/10/microstrategy-embeds-analytics-into-any-web-interface/>, 6 pages.

eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui.

Forbes.com [online], "These Ex-Israeli Surveillance Agents Hijack Your Browser To Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d792e2>, 11 pages.

Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.

Github.com [online], "Textus," Oct. 27, 2012, retrieved on Jan. 15, 2020, retrieved from URL <https://github.com/okfn/textus>.

Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.

idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.

Lippens, "Amazon's Alexa: Key Analytics Applications That Deliver VoiceActivated Reporting," May 2017, MicroStrategy, 23 pages.

Lippens, "Your Voice is Your Passport: Implementing Voice-driven Applications with Amazon Alexa," 2017, Microstrategy, 33 pages.

Lippens., "Flow to Implement Voice-controlled Data Analytics With Amazon's Alexa," May 2017, Microstrategy, 4 pages.

Medium.com [online], "Steps To Understanding the Shadow DOM," Feb. 22, 2019, retrieved on Jan. 15, 2020, retrieved from URL <https://medium.com/quick-code/understanding-the-shadow-dom-20e691cc611b>, 22 pages.

(56) References Cited

OTHER PUBLICATIONS microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.
microstrategy.com [online], "Microstrategy 2019, The Platform For The Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.
microstrategy.com [online], "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.
microstrategy.com, [online], "Whats New In Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.
Nicolasleroy.fr [online], "TheFind launches price comparison service", Nov. 19, 2009, retrieved on May 14, 2012, retrieved from URL <http://www.nicolasleroy.fr/wp/2009/11/thefind-launches-price-comparison-service/ >, 6 pages.
prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>.
Robdodson.me [online], "Shadow DOM: JavaScript," Sep. 2, 2013, retrieved Jan. 15, 2020, retrieved from URL <https://robdodson.me/shadow-dom-javascript/>, 11 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategv-extends-hyperintelligence-with-new-platform-update/>, 4 pages.
Vibrantmedia.com [online], "FAQs: Vibrant In-Text Advertising," retrieved on Mar. 31, 2011, retrieved from URL <http://www.vibrantmeda.com/in-text advertising/faq.asp.>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017, retrieved on Jan. 15, 2020, retrieved from URL <https://en.wikipedia.org/w/index.php?title=Web_Components&oldid=815726999>>, 5 pages.
zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>. 6 pages.
U.S. Office Action in U.S. Appl. No. 16/730,417, dated Sep. 23, 2021, 9 pages.
U.S. Office Action in U.S. Appl. No. 16/247,892 dated Jul. 15, 2021, 25 pages.
U.S. Office Action in U.S. Appl. No. 16/248,659, dated Jul. 16, 2021, 17 pages.
U.S. Notice of Allowance in U.S. Appl. No. 16/788,530, dated Feb. 22, 2021, 12 pages.
U.S. Office Action in U.S. Appl. No. 16/788,530, dated Jun. 25, 2020, 21 pages.
Notice of Allowance in U.S. Appl. No. 16/247,892, dated Mar. 3, 2022, 6 pages.
Notice of Allowance in U.S. Appl. No. 16/688,065, dated Sep. 30, 2021, 9 pages.
Notice of Allowance in U.S. Appl. No. 17/021,116, dated Jan. 20, 2022, 8 pages.
Notice of Allowance in U.S. Appl. No. 17/316,201, dated Jun. 2, 2022, 8 pages.
Office Action in U.S. Appl. No. 16/248,659, dated Feb. 14, 2022, 19 pages.
Office Action in U.S. Appl. No. 16/804,575, dated Feb. 15, 2022, 12 pages.
Office Action in U.S. Appl. No. 16/804,644, dated Apr. 22, 2021, 37 pages.
Office Action in U.S. Appl. No. 16/804,644, dated Mar. 17, 2022, 47 pages.
Office Action in U.S. Appl. No. 16/804,644, dated Oct. 28, 2021, 45 pages.
Office Action in U.S. Appl. No. 17/021,116, dated Sep. 8, 2021, 24 pages.
Office Action in U.S. Appl. No. 17/065,837, dated Feb. 11, 2022, 12 pages.
Office Action in U.S. Appl. No. 17/084,574, dated Jan. 13, 2022, 30 pages.
Office Action in U.S. Appl. No. 17/155,365, dated Mar. 28, 2022, 14 pages.
Office Action in U.S. Appl. No. 17/172,767, dated Jan. 6, 2022, 9 pages.
Office Action in U.S. Appl. No. 17/179,479, dated Apr. 8, 2022, 9 pages.
Office Action in U.S. Appl. No. 17/180,171, dated Apr. 27, 2022, 32 pages.
Office Action in U.S. Appl. No. 17/316,201, dated Feb. 15, 2022, 25 pages.
Notice of Allowance in U.S. Appl. No. 16/247,892, dated Jul. 7, 2022, 6 pages.
Notice of Allowance in U.S. Appl. No. 17/172,767, dated Jul. 5, 2022, 9 pages.
Office Action in U.S. Appl. No. 16/248,659, dated Jul. 18, 2022, 17 pages.
Office Action in U.S. Appl. No. 16/723,413, dated Jun. 21, 2022, 27 pages.
Office Action in U.S. Appl. No. 16/804,575, dated Jun. 24, 2022, 14 pages.
Notice of Allowance in U.S. Appl. No. 17/065,837, dated Jul. 28, 2022, 10 pages.
Office Action in U.S. Appl. No. 17/084,574, dated Aug. 19, 2022, 38 pages.
Office Action in U.S. Appl. No. 17/180,171, dated Jul. 29, 2022, 40 pages.

* cited by examiner

Ann Smith
Director, Sales Operations ● asmith@hyperintelligence
🔗 Company Dossier 🔗 http://www.microstrategy.com abc   Company Website

2812    Apply

| Ja... Dir... | | ...er |
|---|---|---|
| 300 Phone number | Current City | Department |
| Lexington Home Town | Boston Office Location | Skateboarding Fun Fact |
| North America Region | People Management Skills | Massachusetts Institute of... University |
| 3 Tenure | 0.89 Score | 0 Patents |

Self-starter who work with the team to bring the best product to the right customer

FIG. 28B

INTERACTIVE INTERFACE FOR ANALYTICS

This application claims the benefit of U.S. Provisional Patent Application No. 62/802,047, filed on Feb. 6, 2019 and U.S. Provisional Patent Application No. 62/810,498, filed on Feb. 26, 2019. The entire contents of both of the previous applications are incorporated by reference herein.

BACKGROUND

The present specification relates to an automated response system for providing analytics information.

Enterprise databases and other enterprise software are often complex and difficult for users to learn how to use. Typical enterprise software and data analysis platforms are accessed through visual user interfaces with buttons and menus.

SUMMARY

In some implementations, a system provides an interactive interface for a user a user to receive analytics information. For example, the system can provide a voice interface that allows a user to speak natural language queries and receive audible, synthesized speech responses. The system can also be accessed using text queries to obtain text responses. This can allow the system to be accessed through messaging applications, chat interfaces, and from within interactive documents. The system can obtain and use different aspects of context to personalize responses drawn from enterprise databases. For example, the system can determine the identity of the user, a history of actions of the user on an application, a document currently being viewed or edited, content being displayed on a screen, and other contextual factors. With this information, the system can predict the topics, entities, and actions that the user is likely to be interested in, and the system can tailor a response to a voice query, text query, chat message, or other input based on the predictions.

In some implementations, the system has access to templates or specifications for information cards that are provided to summarize key attributes and metrics of entities (e.g., people, locations, companies, etc.). These information cards may be typically displayed on a screen when contextual factors refer to the corresponding entities. The system can access the information card information to generate voice responses that are customized for a particular organization. For example, the organization may define a custom set of information cards, which may each include a set of information that has been customized for the organization. For example, different companies may have different relationships with an entity, e.g., the entity may be a customer of one company but a supplier or competitor of another, and so the different companies may define different sets of information as most important for the entity. In some implementations, an information card definition can apply to a particular entity type and can specify roughly 4-10 data items that are most important for entities of that entity type.

Generating responses from the customized information cards can greatly increase the likelihood that information is relevant to the needs of users of an organization. This is important because an automated response system should consistently provide responses with high accuracy and high relevance or else users will quickly stop using the system. The organization's database may have dozens, hundreds, or thousands of pieces of information available for an entity, and queries from users often do not specify exactly what is desired with precision. Nevertheless, the interactive response system can leveraging the information card to quickly and accurately narrow down to what has been defined as most important about an entity, given the unique needs and preferences of the organization. The organization can also identify what is most important among the information in a particular card with usage information, e.g., records of what attributes or metrics are most often interacted with, charted, queried about, and so on by users in the organization.

In some implementations, the interactive response system provides functionality to automatically generate interactive agent software modules that integrate with other voice-response-enabled devices and platforms. For example, an application can provide a "zero-click" function for generating a response agent, e.g., an application, an artificial conversational entity, or chatbot, which can be integrated as a skill or module of a natural language interface to provide access to information in an enterprise database. The system can begin with an initial baseline agent module. The system is then customized to recognize and respond to phrases and keywords that users are expected to say. The set of phrases and keywords can be customized to take into account user interaction histories for users in a particular organization, e.g., indicating queries submitted, data and documents accessed, etc. The set of phrases and keywords can also be customized using the information in customized information cards, as discussed above, which indicate the types of data that are most relevant to different types of entities for the particular organization. After being created, the response agent can be published to a natural language processing platform and used to interpret queries and feed information back to the enterprise analytics back-end server, as well as to convert response data from the analytics server into a natural language format that can be provided to a user.

In one general aspect, a method performed by one or more computers includes: accessing, by the one or more computers, data identifying an information card configured to present data objects of a data set; receiving, by the one or more computers, user input data indicating user input to enable voice response interaction for the information card or the data set; generating, by the one or more computers, a voice response application based on the information card, the voice response application being configured to provide responses to voice queries using values for the data objects; and deploying, by the one or more computers, the voice response application to enable one or more users to use the voice response application to initiate voice interactions involving the data objects.

In some implementations, the information card is an information card template for generating an information card for any of multiple entities of a particular entity type, and the information card template specifies a set of data object types that are relevant to the particular entity type.

In some implementations, the information card is a customized information card for an organization. The method includes accessing information card specification data customized by the organization, and the information card specification data identifies a predetermined set of data objects relevant to an entity type and indicates a layout of regions of the information card configured to present the data objects.

In some implementations, the method includes providing a user interface comprising controls to design and/or edit the information card; receiving, through the user interface, data indicating user input selecting data objects to present in the information card; and generating and/or updating specification data for the information card to include the selected data objects in the information card. The voice response application is generated based on the updated specification data for the information card to provide information for the selected data objects.

In some implementations, the method includes providing user interface data for a user interface having one or more controls to receive an invocation name for the voice response application; and configuring the voice response application to be activated in response to a user speaking the invocation name for the voice response application.

In some implementations, the voice response application is integrated into a voice assistant, the invocation name being different from a command or term for invoking the voice assistant, the invocation name being designated as a keyword to invoke the voice response application after a conversation of a user with the voice assistant has been initiated.

In some implementations, the method includes providing user interface data for a user interface having one or more controls to receive user input indicating (i) text of one or more requests for the voice response application to answer and (ii) text of one or more responses for the voice response application to provide. The voice response application is generated to respond to the one or more requests using the one or more responses, with values corresponding to the data objects used to complete the one or more responses.

In some implementations, generating the voice response application includes automatically configuring the voice response application to answer voice requests that match one or more predetermined grammars or language patterns using predetermined response phrases having values for one or more data objects from the information card inserted in the response phrases.

In some implementations, generating the voice response application includes storing, in association with the voice response application, configuration data identifying (i) data objects from the information card that the voice response application is configured to use in responding to voice requests, (ii) keywords corresponding to the respective data objects, and (iii) data repository information for obtaining values corresponding to the data objects. The configuration data enables a voice assistant to (i) identify the data objects referenced by instances of the keywords in voice input and (ii) retrieve values for the data objects from the data repository.

In some implementations, the configuration data enables a voice assistant to recognize instances of the keywords in voice input as corresponding to the voice response application, and the voice assistant is configured to invoice the voice response application based on detecting, in voice input to the voice assistant, one or more of the keywords corresponding to the data objects.

In some implementations, the voice response application is configured for integration with a third-party voice assistant platform, and the data objects correspond to data in a data repository of an organization that is independent from the third-party voice assistant platform. The voice response application enables a connection between the third-party voice assistant platform and the data repository of the organization to obtain values for the data objects from the data repository of the organization in response to voice inputs to the voice assistant platform.

In some implementations, the data set is a data cube, a data table, a database, or a data repository.

In some implementations, providing user interface data for a user interface that displays the information card, the user interface being interactive to enable a user to select portions of the displayed information card. In response to selection by a user of a portion of the displayed information card, assigning one or more data objects corresponding to the selected portion of the displayed information card to be included in future voice responses generated using the voice response application.

In some implementations, the information card corresponds to an entity type, the data set has a plurality of data objects for the entity type, and the information card is configured to present only a proper subset of the data objects for the entity type. The voice response application is configured to provide responses using only the proper subset of the data objects that the information card is configured to present.

In some implementations, the information card corresponds to an entity type, the data set has a plurality of data objects for the entity type, and the information card is configured to present only a proper subset of the data objects for the entity type. The voice response application is configured to provide responses using any of the plurality of data objects for the entity type.

In some implementations, deploying the voice response application includes storing the voice response application in cloud computing storage and enabling a voice assistant platform to access the voice response application.

In some implementations, deploying the voice response application includes assigning the voice response application to be used by a voice assistant for one or more users.

In some implementations, the data objects comprise at least one of: one or more attributes included in the data set; or one or more metrics representing results of calculations using data in the data set.

Other implementations of this and other aspects include systems and apparatus, including computer-readable media storing executable instructions, configured to perform the actions of the methods.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 20A-20G are diagrams showing example user interfaces for creating a voice response application.

FIG. 23 is an example of a user interface for making information cards available on a client device.

FIGS. 28A and 28B are diagrams indicating user interfaces for creating or editing information cards.

Like reference numbers and designations in the various drawings indicate like elements.

DETAILED DESCRIPTION

Figure 1:
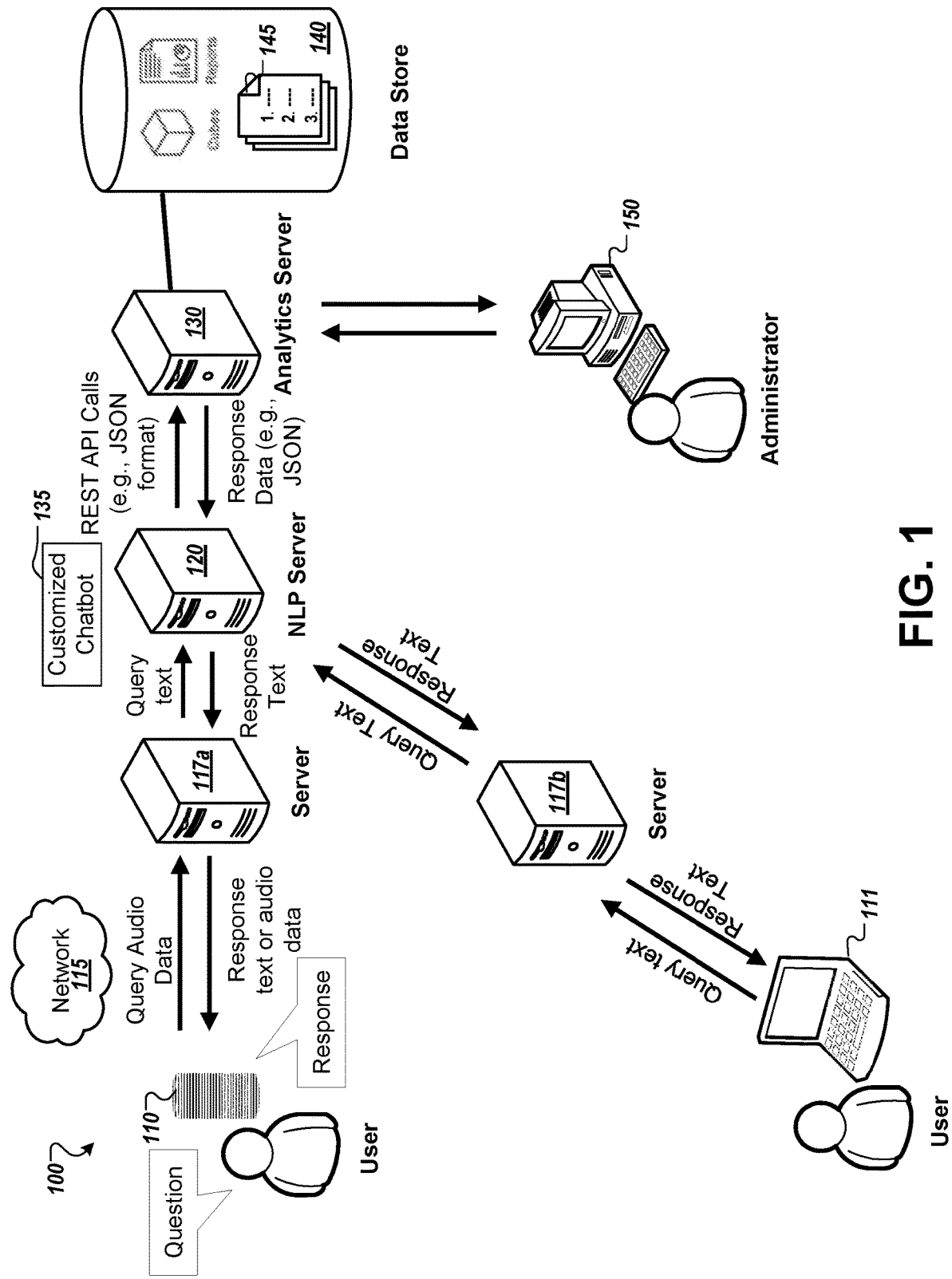
FIG. 1 is a diagram showing an example of an interactive system for analytics.

FIG. 1 is a diagram showing an example of an automated response system 100 for analytics. The example shows how a server 130 provides functionality to generate an interactive agent module, e.g., chatbot 135 or other application, service or module, from a data set. The system then uses the chatbot 135 with the rest of the system to respond to a user's query.

The system 100 includes a voice-enabled client device 110, servers 117*a*, 117*b*, a natural language processing (NLP) engine or server 120, an analytics server 130, a data store 140, and an administrator device 150. Each of the servers 117*a*, 117*b*, 120, 130 may be represents one or multiple systems, which may be managed or provided by different parties. For example, the server 117*a* may include a third-party automated speech recognizer. Similarly, the system 100 can provide or make use of a service for building conversational interfaces powered by deep learning machine learning technology. This service may be provided by analytics server 130, which may cooperate with one or more other systems to generate the chatbot 135.

The administrator device 150 provides a user interface that enables an administrator to select a data set (e.g., a data cube or other data collection) as the basis for a customized chatbot that the system creates. Examples of user interfaces are shown with respect to FIGS. 5A-5D. In some implementations, the administrator indicates subsets of the data set that are most relevant for voice interactions of users. In some implementations, the process of generating the chatbot involves the server 130 or another server accessing information card data 145 indicating templates or definitions for information cards that specify data elements that have been defined as most important.

Figure 9:
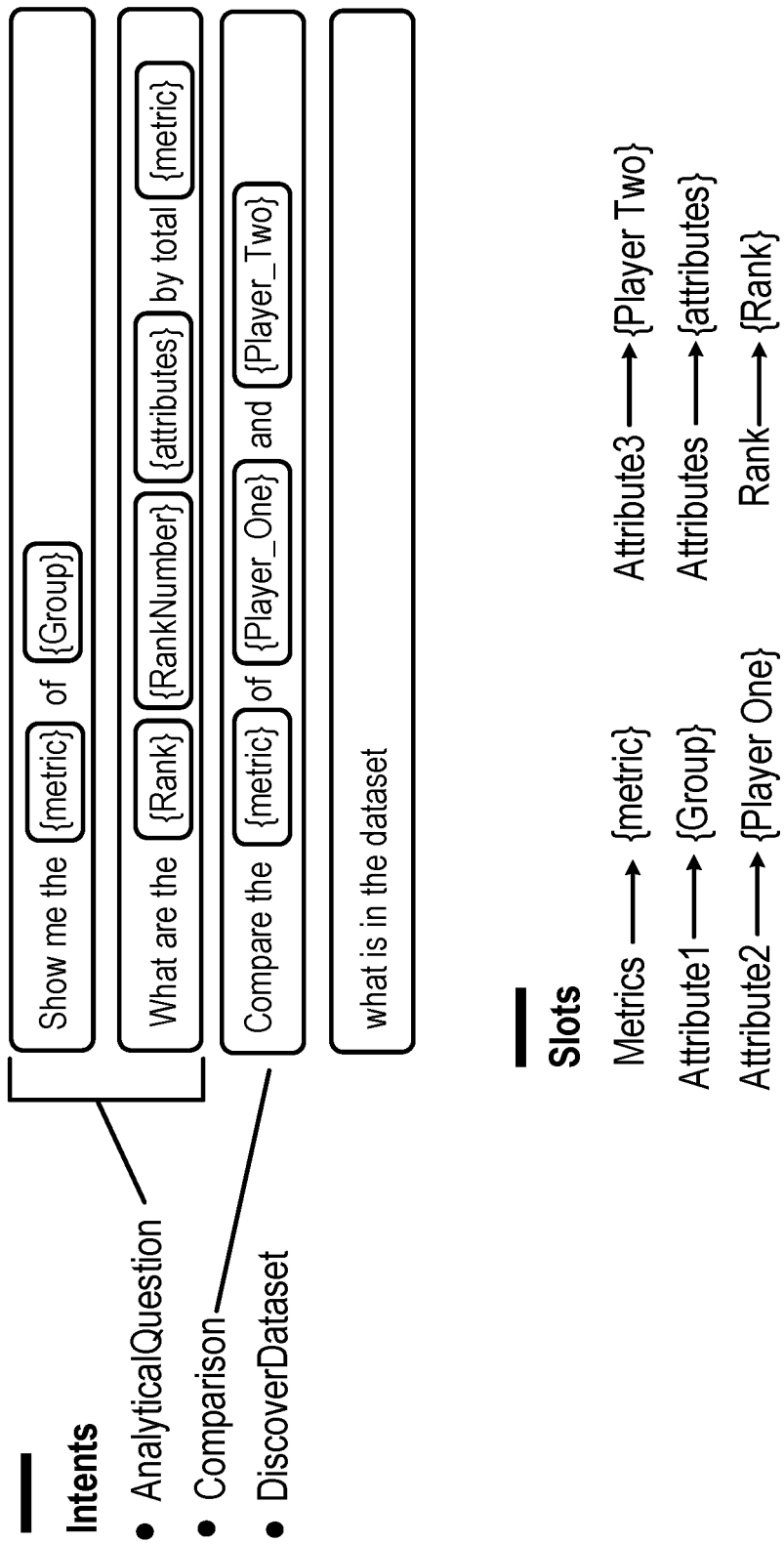
FIG. 9 shows an example of grammars and phrases used to define operation of an automated response system.

One or more of the servers 120, 130, and/or other computer systems, analyze the data set indicated by the administrator and generates the customized chatbot 135. The servers 120, 130 may include or make use of other computing systems to perform natural language processing for a user's query. For example, the servers 120, 130 shown may communicate with a third-party server to generate the chatbot 135 from various phrases, keywords, and other language samples. The process can identify the different columns of the data set (or at least those of the most relevant subset of the data set), and use these as fields or elements for natural language understanding. For example, particular metrics and attributes can be identified and used as elements to recognize in received questions from users, as well as used as elements with which to generate responses to questions. The customized chatbot 135 can be generated to recognize certain phrases, grammars, and keywords and associate them with user intents, e.g., intended actions or tasks that the user intends to perform. At least some of these phrases, grammars, and keywords may be extracted from the data set, or from usage of the data set (e.g., documents generated from the data set, previous user queries directed to the data set, etc.). Other phrases, grammars, and keywords can be taken from other sources, such as a predefined set of common question formats and response formats, which may also be varied or updated using fields identified in the data set. An example of grammars or phrases that can be used to represent user intents is shown in FIG. 9.

The server 130 may also provide phrases, grammars, and keywords to a language expansion service. For example, the server 120 can receive natural language and generate variations, e.g., using synonyms, using more colloquial or more formal language, changing word order, and other techniques. The chatbot 135 can then be generated to recognize and correctly interpret these variations as corresponding to the same original intent statement from which they were derived. This allows the automated response system to provide a more robust level of service and greater accuracy, without requiring a user to predict or manually enter the variations that users may use.

After the chatbot 135 is generated, the server 130 can publish the chatbot 135 to the NLP server 120. The chatbot 135 is then used to interpret and respond to questions from a user. For example, when a user speaks a question, the user device 110 captures the audio with a microphone and sends audio data over a network 115 to the server 117*a*. The device 110 may also provide an identifier for the user and/or proof of authentication. As discussed further below, the system 100 may identify and authenticate the user using various techniques, so that the appropriate level of information that the user is authorized to access is available for generating a response.

The server 117*a* processes the query audio data, for example, by performing speech recognition to obtain a transcription of the user's question. The server 117*a* provides the query text and potentially other information derived from the user's query to the NLP server 120, which may be provided by a different party than the server 117*a*.

The NLP server 120 processes the query text to generate structured requests to the analytics server 130. The NLP server 120 can also apply the code and definitions of the chatbot 135 to determine an intent for the user's question. In some implementations, the intent is a classification of a type of action requested by the user. The NLP server 120 may include or make use of other computing systems to perform natural language processing for a user's query. For example, the NLP server 120 shown may communicate with a third-party server to process text of a question.

The structured requests can be structured query language (SQL) statements to be executed or function calls through an application programming interface (API), such as REST API calls provided in a JSON format. A significant role of the NLP Server 120 is to convert natural language text coming from messaging applications to REST API requests for the analytics server 130 and to convert the JSON data returned by the server 130 into natural language text (see Natural Language Generation shown in FIG. 3) that can be used by a messaging application or voice-enabled device to provide a response.

The analytics server 130 receives API requests and fulfills them by retrieving and processing information from a data store 140. As discussed with respect to FIG. 3 and others below, requests can be sent to a semantic graph service, an analytics engine, and other components in addition to querying a data source. The analytics server 130 can receive REST API calls with filters in a JSON format and communicate back with a JSON response.

The results from the analytics server 130 are provided to the NLP server 120, which then generates a response that is transmitted to the server 117a, which then provides the response as text or as audio data for output by the device 110.

The system 100 can provide responses in and receive queries in various forms. For example, the same infrastructure that responds to voice queries can be used to receive and process requests that come in text form from a client device 111 through a different server 117b, for example, through a messaging platform, a web application, a field embedded in a document, a search engine interface, a text message platform (e.g. short message service (SMS)), a search field in an interface for a library or document collection, social media platforms (e.g., Facebook), collaboration platforms (e.g., Slack), and so on. Thus the system can provide a chatable interface through many different devices and applications.

FIGS. 2A-2D illustrate various examples of interactions between a user 202 and a user device 204. In each of these figures, the user device 204 provides a response from an automated response system providing access to analytics.

The identity of the user 202 can be used to personalize the responses of the voice response user in a variety of ways. The system can identify the user 202, for example, based on voice recognition, the presence of a device registered to the user identity, based on input from the user 202 (e.g., a password, PIN number, etc.) or a combination of these factors.

In many instances, users of enterprise systems do not know what information exists in an enterprise, how the information can be used (e.g., what insights can be derived from the information), or where information is stored or accessed in the enterprise systems. A voice interface system can provide information to the user 202 about what data the user 202 can access. In general, the automated response system can store data indicating all certified datasets across an enterprise that are available for access by this specific user. For example, a voice interface system can provide user queries to a back-end system that stores data that indicates the access permissions of users and the data sets of the enterprise, and which also has access to the data sets.

Figure 2A:
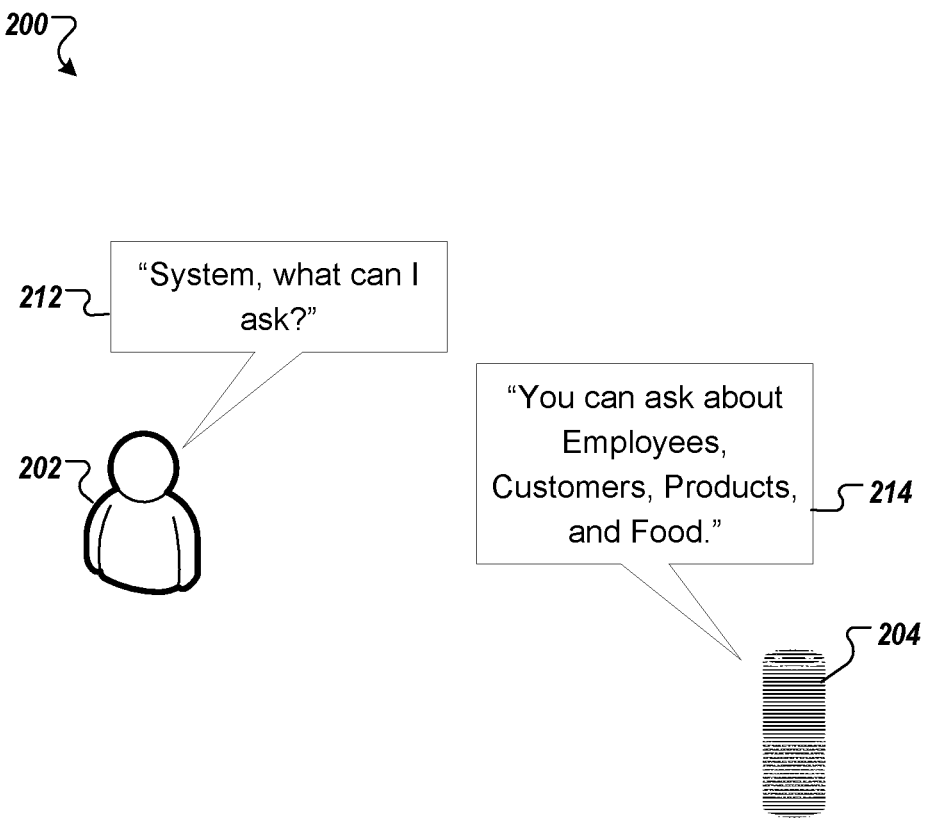
FIGS. 2A-2D illustrate various examples of interactions of a user and a user device to access analytics information.

Referring to FIG. 2A, if the user 202 asks the automated response system what the user 202 can ask about (e.g., "System, what can I ask about?") the system can access the stored data to generate a response. For example, the back-end system can look up the access permissions for the user 202, identify the datasets accessible with the permissions granted to the user 202, and retrieve labels or identifiers for those datasets. The system can then generate and provide a response for audible output by the user's device, such as "You can ask about Employees, Customers, Products, and Food." where employees, customers, products and food represent the accessible datasets for the particular user.

As another example, the voice interface system can also enable the user 202 to share existing analytics content (e.g., dashboards, reports, documents, etc.) in a manner that is personalized for the user 202. The system can then access data for the user 202, such as a library of documents for the user 202 and contacts data indicating other people that the user 202 knows. The system may also access information about the user's role in an organization and an organizational structure (e.g., departments of the organization, members of the departments, organizational hierarchy, and so on). With this information about the user 202, the system can fulfill user requests to share documents or other content, whether from the user's personal library or from the datasets the user 202 has authorization to access. In some cases, the system uses the information about the user 202's personal library, the user's contacts, or history of using the enterprise system to disambiguate the meaning of terms in a user's request.

The voice interface system can provide answers to a user's voice queries that are personalized based on a user context for the user 202 interacting with the system. For example, two users may issue the same query to the system, but receive different responses because the usage histories of the users show different topics of interest, different patterns of document accesses, and so on. A user context can include data from a semantic graph for the specific organization of which the user 202 is a member. The semantic graph may describe properties of data objects in an enterprise system, as well as relationships between those data objects. For example, an employee of a company may access a document. The semantic graph may identify the document, as well as components of the document, functions used to generate metrics in the document, data sources that the document included content from, and so on. When the employee submits a query, the usage history showing the access to the document and the semantic graph data indicating relationships of other objects to the document may be used to interpret the employee's query and provide a personalized result. For example, if the document related to production volume for widgets, and the employee asked "what is the latest information for widgets?", the system may respond by indicating the latest production information due to the usage information indicating a prior interest in the production volume metric. For another employee who recently accessed information about sales of widgets, however, the response to the question "what is the latest information for widgets?" may be a metric indicating a monetary amount of sales. In both of these cases, the semantic graph may be used to link terms in the query (e.g., widgets) to specific data objects (e.g., tables, columns, documents, metrics, attributes, etc.) that can be refined based on a user's personal history. In addition, the user context is not limited to prior usage of a computing system, and can include aspects such as a geographical location of the user 202 or the user's device, identities of devices nearby, identities of other people nearby, usage histories for the other people nearby, calendar data indicating appointments of the user 202, applications open on a mobile device or computer, documents currently or recently opened on a mobile device or computer, and so on.

Figure 2B:
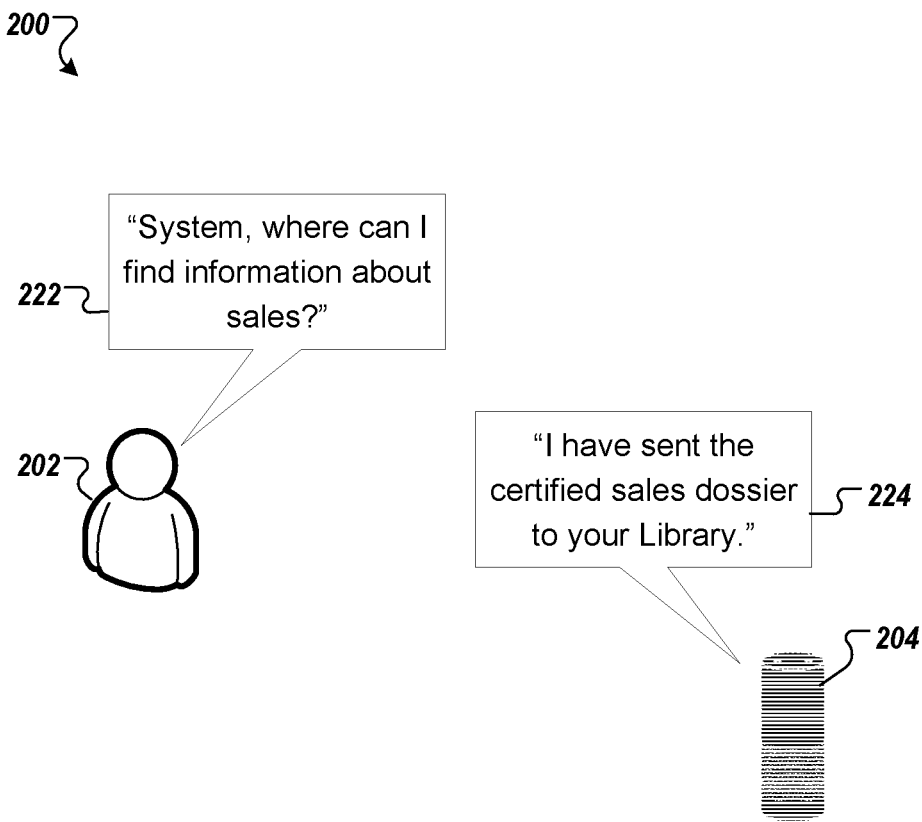

Referring to FIG. 2B, the automated response system can use information about the most popular reports or documents to respond to a user's request. As various users interact with the enterprise application, the system can acquire various types of telemetry data, such as who is accessing documents, what interactions are taking place, how long the interactions occur, what documents are accessed together or at similar times and places, and so on. This telemetry data or usage data can be used to answer user requests and provide recommendations.

For example, the user 202 may speak a query, "System, where can I find I have sent the certified information about sales?" In response, the system may identify a document that relates to sales and has the most accesses or shares over a recent time period (e.g., the last week, the last three days, the last day, etc.). The system may then make the identified document available in response to the query. For example, the system may add the document to the user's personal library and the system may reply, "I have sent the certified sales dossier to your library." This example shows how the system can link the response to a voice query with a variety of operations and actions in an enterprise application. The system semantically interprets the query to determine the nature of the request, e.g., a request for a document about sales. The system uses the semantic information to identify candidate documents that relate to the topic of the query and then adds them to a document collection for the user 202 in response.

When generating responses to voice queries, the system can leverage data that defines information cards that indicate what is important for a specific organization. For example, an organization may define a customized set of metrics, attributes, or other indicators that are important for entities of a certain type. For example, an organization may specify a first set of metrics to be provided for entities classified as suppliers, and may specify a second set of metrics to be provided for entities classified as customers. When determining a response to a query involving an entity, the automated response system can access the data specifying these organization-specific, custom-defined sets of key data types, and prioritize the delivery of information those data sets in generating the response to be provided to the user 202. For example, a response may be composed of elements taken from the definition of an information card that has a custom-defined set of content for the organization. In general, the use of these organization-specific sets of data can give bite-sized pieces of data that has been identified as valuable to the specific organization that the user 202 is a member of.

Personalization of responses provided by the automated response system can also take into account security filters, user identity, the usage history of the user 202 or other users, and the composition of user groups together to personalize the data available to an individual.

Figure 2C:
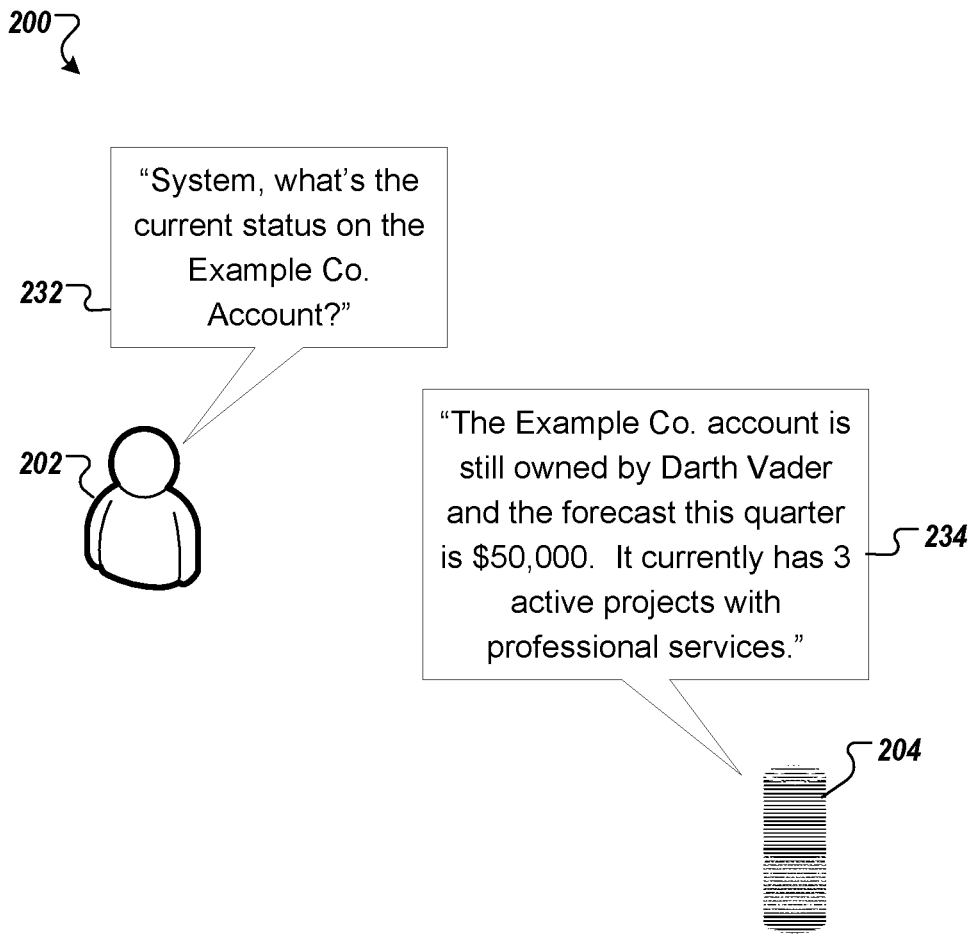

Referring to FIG. 2C, the automated response system can use various techniques to focus data in voice responses to the characteristics and needs of a specific enterprise. In many enterprises or organizations, the volume of data is so great that many users do not know which data is important and should be viewed or explored further. To address this challenge, the system can personalize the retrieval and presentation of information. Personalization can leverage information about user identity at the level of the enterprise platform to provide user-specified answers. In addition, the automated response system can use presence information, such as data indicating users' locations and their proximity to other users to tailor responses for the physical context of the user 202 (e.g., the geographic location of the user 202 and the identities of other people and devices nearby). As noted above, data such as information cards specifying the key sets of data elements that are most relevant to an entity or entity type can be used to customize responses. For example, an information card for a specific entity or an information card template for a particular class of entity can define a specific set of attributes, metrics, topics, or other information that are relevant when the user 202 submits a request about the specific entity or an entity of the particular class. These sets of data, and the information cards and templates, can be defined by each organization to focus information retrieval and delivery to the areas the organization defines as most important.

In the example of FIG. 2C, the automated response system stores information about an account of a company "Example Co." The user 202 of the automated response system is a member of an organization that has a customized information card defined for an entity type (e.g., company vs. person, or supplier vs. customer) for this company or specifically for the particular entity (e.g., "Example Co."). The user 202 speaks a query, "System, what's the current status of the Example Co. Account?" To respond to the query, the system identifies the entity from one or more keywords (e.g., the company name) in the user's query. The system then retrieves data defining the information card for the identified entity. This retrieved data can define an information card that would be provided for the entity in a visual interface. The retrieved data specifies a set of metrics for the entity, "Example Co." The system then selects most popular metrics from the set based on usage statistics from the database platform. The system then composes a response to the query and send it for audible output by the user device: "The Example Co. account is still owned by Darth Vader and the forecast this quarter is $50,000. It currently has 3 active projects with professional services."

The system can use a variety of techniques to improve the effectiveness of responses. For example, the system can use historical data, presence information (e.g., location and proximity of users), and application usage log data captured through the system to optimize which types of information are provided to users. The system can also adjust output based on various different types of context, such as user identity, location of the user 202, proximity to other people whose identities are known, proximity to places and objects, and historical use of one or more applications to bring the right information from enterprise data stores to users.

Figure 2D:
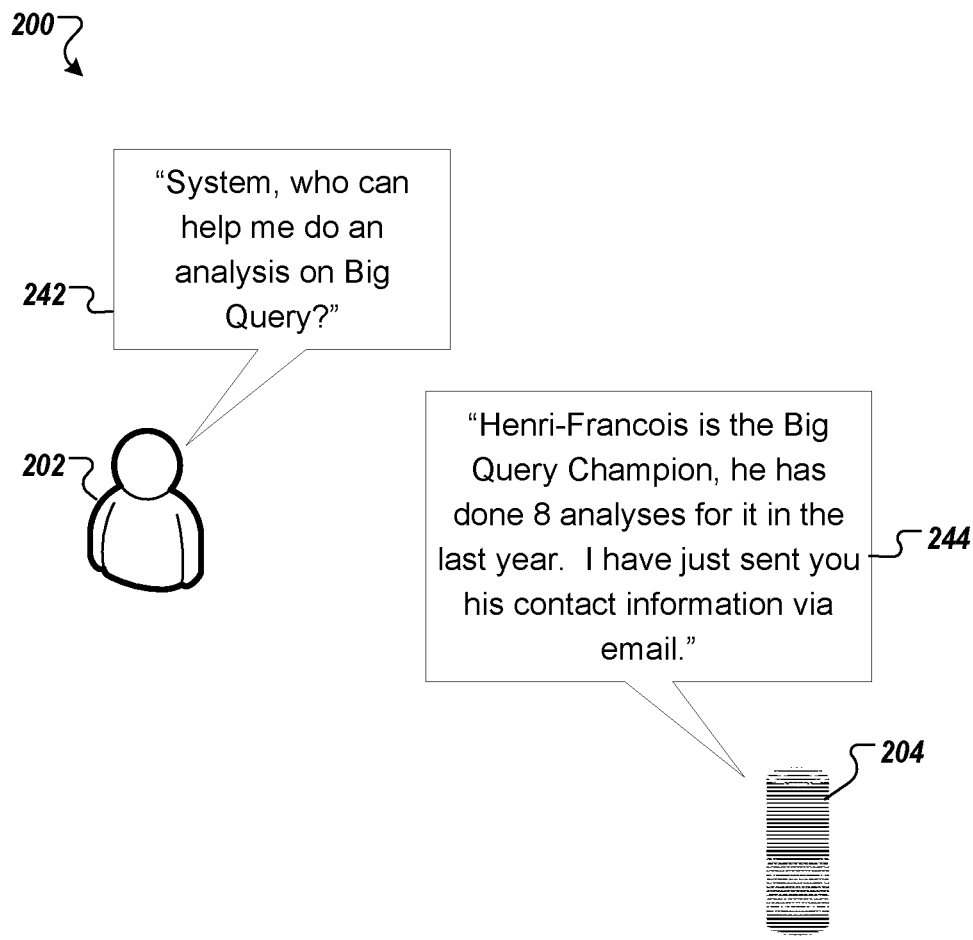

Referring to FIG. 2D, the automated response system can aid users in interpreting data of an enterprise system to bridge gaps in data literacy for specific enterprises. Users of enterprise systems often struggle to understand the purpose of existing reports, the meaning of specific figures or metrics, and who the subject matter experts are in their organization. This lack of basic understanding often hinders users from being able to craft effective queries and to perform other tasks, because users often do not even know what questions to ask.

The automated response system can provide descriptions of data sources and data objects. For example, the system can provide context that helps users make decisions about what to access. The system can also recommend experts, e.g., users in the organization or outside that have experience or expertise in an area. The system can enable users to perform follow up actions and contact experts in specific domain areas. The system can also recommend content based on user affinity, a user's role, and user behavior (e.g., historical usage information for the user 202).

In the example of FIG. 2D, the automated response system knows who subject matter experts are on certain topics based on telemetry, user activity, and other user properties in metadata and can recommend these experts to others. As an example, the user 202 may state, "System, who can help me do an analysis on Big Query System?" In response, based on usage history or other data, the system can identify a person with the appropriate expertise and reply, "Henri-Francois is the Big Query Champion, he has done 8 analyses for it in the last year. I have just sent you his contact information via email."

The automated response system can facilitate the user's access to information using metadata and other information to guide users to data resources and the appropriate meaning of terms. Metadata and descriptors for data elements allow users to interact with information without any prior knowledge of the data's structure or purpose.

The automated response system can apply various thresholds, calculations, and measures to enterprise data to provide insight to users. Even if the user 202 does not have prior context to assess the importance of a data set or the important relationships present in a data set, the system can use various thresholds and functions to be able to indicate judgments about the data set. For example, the system can help users interpret information as good or bad, or appropriate or inappropriate for a given use, without prior context. The automated response system can identify subject matter experts based on application usage and other factors.

Figure 3:
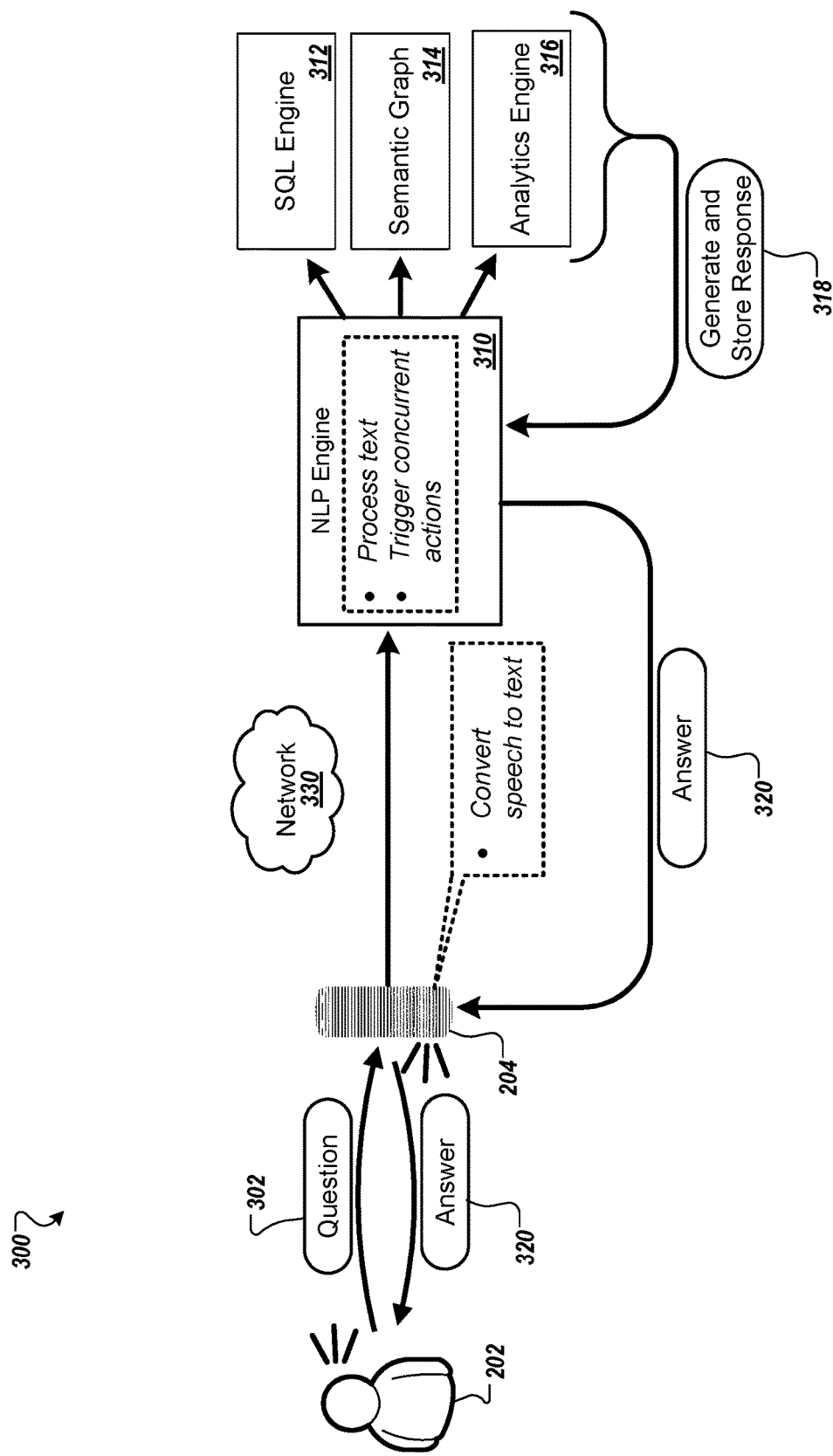
FIG. 3 is a diagram showing an example of an automated response system for analytics.

FIG. 3 shows an example of an automated response system that can include features that improve data questioning for users of a specific enterprise. In many instances, users do not know how to convert their questions into a query that an enterprise system handles effectively. Also, the meanings of terms and the structure of data being queried is often unique for each organization.

The system can include a number of features to more effectively translate natural language questions or statements from users into queries that a database system can process. The system may perform various functions such as generating and interpreting questions in the user's terms and locale, performing on the fly calculations from natural language queries, caching the responses to common queries or caching data sets used to respond to the common queries, and using feedback to enrich the data in a semantic graph.

When a user device 204 receives a question 302, the device 204 can perform speech recognition or send audio data to a server system to perform speech recognition. The text of the question 302 is sent over a network 330 to a natural language processing engine 310, which can process the text and trigger various concurrent actions. The concurrent actions can include processing by (1) a federated query optimizer 312, which may perform multi-pass SQL analysis; (2) an analytics engine 316; and (3) a semantic graph 314 that provides information about metadata definitions of attributes and metrics. The system can determine and apply join relationships between tables in a data store to execute SQL queries. The semantic graph 314 can provide customized knowledge of individual databases and applications and how to execute information within them. The output of modules 312, 314, and 316 is used to generate a response 318, for example, in a text format. The system then causes synthesized speech audio data to be provided to the user device 204 to be output to the user 202.

Figure 4A:
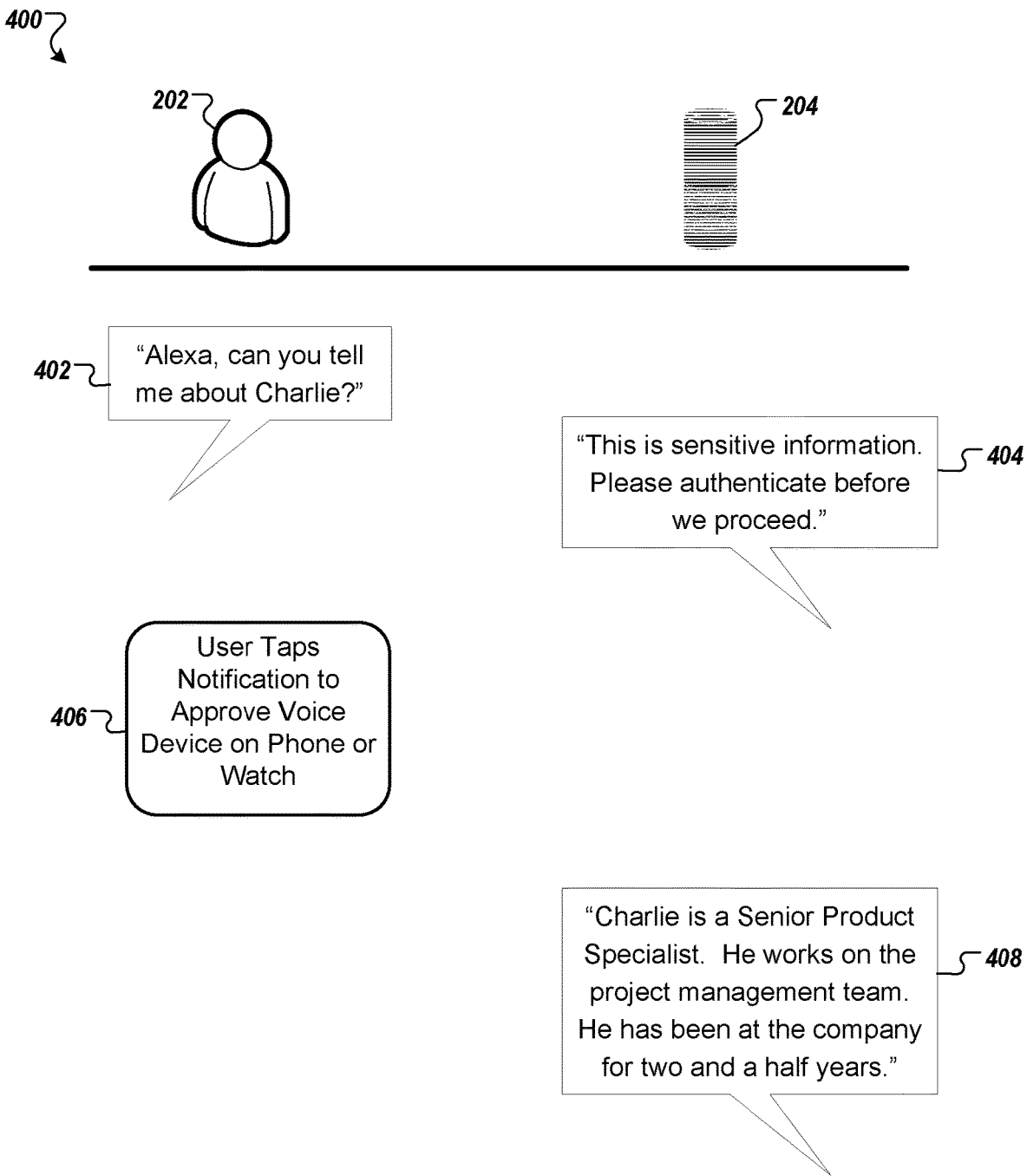
FIGS. 4A and 4B show examples of dealing with data sensitivity in an automated response system.
Figure 4B:
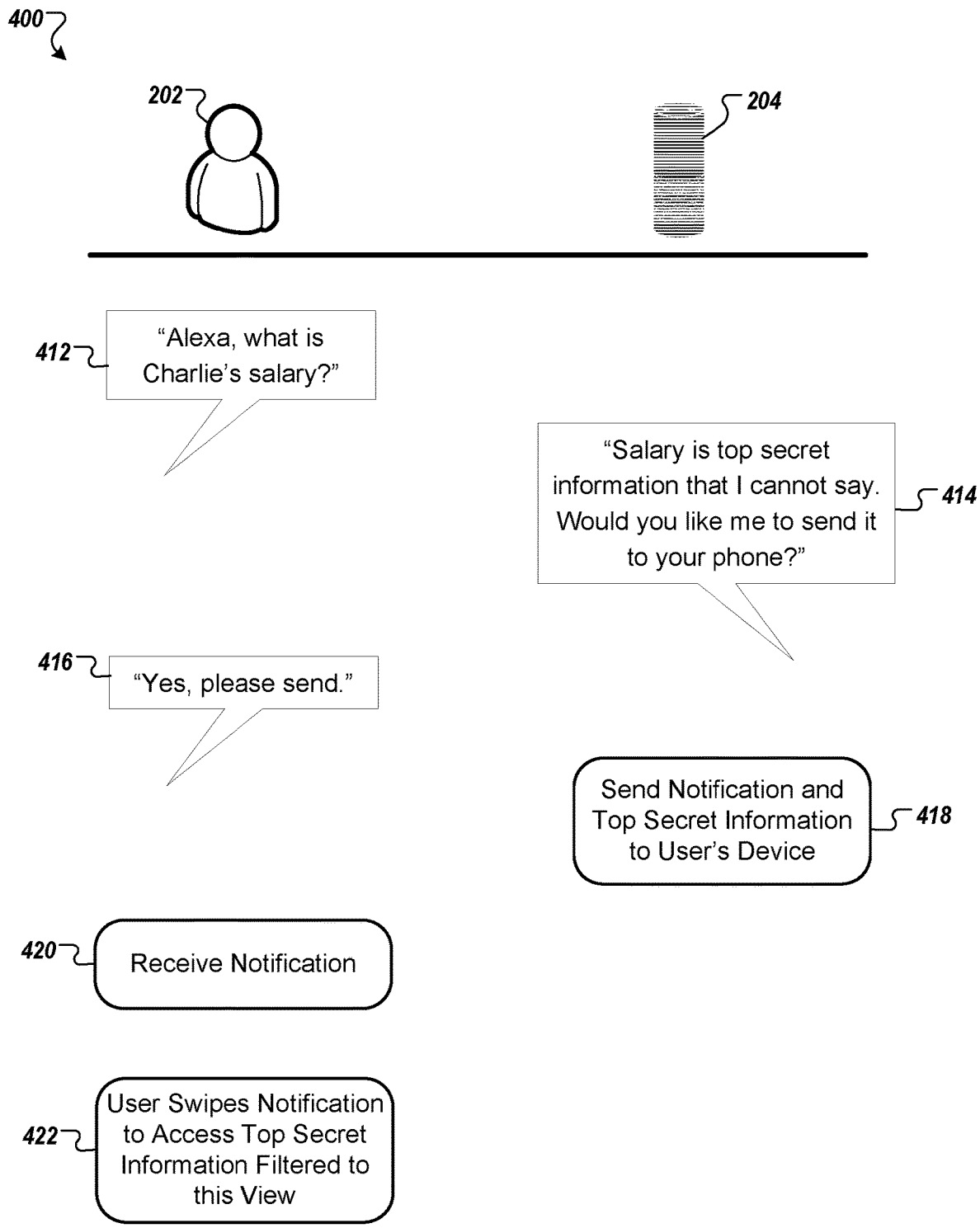

FIGS. 4A and 4B illustrate examples of enforcing rules for data security. The automated response system can operate in a manner that improves trust in and accuracy of information for a specific enterprise. In many instances, it is difficult to ensure that users can trust the information given. It can also be difficult to ensure that sensitive information is protected when accessed via a voice interface.

One way to address these challenges is to define different sensitivity levels for data, where accessing data for the different sensitivity levels requires different levels of authentication. For example, voice requests that would result in a response with confidential information may trigger an authentication challenge while requests for public information may not. Similarly, multiple levels of authentication, each involving different combinations of authentication factors, may be required by the system in order to access data assigned different sensitivity levels.

Another way to improve trust, security, and privacy is to detect conditions of the environment and vary the response of the system accordingly. For example, the automated response system may be integrated with functionality that identifies the presence and identity of others within a range of the voice response device. For example, the system may communicate with (e.g., send data to and/or receive wireless data from) other nearby devices. If the devices can authenticate their users and the associated users have been granted authorization to obtain the information, then the information can be provided. However, in response to detecting the presence of a device for the user 202 that is not authorized to receive the data, the system may omit sensitive information from the voice response. For example, the voice response can be tailored to include only information acceptable to be provided to the user present who has the lowest level of access authorization. In general, the system can integrate presence and identity monitoring (e.g., using cameras, biometric identification, device-based tracking, voice recognition, etc.) to tailor responses so that the correct set of information is provided. Responses of the system can be generated to suppress (e.g., omit) the presentation of information marked as sensitive when a user who is unknown or is determined to not have access authorization is present, even if another user who is known to have access authorization is present.

In general, the system can apply various security filters, and use information about user identity, application or resource usage, user group membership, access privileges, and data certification together to determine whether security and privacy requirements are met.

One approach that the system can take is to store personally identifying information (PII) and other information with different levels of sensitivity. There can be different clearance levels required for different types of data or different portions of data. For example, multiple clearance levels or secrecy levels can be defined such as "public," "internal," "confidential," "secret," and "top secret." Information in a database can be categorized or assigned to these different levels, so that even among sensitive data, some elements have access requirements that are stricter than others. In generating responses, the system takes into account these levels, and may limit answers to queries accordingly. For example, even though the user 202 may have authorization to access certain sensitive information, the sensitivity level classification may block the output of answers that would cause an audible output of the information. For example, a voice query may call for the output of PII marked as sensitive. The system can identify that the response is includes data marked as sensitive, and even after verifying that the user 202 is authorized to receive the information the system may take steps to further safeguard the information such as: (1) outputting the information through a more secure channel instead of through audible output (e.g., through a visual user interface, e-mail, secure application message, etc.) and use an audible output to direct the user 202 to the other channel; (2) present an authentication challenge or explicit confirmation before providing the sensitive information; (3) assessing an environment to determine whether risk of interception is sufficiently low (e.g., determine if other people are present, determine if people present are authorized to obtain the information, determine whether doors/windows are closed, determine whether output volume levels are sufficiently low, etc.).

FIGS. 5A-5D show user interfaces for generating an interactive agent module (e.g., a chatbot or other application) based on a data set. This process can generate a customized chatbot defined based on the properties of a data source, such as a data cube.

Figure 5A:
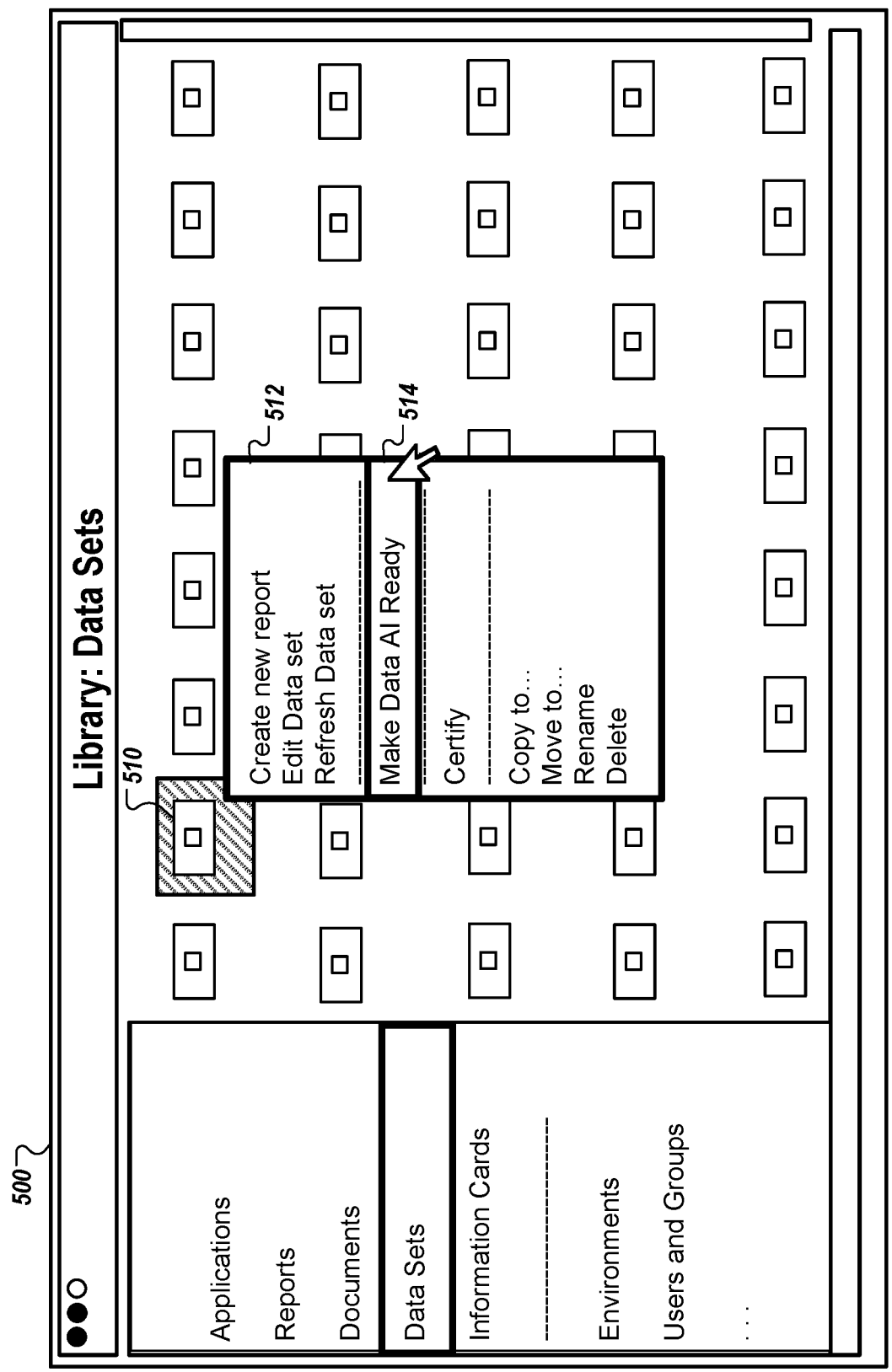
FIGS. 5A-5D show user interfaces for generating an interactive agent module based on a data set.

FIG. 5A shows a user interface 500 for a library interface, for example, an interface of an application, web page, web application, etc. The example interface 500 shows different data sets available to a user. In this example, a user selected a data cube 510 from among various data sets in the user interface 500. The selection causes a context menu 512 to be provided, for example, after a user right-clicks a data source, and the context menu 512 includes an option 514 for making the data set 510 artificial intelligence ready. This can refer to making the data set 510 accessible through any of various platforms, such as one or more of a chat platform, a voice assistant platform, a messaging platform, etc. In the example, the user selects this option 514, which causes the application to initiate the creation of a chatbot customized for the particular data set 510 selected.

Although the example of FIG. 5A shows the creation of an interactive agent (e.g., application, chatbot, service, microservice, or other module) for a data set, a similar process can be provided for other items, such as an information card, a report, a document, an application, etc. For these other types of items, the computer system can identify the data objects included in or used by those items, as well as the data source(s) that provide the items, and the computer system can proceed to make the identified set of data objects available through an interactive agent. For example, a user could select an information card for his organization, rather than selecting a data set, and an option can be provided to make the data in the information card available through an artificial intelligence service or other platform.

Figure 5B:
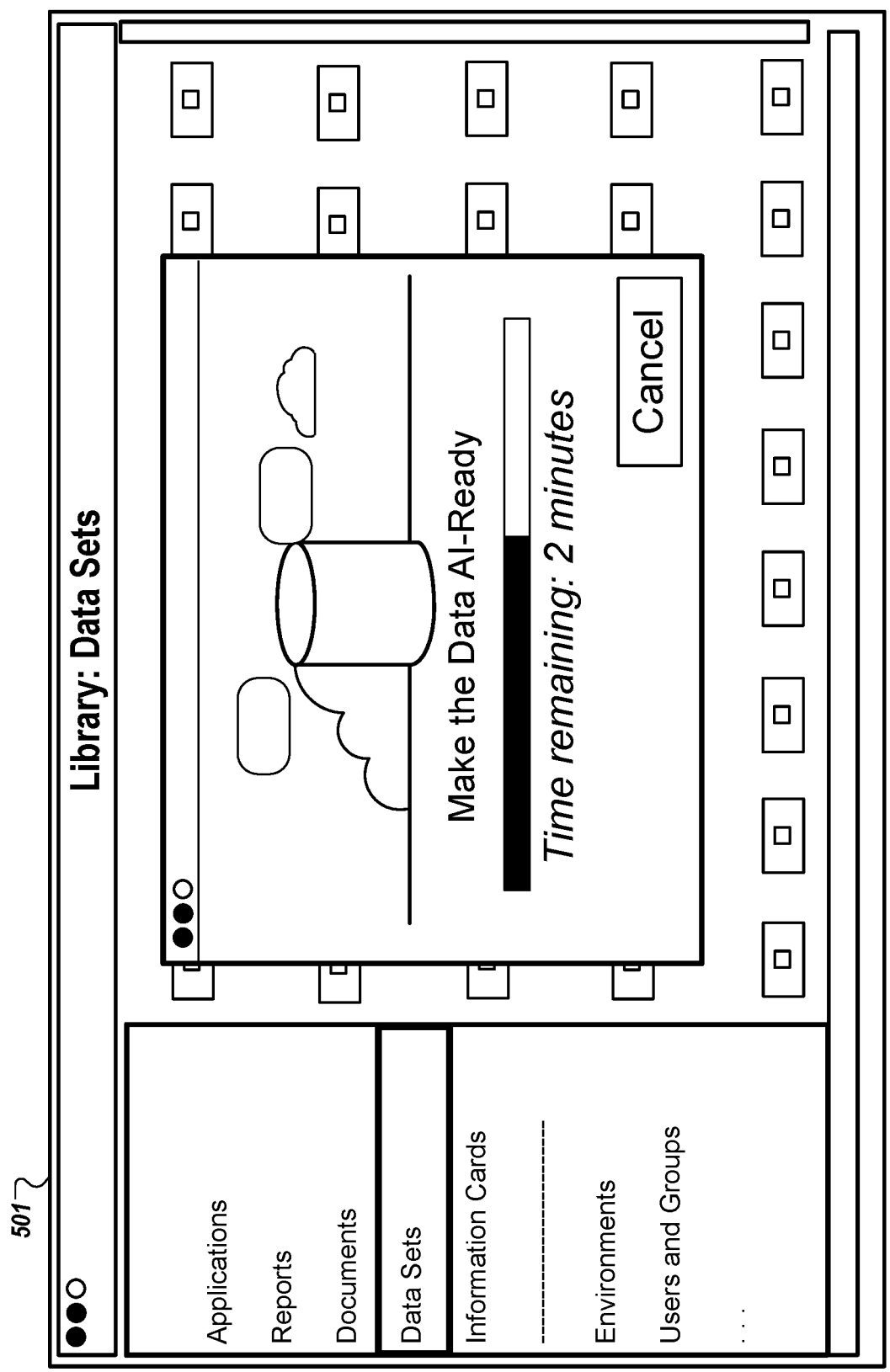

FIG. 5B shows a user interface 501 presented to inform the user of progress while the system performs analysis of the selected data set 510 and created the chatbot. As noted in the progression from interface 500 to interface 501, the process of generating the chatbot from a data source, such as a data set or an information card, can be partially or completely automated. For example, the computer system can access metadata for the data set. From this metadata, the computer system can identify the data objects (e.g., attributes, metrics, etc.) that are included in or are available from a data set as well as keywords (e.g., words and/or phrases) for the various data objects. The keywords can be, for example, table names, database table column labels, text in metadata entries, tags, annotations, commonly occurring text, and so on. From this extracted information, the computer system can define a set of topics or items the chatbot can answer about (e.g., based on the keywords), and can associate the data objects with various grammars or language patterns.

For example, the computer system can define the chatbot with various question and answer pairs, such as the question "what is [Data_Object_Keyword]?" and response "the [Data_Object_Keyword] is [Data_Object_Value]," where [Data_Object_Keyword] is a placeholder that can be populated by any of the keywords for the data objects and [Data_Object_Keyword] is a placeholder that can be populated by the value, retrieved from the data set, for whichever data object is referenced by the [Data_Object_Keyword]. Standard question/answer patterns can be incorporated into the chatbot, along with variations generated to represent various types of usage, patterns defined by a user, and other types of language patterns.

Figure 5C:
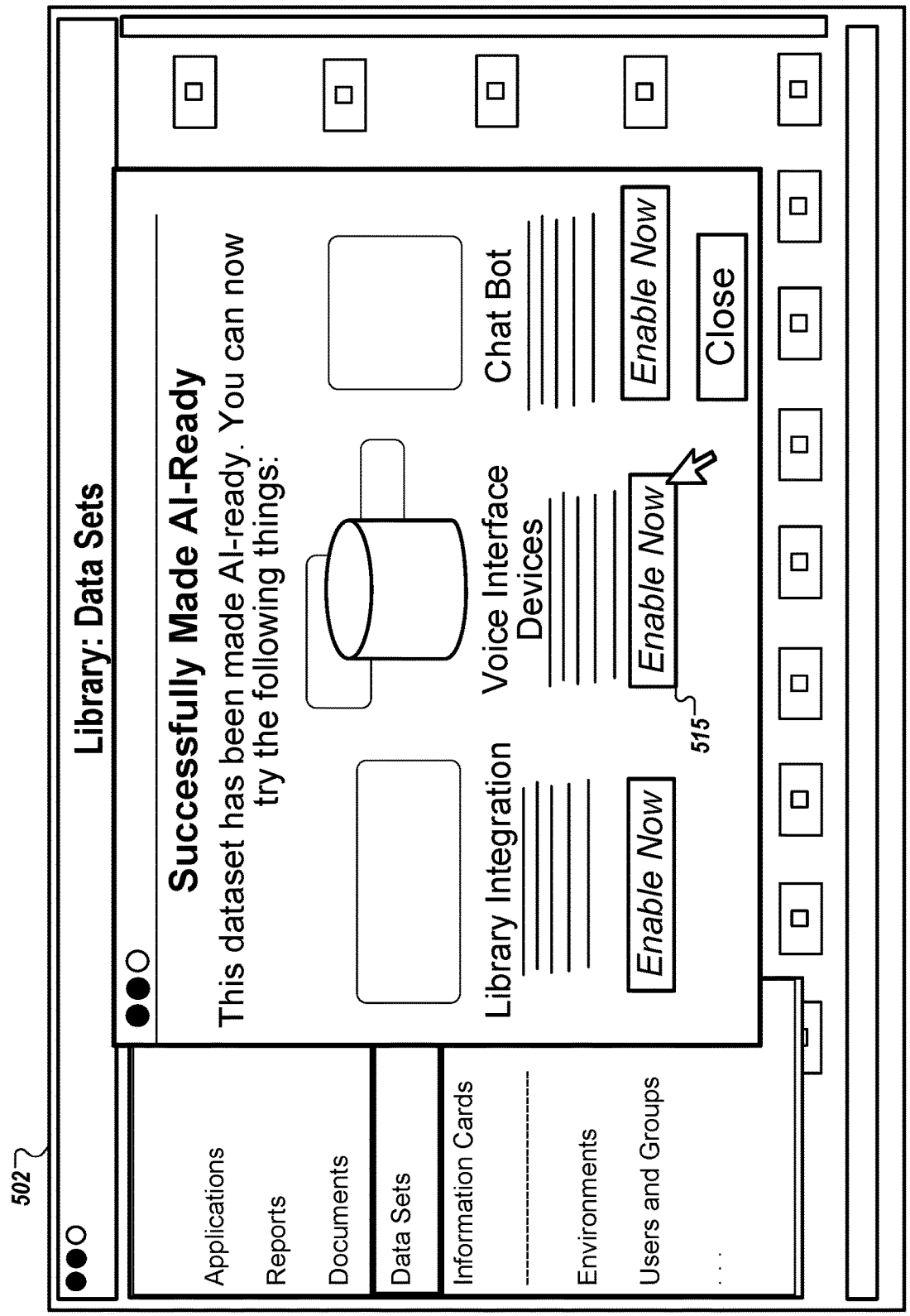

FIG. 5C shows a user interface 502 after the chatbot is generated. In some implementations, the chatbot is a skill for the AMAZON ALEXA platform. Other types of applications, services, modules, etc. may be generated. The chatbot and related data created allow natural language access to (1) be integrated with a library, document collection, or other application or user interface, (2) be accessed through voice interface devices (e.g., Amazon Echo or Alexa-enabled devices, Google Home or Google Assistant devices, etc.), and/or (3) be accessed through a chat interface. The user interface provides options for a user to enable the new chatbot on these different types of interfaces. In the example, the user selects the option 515 to enable the new chatbot on voice-enabled devices.

Figure 5D:
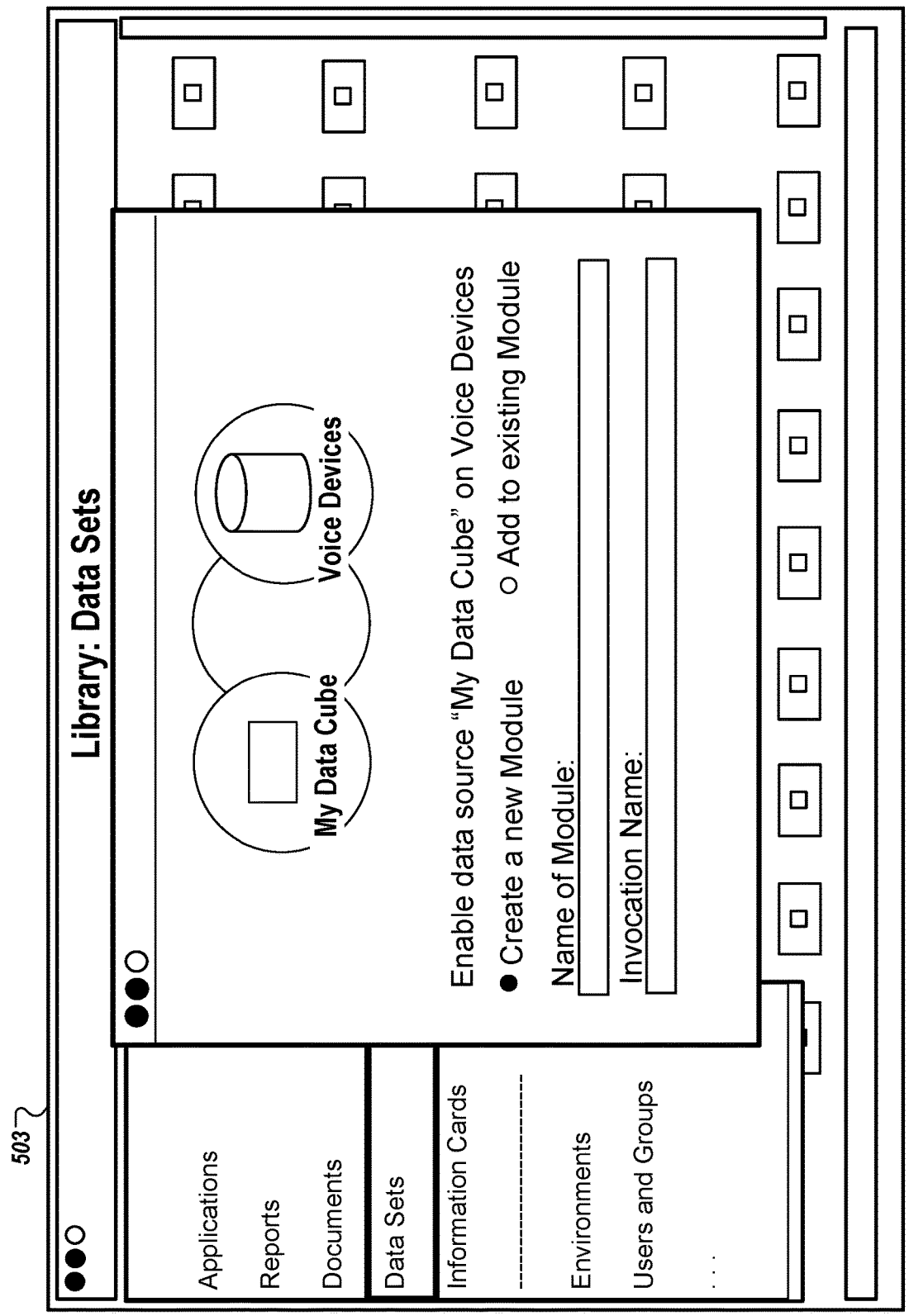

FIG. 5D shows a user interface 503 that allows an administrator to define the new chatbot functionality as a new independent module, or to add the functionality to an existing chatbot or service. The user interface also allows the user to specify a name for the service and other parameters, such as an invocation name that a user can speak to signal that the voice assistant should enable and use the custom chatbot to respond to requests in the current conversation.

Figure 6:
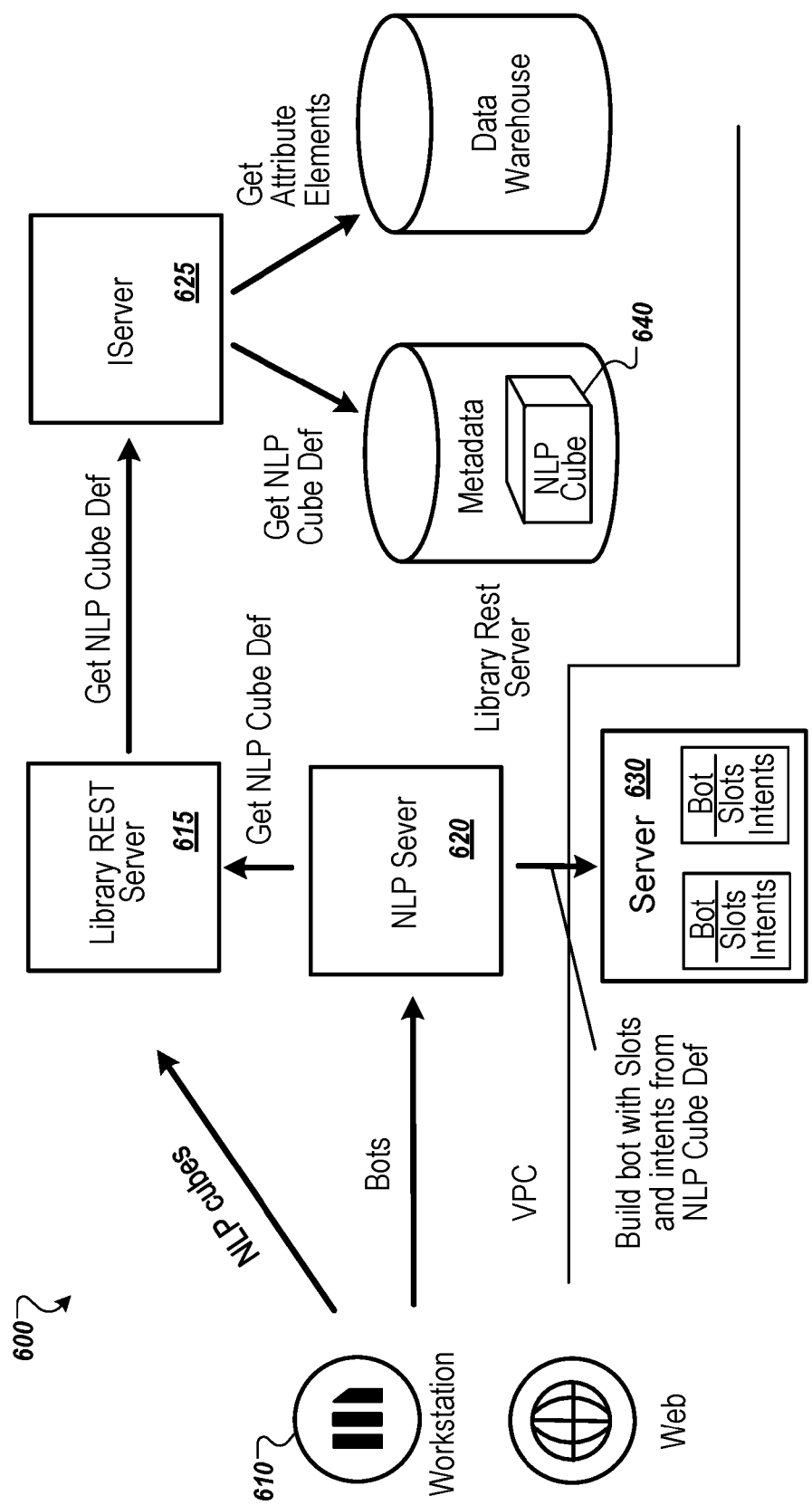
FIG. 6 shows an example of information flow for generating an interactive agent module.

FIG. 6 shows an example system 600 and information flow for generating an interactive agent module. FIG. 6 shows that a NLP server can be used to generate chat bots that have response fields and intents defined from properties of a data set, such as an NLP cube definition.

A system 600 for creating and providing a customized voice response service can include various elements, such as a workstation 610 or application, a library representational state transfer (REST) server 615, a NLP server 620, an information server (e.g., iServer) 625, and an audio processing or third-party NLP server 630, such as an AMAZON LEX service. The workstation 610 can be a client device that is used by an administrator to make artificial intelligence for a dataset available. The Library REST server 615 provides various JSON DATA APIs. The NLP REST server 620 offers NLP services as a microservice. The system 600 can generate an interactive agent or bot for an organization. This bot can be linked into an enterprise database system. The chatbot can be accessed by a messaging or voice application, which represents any of various client applications used by the user to communicate with the bot.

The system 600 can generate a bot from an NLP cube 640, which represents a view report of a data cube (e.g., an OLAP data cube) with a specific NLP subtype. When a user wants to create a chatbot, the user can first create a NLP cube by selecting, from an existing data cube, attributes and metrics that will be relevant to NLP queries of users.

The Library REST server 615 has a set of NLP services that allow users to create chatbots from a dataset. A chatbot or automated response system can be provided as a microservice hosted by a NLP server 620. As an alternative, the microservice can be hosted separately, which can provide some benefits, such as isolating the Library REST Server 615 from the newly introduced NLP dependencies and allowing horizontal scalability (more or fewer NLP servers can be deployed if needed). Each NLP server would heavily use a Library REST Server for JSON Data API calls.

This design considers the NLP services that are being built as its own microservice, instead of keeping it as part of the Library REST Server 615. This design helps the architecture remain valid for any technology used for the microservice.

In the architecture, the NLP server 620 can be designed to be able to work with any NLP engine. One example of a NLP engine is Lex (provided through Amazon Web Services). Other natural language servers include Dialogflow (Google) and Luis (Microsoft).

The NLP server 620 allows integration with voice-enabled device or service, such as Amazon Alexa devices and others. The NLP server 620 may allow integration with messaging apps provided by various parties.

The NLP server 620 can be designed to handle multiple concurrent requests. The NLP server 620 can also support HTTPS/TLS with the Library REST Server 615. The system allows users to create a subset of a data cube, referred to as an "NLP Cube," that contains the "NL meaningful" attributes and metrics object. Using this subset of a data cube can help to avoid confusing the natural language processing elements with data that is not meaningful for the voice interface.

Voice-enabled applications and devices can authenticate with the NLP server using a user account for an enterprise analytics platform account. As a result, the user will be able to access any data through the voice interface that the user's account is authorized to access in the analytics platform.

In general, the NLP server 620 can prefer using asynchronous workflows for long processing tasks, in order to avoid timeouts and to offer more options at the client side (e.g., the option to cancel the current execution or to perform other tasks while waiting).

The architecture can be structured so that error messages are not thrown to the messaging/voice apps directly, as they would not be able to handle it. We need to always have a (error) text message returned, we can log more details in the server logs.

The NLP server 620 can offer REST API service. The NLP server 620 can be horizontally scalable. The workstation 610 can be able to connect with and communicate with the NLP server 620.

The NLP Server 620 can serve two major purposes, for example, to provide APIs for access by an administrator to create, publish, and manage chatbots, and provide APIs for the end user (e.g., using an AMAZON ALEXA device or a mobile application) to submit natural language messages and receive responses. The library REST server 615 represents an enterprise analytics server that can access a data store and manage data from various different sources. The library REST server 615 also manages authentication and acts as a gatekeeper to manage access permissions.

Figure 7:
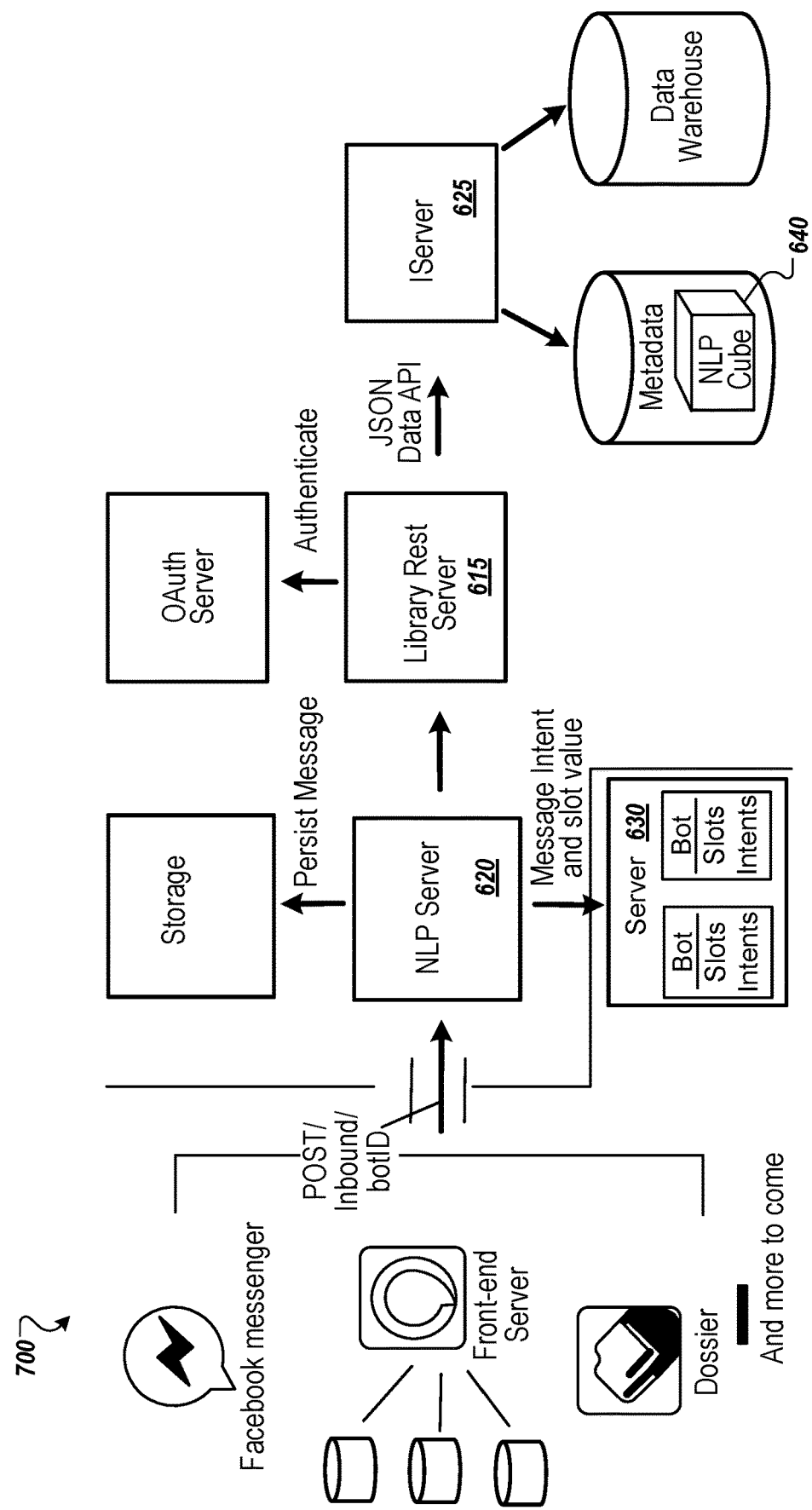
FIG. 7 shows an example of information flow for responding to a query.

FIG. 7 shows an example system 700 showing information flow for responding to a voice query. FIG. 7 shows how requests from various sources (e.g., documents, voice-enabled devices, messaging applications) are provided to the NLP server 620, which coordinates with another language processing server 630, e.g., an AMAZON LEX interface. The bot, or data about the bot, can be run on this third-party audio processing system, so that intents and transcriptions are provided to the NLP server 620 to continue processing to generate a response.

Figure 8:
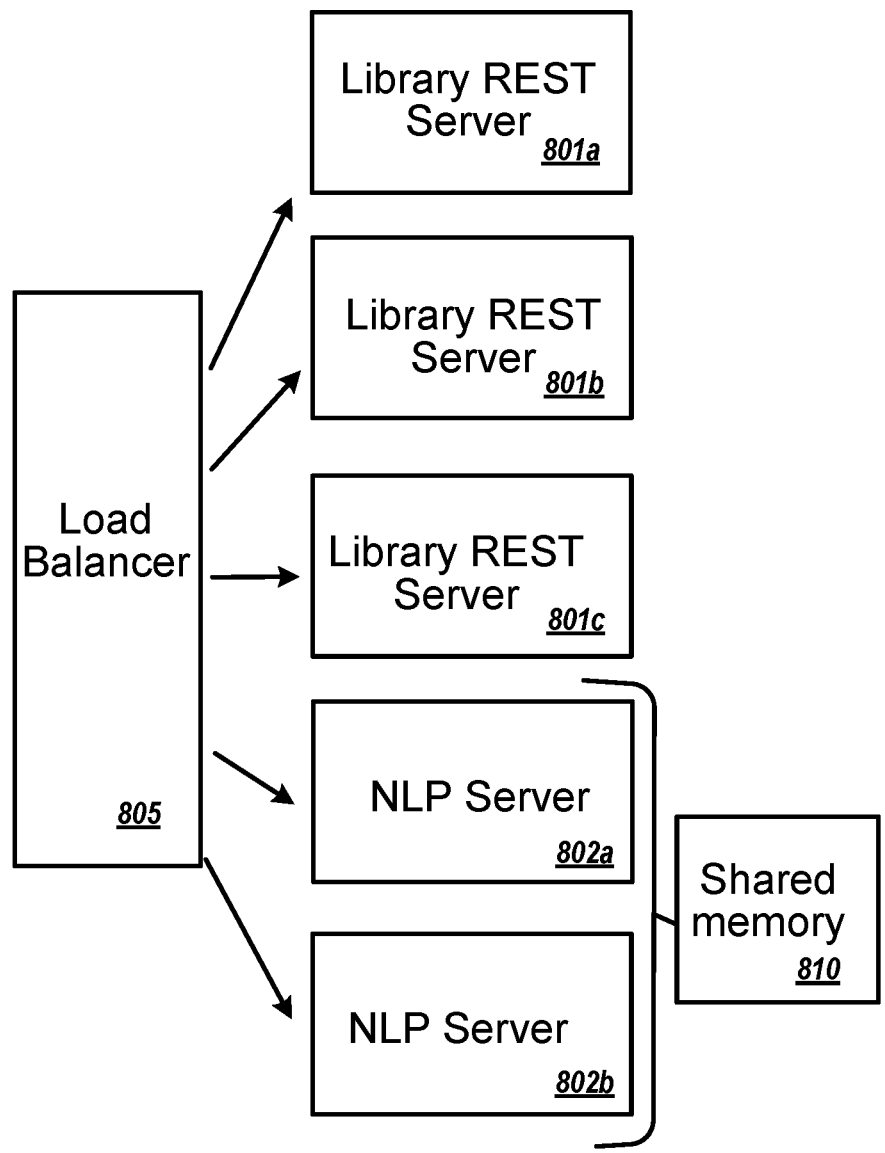
FIG. 8 shows an example of load balancing among various servers.

FIG. 8 shows an example of load balancing among various servers 801*a*-801*c*, 802*a*-802*b*. Referring to FIG. 8, an important advantage of having the NLP services as a microservice is that the system can support horizontal scaling. A load balancer 805 can distribute user requests for processing among various different servers or server environment instances. The NLP servers 802*a*-802*b* can have a shared memory 810. Information server sessions can be handled across a cluster of NLP servers 802*a*-802*b* that each: (1) have the client manage and maintain the session state, (2) have the shared session repository (in Mongo DB or Redis for example), and (3) use sticky session and make sure a user sticks with the same NLP server (this must be configured with the load balancer).

The NLP servers 802*a*-802*b* do not require persistent connections. To make these servers truly stateless, then nothing would be stored in the server's session state. This typically means that state information is entirely held by the client or a shared session repository (e.g., MongoDB) can be used. Alternatively, NLP Servers 802*a*-802*b* may utilize a "sticky session" so that subsequent requests are sent to the same server instance that made the initial connection.

FIG. 9 shows an example of grammars and phrases used to define operation of an automated response system. FIG. 9 also shows a mapping between analytics data objects and keyword or field objects of a chatbot or third party natural language interface.

Figure 10:
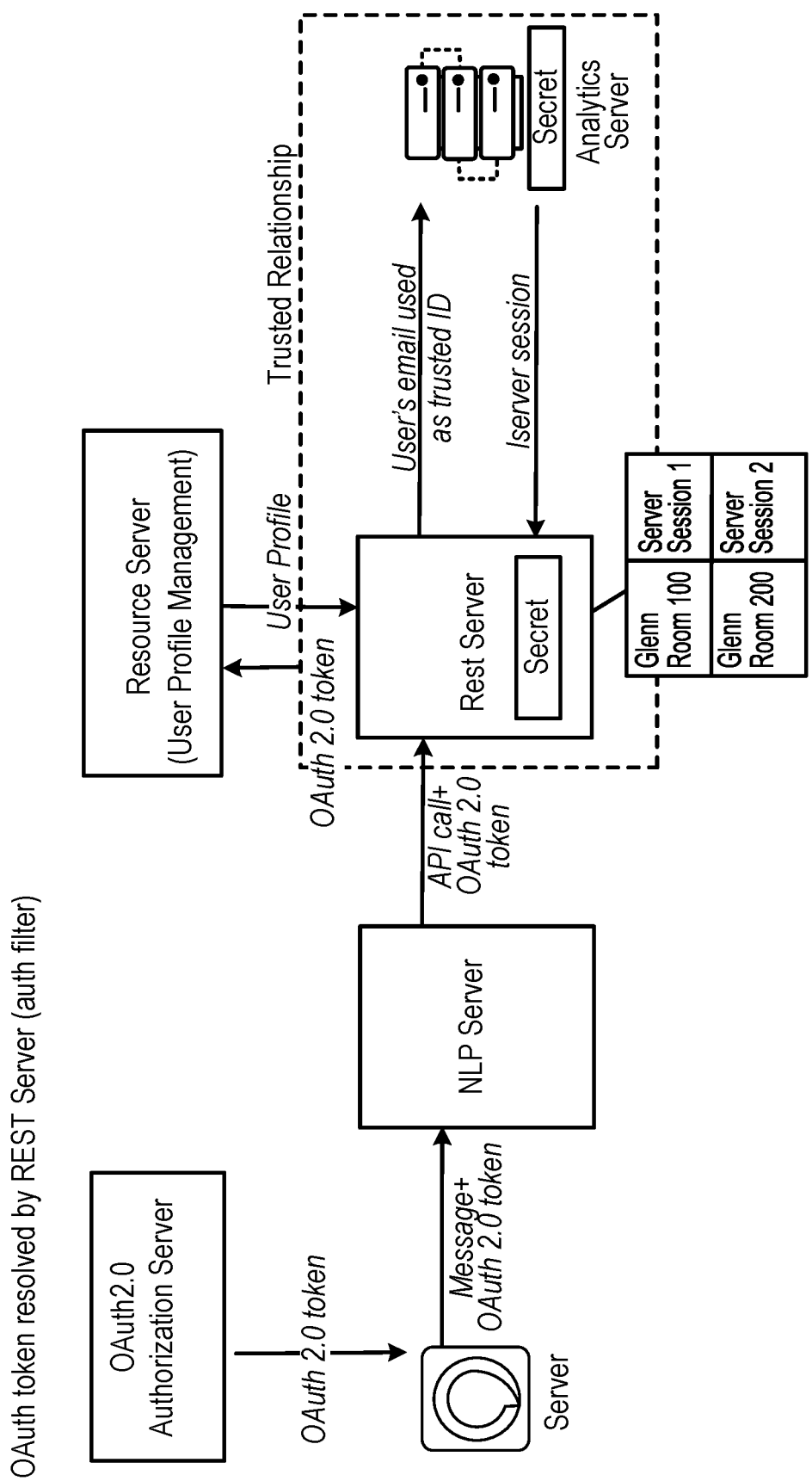
FIGS. 10 and 11 show different examples of techniques for authenticating a user of an automated response system.
Figure 11:
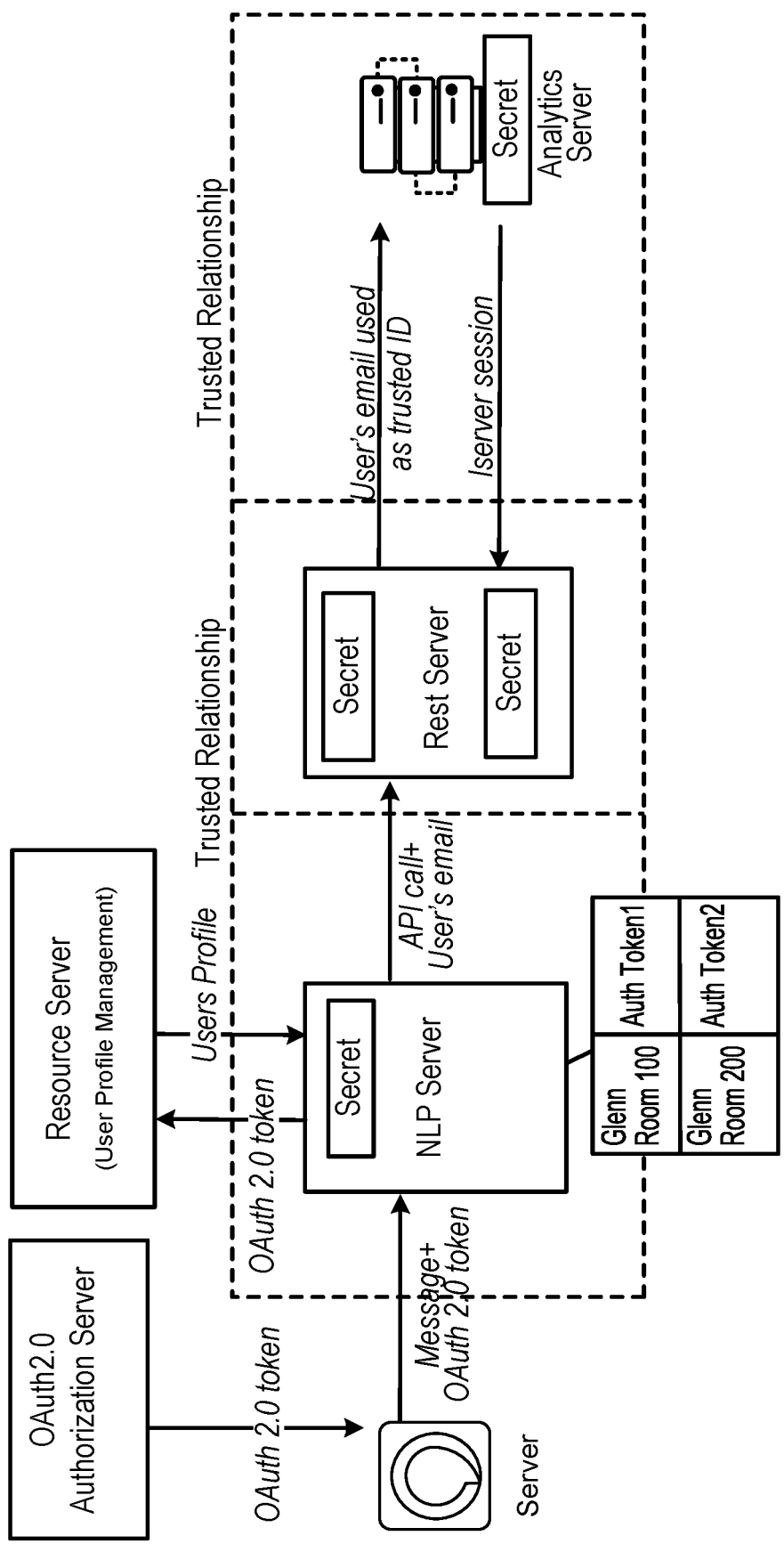

Referring to FIG. 10, authentication of the user can be performed using a token (e.g., an Open Authentication (OAuth) 2.0 token), which is resolved by the library REST server. Referring to FIG. 11, an alternative approach can have the REST server resolve a token.

Figure 12:
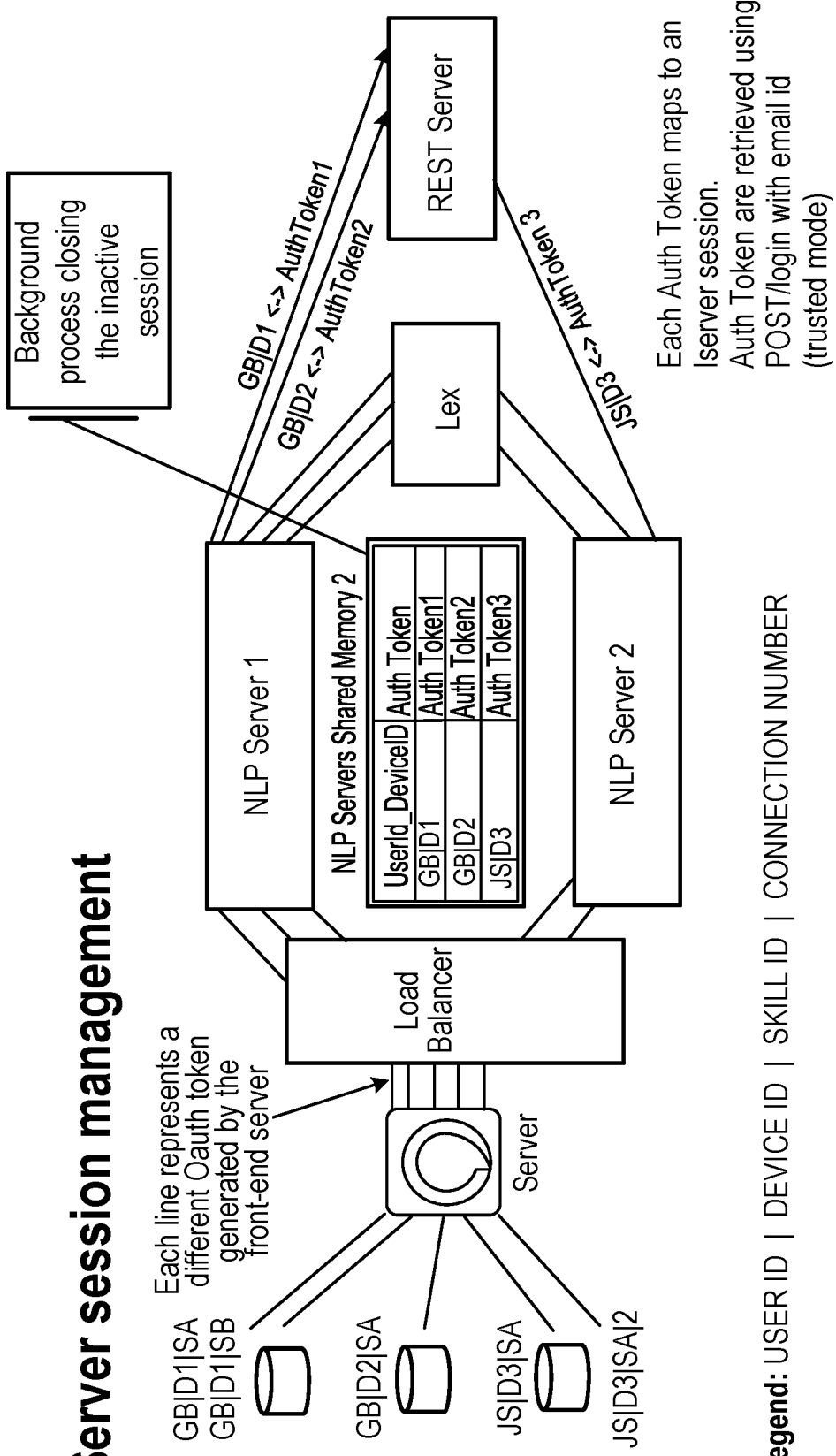
FIG. 12 shows an example of session management and load balancing in an automated response system.

FIG. 12 shows an example of session management and load balancing in an automated response system.

Figure 13:
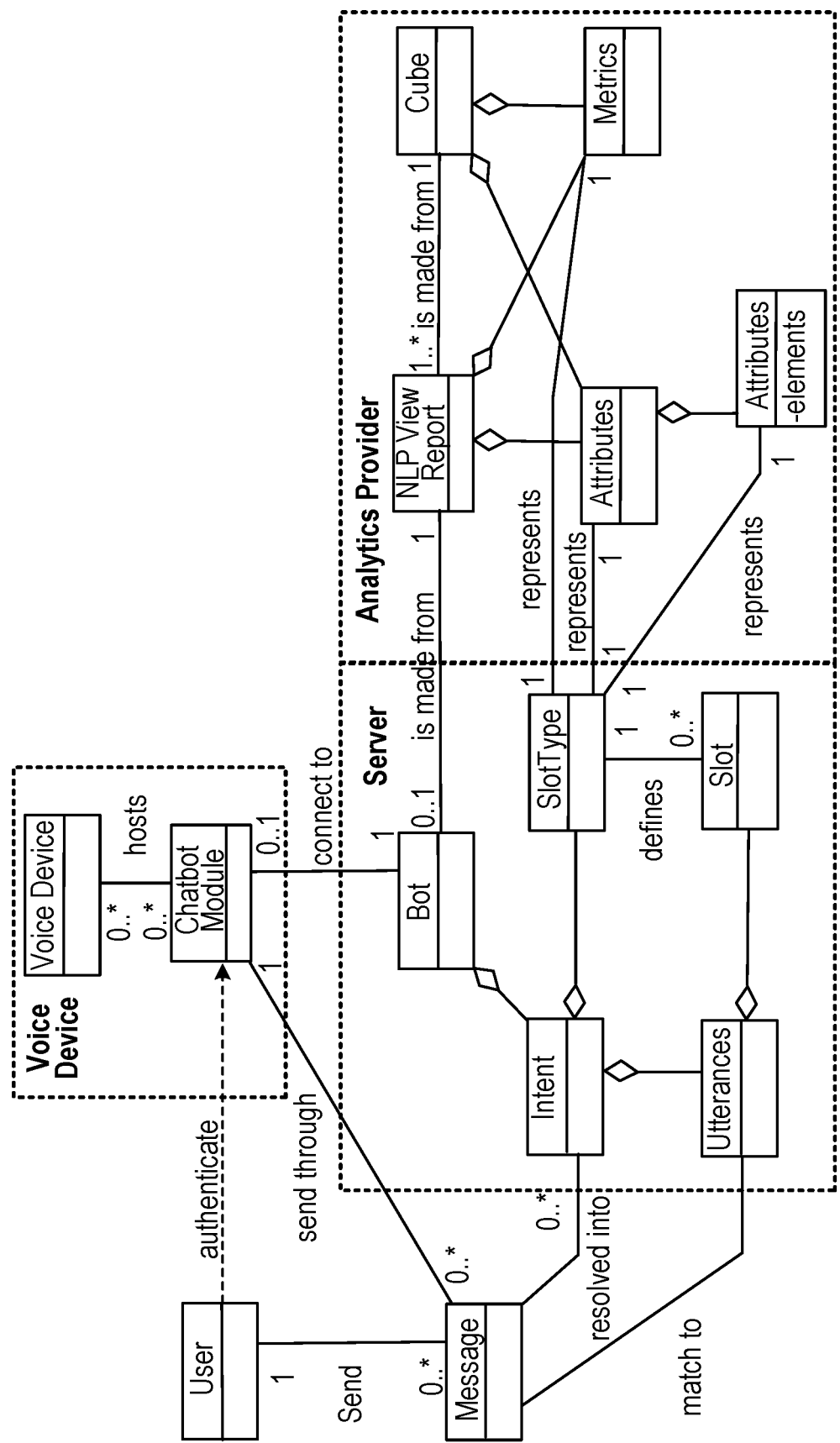
FIG. 13 shows a block diagram indicating relationships among elements in an automated response system.

FIG. 13 shows a block diagram indicating relationships among elements in an automated response system.

Figure 14:
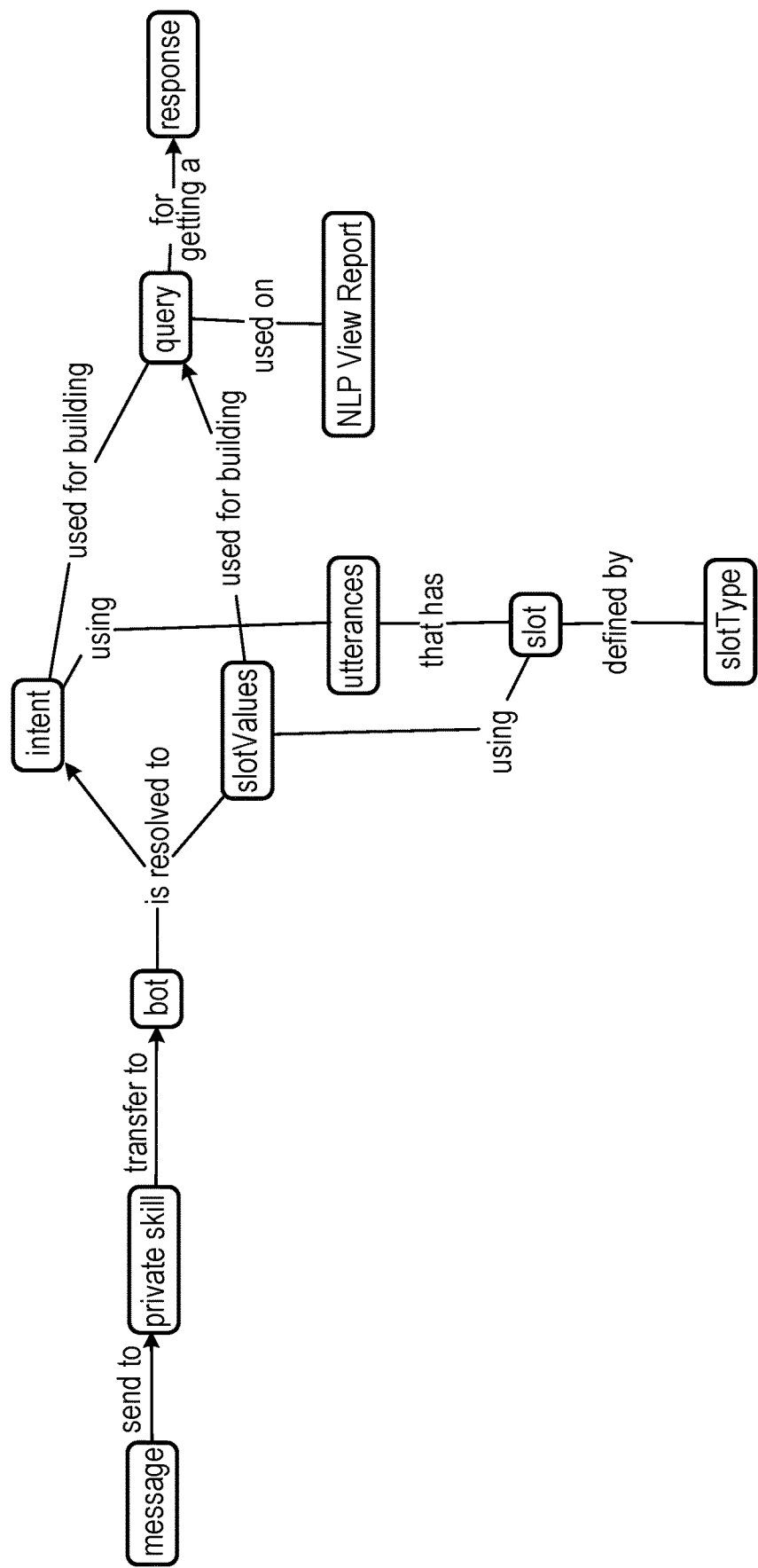
FIG. 14 shows an example of how an interactive agent interprets a query and obtains a response.

FIG. 14 shows an example of how an interactive agent interprets a query and obtains a response.

Figure 15:
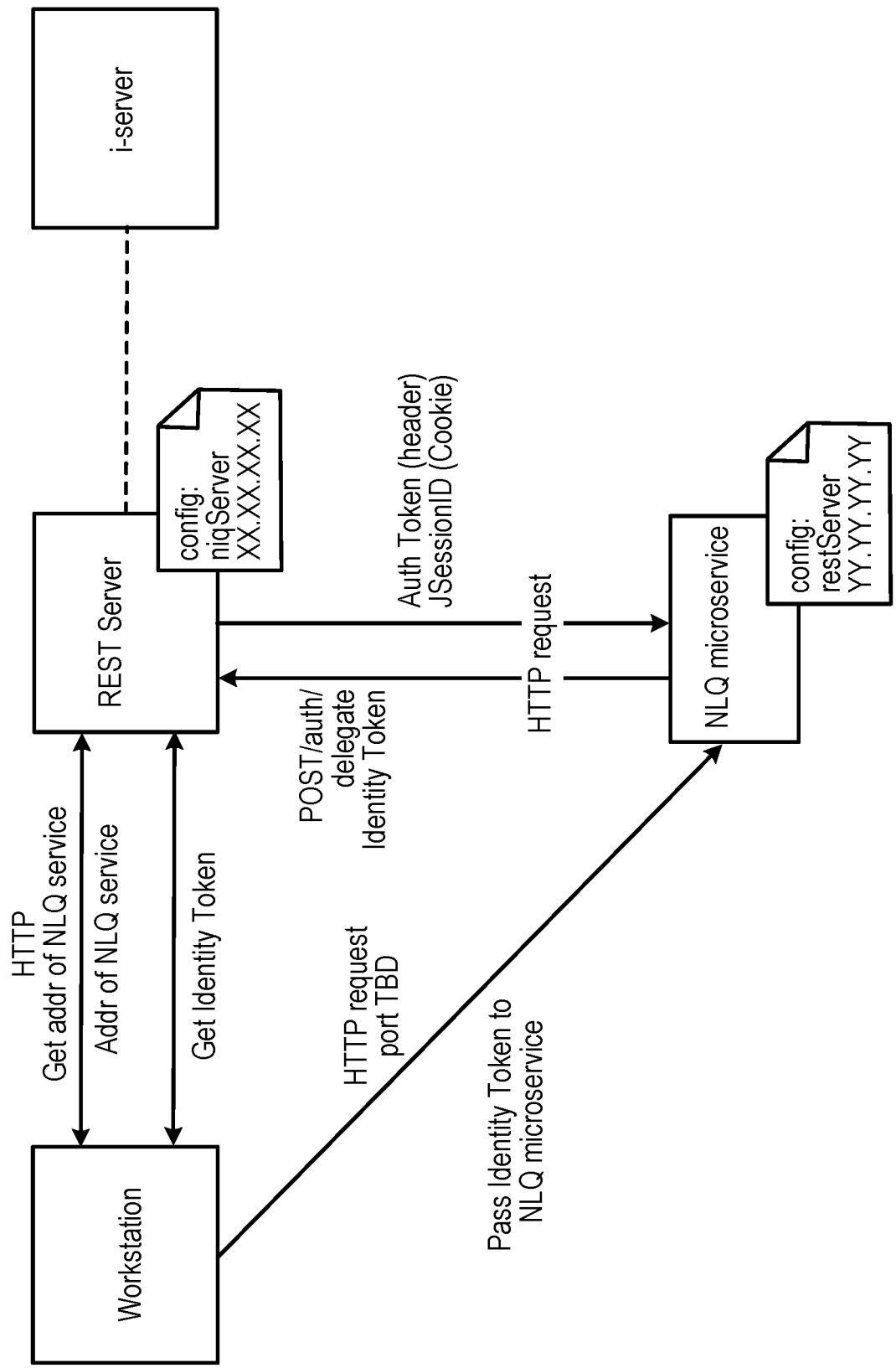
FIG. 15 shows another example of an authentication process for an automated response system.

FIG. 15 shows another example of an authentication process for an automated response system.

Figure 16A:
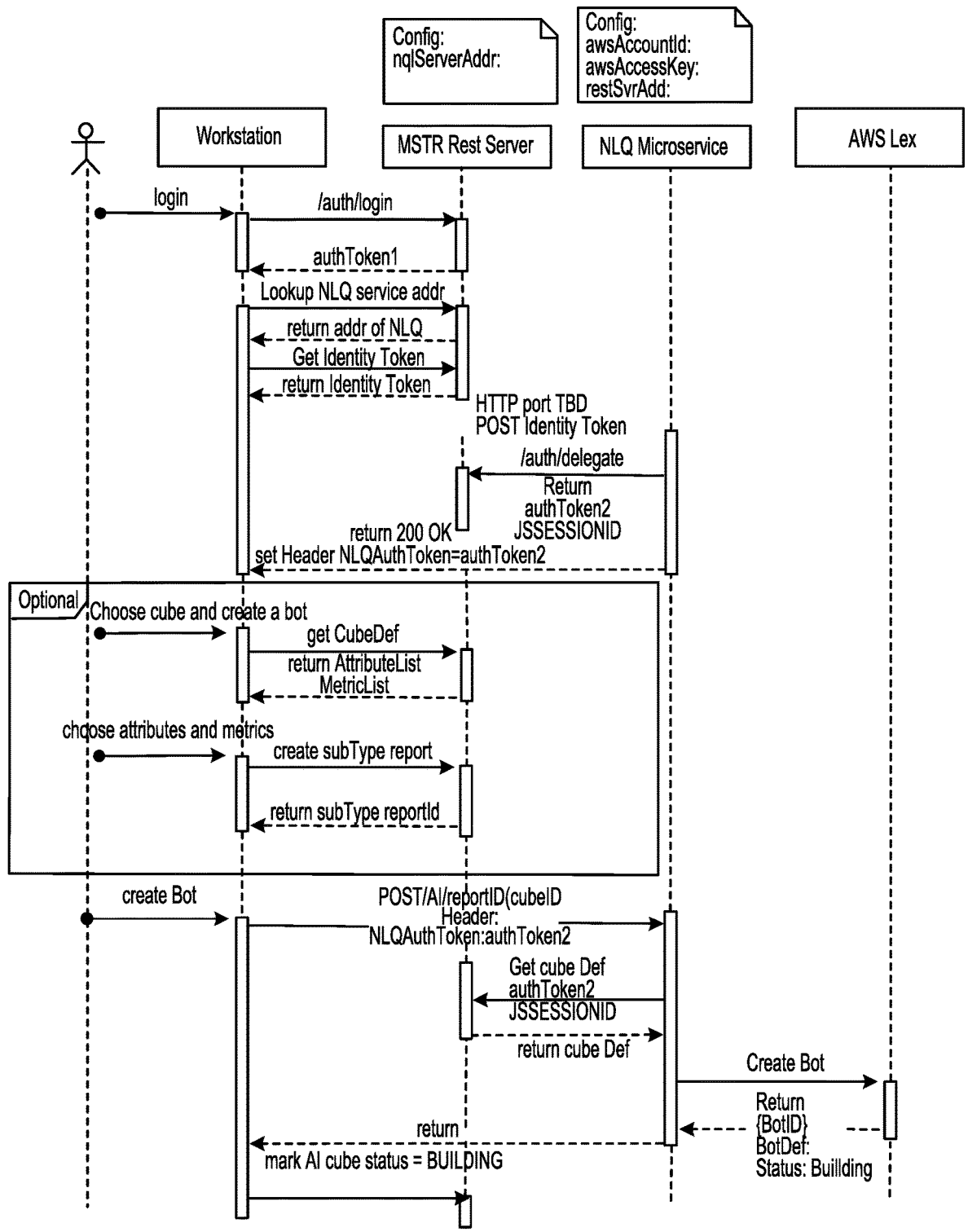
FIGS. 16A-16B show an example of actions performed to generate an interactive agent module for a data set.
Figure 16B:
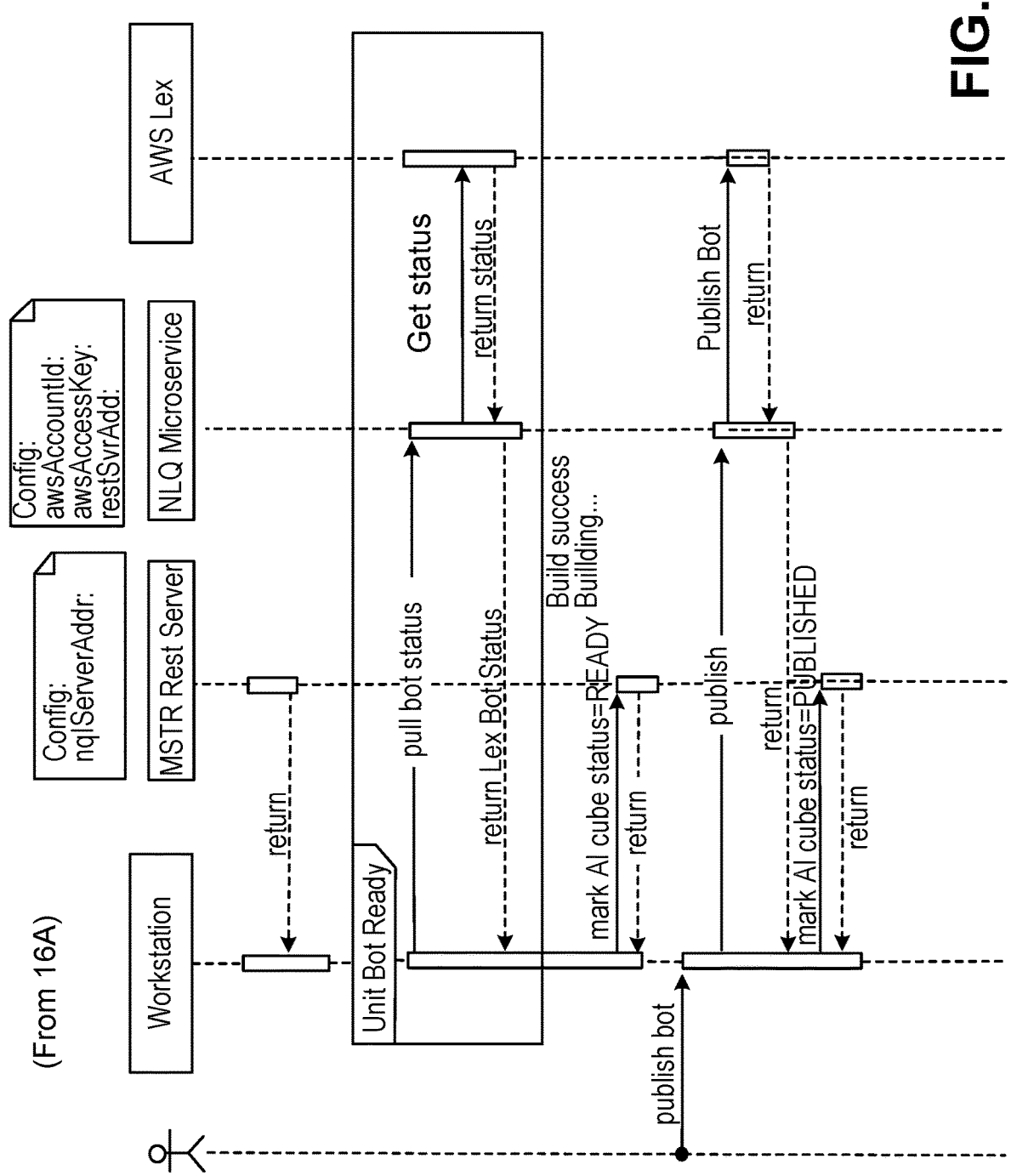

FIGS. 16A-16B show an example of actions performed to generate an interactive agent module for a data set.

Figure 17:
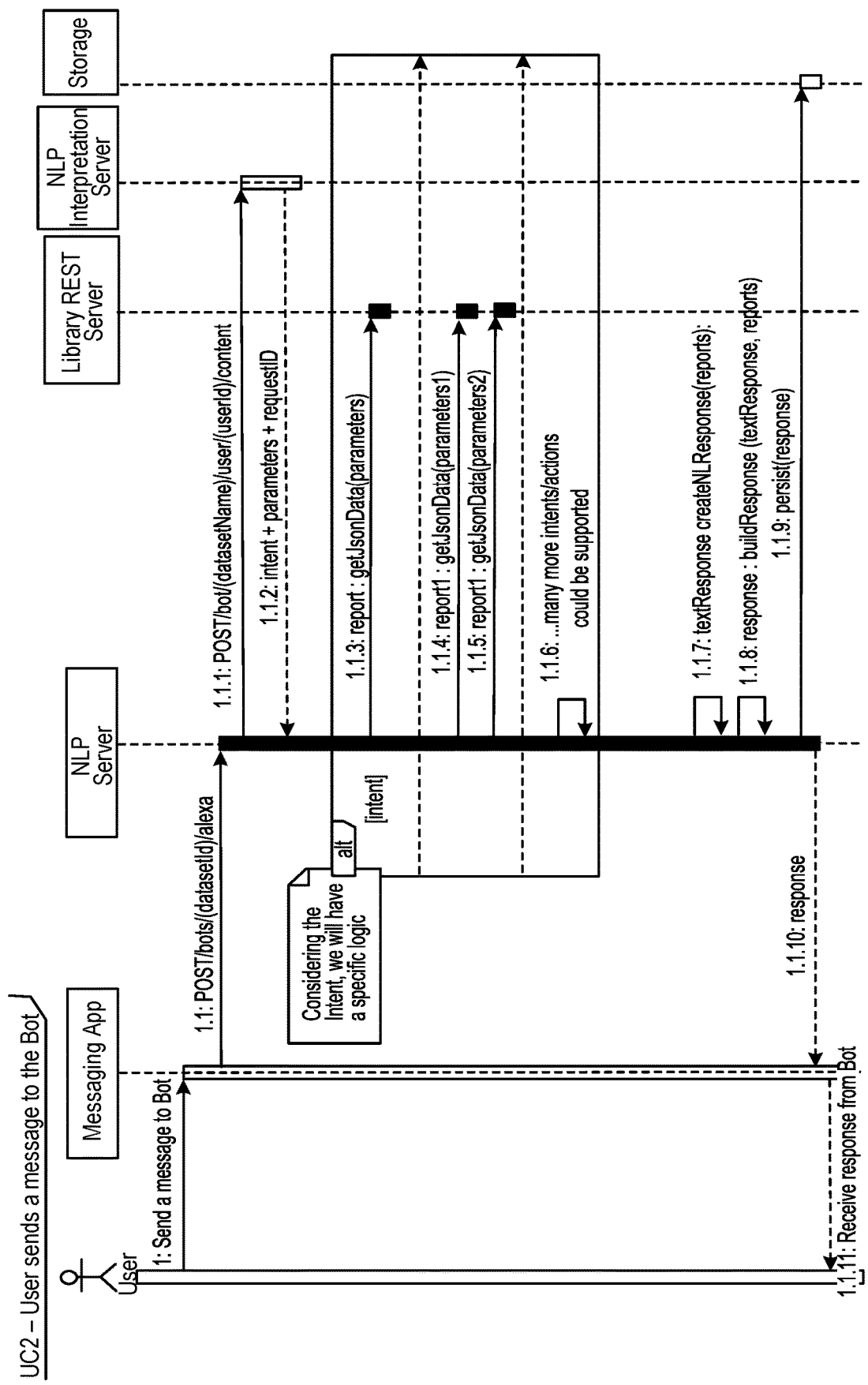
FIG. 17 shows an example of actions performed to respond to a query.

FIG. 17 shows an example of actions performed to respond to a query. The figure shows a process in which a user sends a message, a messaging application forwards the request to a NLP server, which then communicates with a library REST server, a NLP interpretation server, and storage to build a response and provide it through the messaging application. The NLP interpretation server extracts an intent (e.g., a request type inferred from the natural language) and parameters (e.g., keywords or identifiers representing data objects mentioned), and provides these to the NLP server. The NLP server then requests values for the various parameters from the Library REST server and uses these to generate a response to the user's message.

Figure 18:
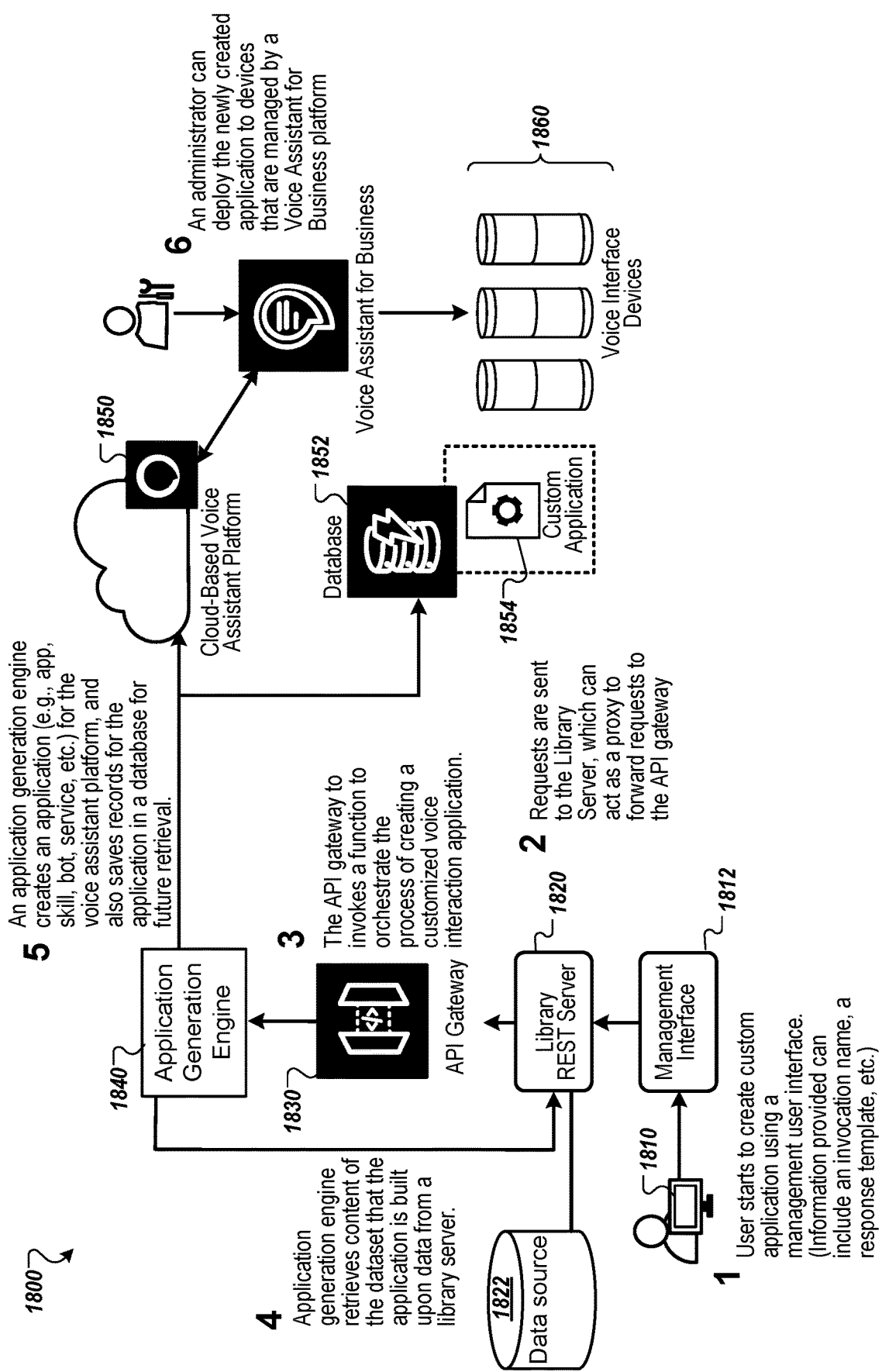
FIG. 18 is a block diagram that illustrates an example of a system for generating a voice response application.

FIG. 18 is a block diagram that illustrates an example of a system 1800 for generating a voice response application. The system 1800 includes a user device 1810 which provides access to a management interface 1812. The system 1800 also includes a library REST server 1820 and a corresponding data source 1822, an API gateway 1830, an application generation engine 1840, a voice assistant platform 1850 and a corresponding database 1852, and voice interface devices 1860.

In the example of FIG. 18, a user leverages the capabilities of the system 1800 to generate a custom voice response application 1854 that is based on and can access data from a data source 1822. The data source 1822 can be a private data source, such as a database, a data cube, a data repository, a data set, etc. The custom application 1854 can be, for example, a chatbot, a skill, a service, a microservice, or other module that extends the functionality of the voice assistant platform 1850. The example shows six stages, marked 1 through 6, representing operations and data flow, which can be performed in the order indicated or in another order.

In stage 1, a user accesses the management interface 1812 using the client device 1810. The management interface 1812 can be an administrative tool provided for managing a computer system. The user can select a data set or an information card and initiate the generation of a custom application. An example of this process is shown with respect to FIGS. 20A-20G. The user can provide information such as an invocation name, a response template indicating answer formats, and so on. This information can be provided in one or more requests to the library REST server 1820.

In stage 2, the library REST server 1820 forwards requests to an API gateway 1830. The API gateway 1830 may serve as an interface for the server 1820 to communicate with infrastructure of a third-party platform, such as a third-party voice assistant platform.

In stage 3, the API gateway 1830 invokes functions to orchestrate the process of creating a customize voice response application. For example, the API gateway 1830 can provide data of the requests in a format that is usable by the application generation engine 1840 to define the interaction capabilities for the application and to access data from the data source 1822.

In stage 4, the application generation engine 1840 retrieves content from the data source 1822, according to the requests that reflect the initial user input. For example, the user may specify a data set, and the application generation engine 1840 may obtain information indicating the data objects (e.g., attributes, metrics, etc.) that are included in the data set. As another example, the user may specify an information card that presents certain data objects from the data source 1822. The application generation engine 1840 can access metadata identifying these data objects, and corresponding keywords or identifiers, potentially from the data source 1822 or from specification data of the information card.

In stage 5, the application generation engine 1840 creates a custom application 1854 based on the retrieved data. For example, the application generation engine 1840 defines applicable voice inputs and input formats that the custom application 1854 is configured to answer. The application generation engine 1840 also defines response formats for responses to provide. The response formats can include place holders representing one or more data objects, so that when a response is generated, the custom application 1854 causes the current value of the data object to be retrieved from the data source 1822.

As an example, for a data set involving employees, data objects may include name, phone number, office location, job title, etc. The custom application 1854 can be defined with keywords that represent references to the respective data objects. The custom application 1854 can also include information that allows access to the values for these data objects in the data source 1822, e.g., an indication of database tables and columns that contain the data for these data objects. The custom application 1854 can also indicate the location to find identifiers for the different entities (e.g., specific employees) the application provides information about, e.g., a list of names and/or employee identifiers of employees for an organization. The custom application 1854 can be defined so that, when a user ask a question regarding a particular employee, the custom application 1854 enables the voice assistant to identify the entity referred to, the data object referred to, and the location to obtain the value of the data object for that entity. For example, a user may ask "which office is John Doe in?" The custom application 1854 provides the voice assistant the links to the data source 1822 to (i) identify "John Doe" as a specific entity the custom application 1854 can provide information about, (ii) identify "office" as a reference to the "office location" data object, and (iii) retrieve the current value of the "office location" data object for employee "John Doe" from the data source 1822, so that value can be used in a response to the user.

Once the custom application 1854 is created, the custom application 1854 and any associated configuration data can be stored in a database 1852 associated with the voice assistant platform 1850. In some implementations, the voice assistant platform 1850 and the database 1852 are implemented as a cloud computing system. The information for the custom application 1854 can include a list of data objects and entity types for which the custom application 1854 can provide information. Nevertheless, typically metadata for the data objects is stored (e.g., keywords, data type information, location in the data source 1822) and the actual values are not stored. In many cases, the values for the data objects are retrieved dynamically in response to user requests. Often, the values are obtained from a separately managed or provided data source 1822, such as a private data source for an organization.

In stage 6, the custom application 1854 is deployed so it can be used by users. In some implementations, the custom application 1854 may be transmitted to voice interface devices 1860, where it may be stored and used locally by those devices. In some implementations, the custom application 1854 is not transmitted to specific voice interface devices 1860, but is stored by the voice assistant platform 1850 and is associated with specific user accounts. For example, an administrator can specify user accounts that receive or are authorized to receive access to the functionality of the custom application 1854.

In some implementations, the deployment of the voice response application is customizable by an administrator. For example, a user interface can be provided for a user to choose which devices and/or users receive access to the functionality. For example, the interface can list voice response devices registered to the company or organization, e.g., in a logical hierarchy how device and accts are organized. The voice response application can then be designated to be selectively deployed to specific users or devices. The deployment may limit the features available to some devices or at some locations also. For example, one group of devices may have one set of capabilities, and another group of devices in less public areas may be granted greater capabilities (e.g., access to additional data objects, allowing a greater set of actions with respect to the data objects, etc.)

Figure 19:
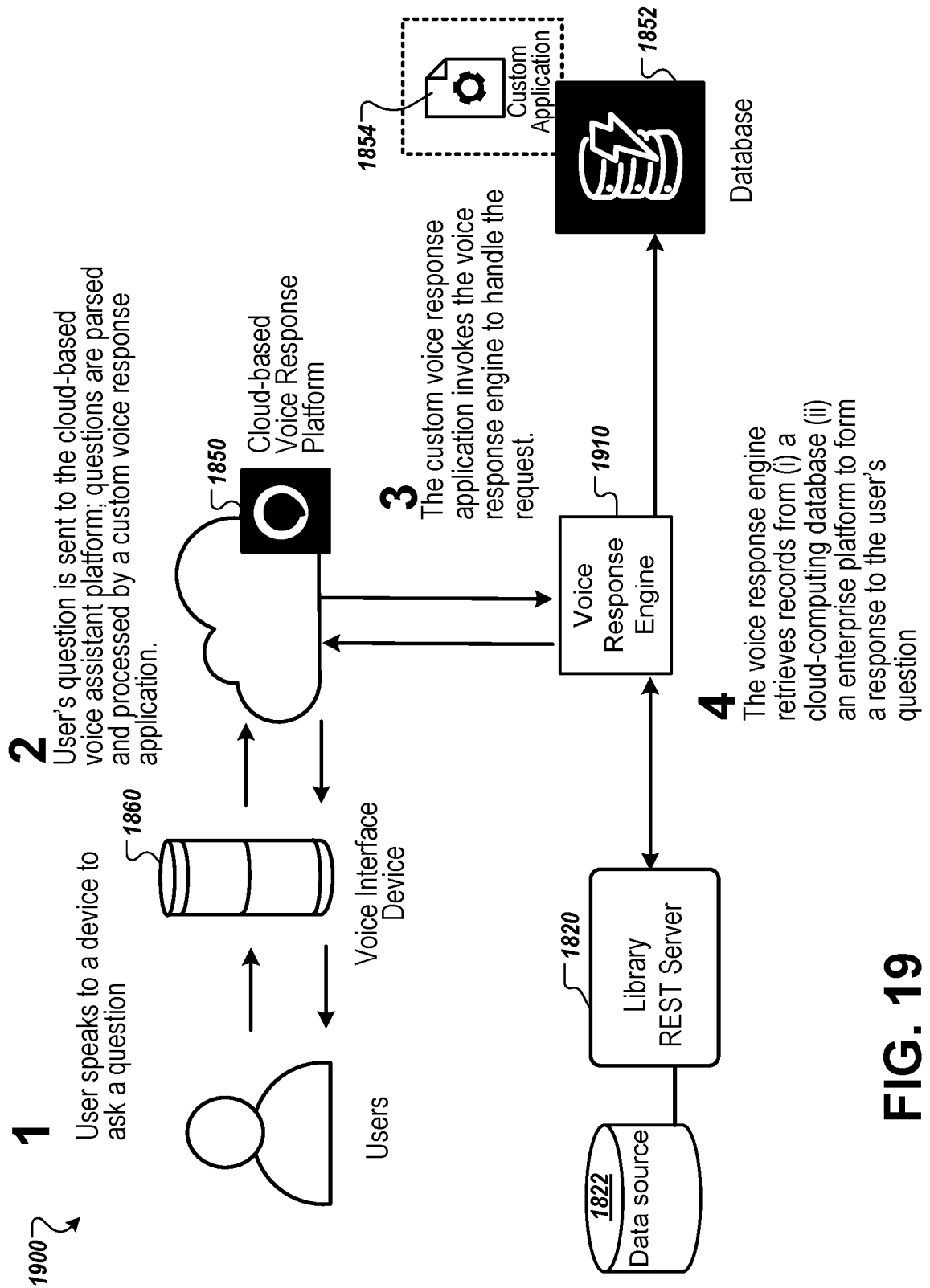
FIG. 19 is a block diagram that illustrates an example of a system for using a voice response application.

FIG. 19 is a block diagram that illustrates an example of a system 1900 for using a voice response application. For example, after the custom application 1854 is created and deployed as discussed for FIG. 18, a user can access the functionality of the application 1854 as shown in FIG. 19. The example shows several stages, identified as 1 to 4, that indicate operations and data flow.

In stage 1, a user provides a voice input by speaking to a voice interface device 1860.

In stage 2, the voice interface device 1860 provides the voice input (e.g., as audio data and/or text obtained through automatic speech recognition) to the voice assistant platform 1850. The voice input can include an invocation name that was defined for the custom application 1854. The voice assistant platform can compare the terms of the voice input with the invocation names of available applications. When the voice input in a conversation includes the invocation name for the custom application 1854, the voice assistant platform can activate and use the custom application 1854 to generate a response to the most recent voice input or to later voice inputs.

In this example, the voice assistant platform 1850 determines that the voice input refers to the custom application 1854, and the voice assistant platform 1850 activates the custom application 1854 in response.

In stage 3, the custom application 1854 invokes a voice response engine 1910 to handle the request. The voice response engine 1910 can be a component of the voice assistant platform 1850. The custom application 1854 may receive information from the voice assistant platform 1850, such as keywords of the voice input and an intent determined from the voice input. The custom application 1854 may in turn formulate requests to the voice response engine 1910 indicating text of propose responses, a grammar or language pattern to use for a response, an identification of data objects for which values need to be retrieved, and so on.

In stage 4, the voice response engine 1910 can use information from both a database 1852 for the voice assistant platform 1850 and the data source 1822 of another organization to generate the response to the voice input. Based on the information from the custom application 1850, the voice response engine 1910 can generate and send requests for values of data objects needed to generate a response. These requests can be sent to the library REST server 1820. The voice response engine 1910 can also access metadata from the database 1852 that indicates data types for different data objects, keywords for the data objects, and so on. These and other data can be used by the voice response engine to formulate text of a response to the voice input, and then generate audio data for a synthesized speech output of the response text. The audio data is provided to the voice interface device 1860 and then output as audio to the user.

FIGS. 20A-20G are diagrams showing example user interfaces 2000-2006 for creating a voice response application. These interfaces 2000-2006 show an example how the system can create voice response functionality from an information card. For example, the system can create an application, which is used herein to represent a "skill," "service," "microservice," "chatbot," or other module that can be integrated with or used in a voice assistant platform. One example is a skill that can be integrated with or used by the AMAZON ALEXA voice assistant. The series of interfaces 2000-2006 shows example interactions with a user, which allow the user to obtain voice response functionality that can then be deployed and used as discussed above, with the voice response functionality customized for the user's data set and key indicators included in the information card.

The voice response application can be defined in a customized manner to enable interactions that make use of information in a private data source, such as an organization's private database. The application can connect the voice assistant with a private data source, so that the voice assistant is enabled to obtain data objects (e.g., attributes, metrics, or other values) from the private data source and include those data objects in responses to voice inputs. The process of generating the application can use the characteristics of the information card to specify the types of interactions that the application supports on the voice assistant platform. For example, keywords and object metadata can be extracted from or determined using specification data for an information card. This information can be used to associate keywords with corresponding data objects and their storage in a data source. As a result, the application can extend the functionality of a voice assistant to answer questions about some or all of the elements shown on an information card.

Information cards can provide a set of highly relevant information for an entity or class of entities. The content and layout of the information card can be customized by a user or an organization. Similarly, the information card can be configured to provide or represent data objects from a private data source. The information card can represent a collection of data objects that are most relevant for or most frequently used by users of an organization, with the data objects having values derived from records of the organization. The voice response application can enable a third-party voice response system to detect references to the data objects in voice inputs and to retrieve values for the reference data objects to use (e.g., include) in responses to voice inputs. Thus the application, generated based on a customized information card, can provide users in an organization a way to ask questions to a third-party voice assistant system about the items and topics on the information card. The application allows the third-party voice assistant system to provide responses that include up-to-date information obtained from the organization's private data collections in response to the voice inputs.

In the process of creating the voice response application, the user is not required to specify the information from the information card to be used or the links to a data source to obtain the data objects and values for the information card. The computer system can rely on the specification data that is used to define the information card, and metadata of the corresponding data set the information card relies on, to provide the information needed to enable questions and answers about those data objects.

Figure 20A:
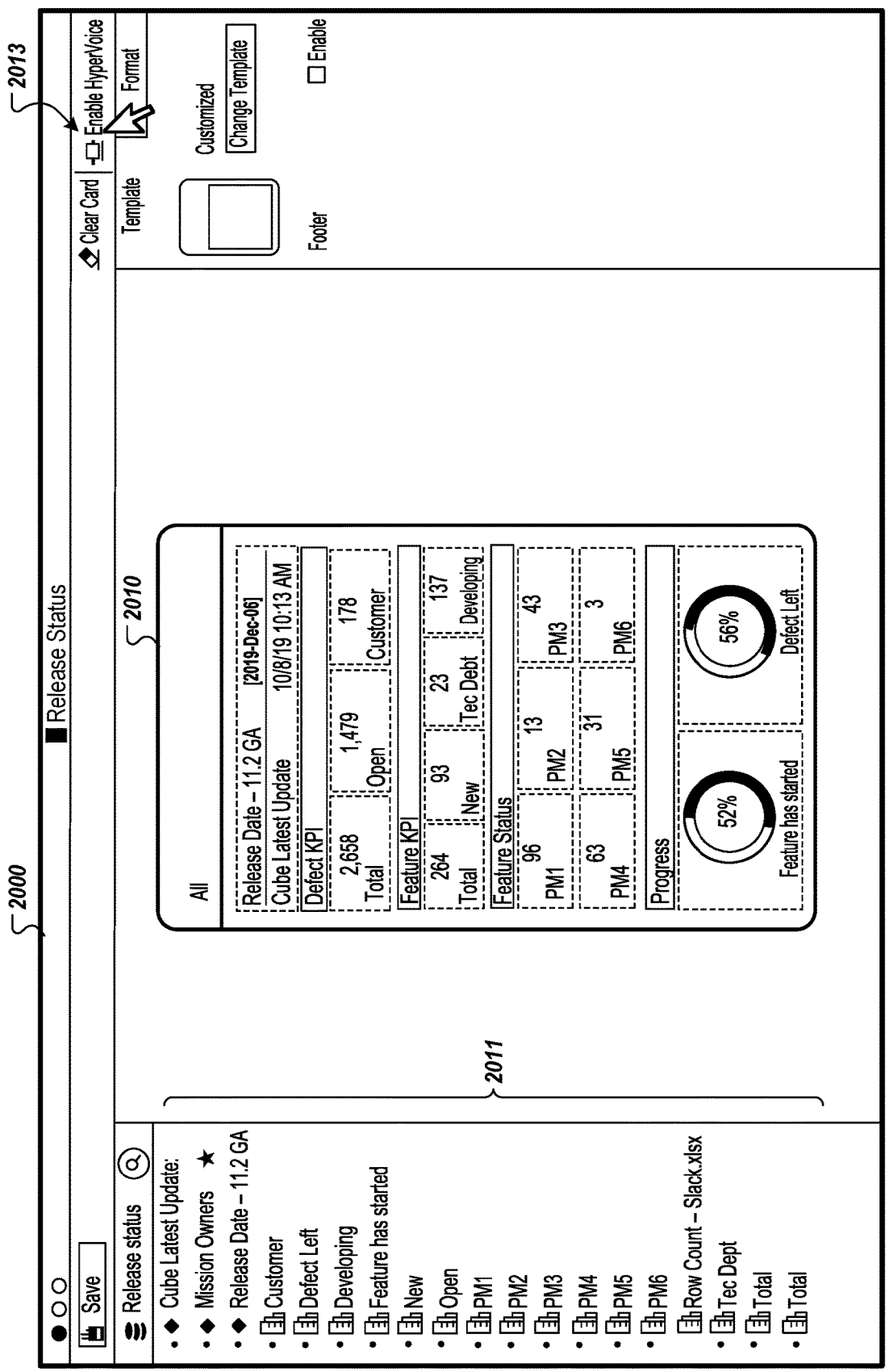

FIG. 20A shows a user interface 2000 that displays an example information card 2010 representing release status information for a software project. The interface 2000 shows a set of data objects 2011 that are associated with the information card 2010, e.g., data objects whose values are retrieved to generate and display a view of the information card 2010.

The information card 2010 can be linked to a data set, such as the "release status" data set 2012. The information card 2010 relies on the data set 2012, for example, to be refreshed with up-to-date values for the data objects when a view of the information card 2010 is generated. Examples of data objects include "PM1," "PM2," and "PM3," and the values for these shown in the information card are 96, 13, and 43 respectively.

The user interface 2000 or another interface can enable a user to edit the information card 2010, for example, altering text and formatting, changing which data objects are presented, and so on. To facilitate this customization, other data objects from the data set 2012 can be listed, along with controls for adding them to the information card 2010 (e.g., by selection, by drag-and-drop to the view of the information card 2010, etc.).

The content and layout of the information card 2010 can be stored as information card specification data. The specification data can indicate, among other items, the data objects to be presented in the information card 2010, how those data objects should be arranged, and retrieval information (e.g., storage locations, identifiers, addresses, etc. to enable current values of the data objects to be retrieved).

The information card 2010 can represent the types of information shown for any entity in a class or type of entities. For example, although a representative information card 2010 may be shown for a specific project's release status, the information card 2010 can represent the type of information that would be presented for the release status any and all of multiple different projects. Thus, by enabling the voice assistant for the information card 2010, the voice assistant can gain the ability to provide the types of information shown in the information card for any of multiple entities, with the ability to retrieve the specific values of the data objects for whichever specific entity the user of the voice assistant may indicate. As an example, if the information card represents employee information (e.g., years of service, current department, job role, etc.), enabling the voice assistant for the employee entity type information card can enable a user to ask about the employee information for, e.g., Laura, David, or any other employee in the associated data set or data source.

The user interface 2000 includes a control 2013 to enable the content of the information card 2010, and thus the portions of the data set 2012 used by the information card 2010, to be made accessible through a voice interface, such as a voice assistant (e.g., digital conversational assistant). In response to selection of this control 2013, the system initiates the process of enabling access to these data objects through the voice assistant. In some implementations, it is desirable to limit the set of data objects that are exposed to the voice assistant to those shown in or relied on by the information card 2010. In other implementations, a larger set of data objects can be made accessible through the voice assistant in this process, such as all data objects related to the entity or entity type for the information card 2010, or optionally all data objects in the data set 2012.

In the example, a user interacts with the control 2013, and the system responds by initiating the process of generating a customized voice response application. In some implementations, the system can use a default set of information to generate the voice application, enable access to the data objects of the information card 2010 without further user input (e.g., with a single click). In other implementations, the system show additional user interfaces enabling the user to customize behavior of the voice assistant when providing information related to the information card. In the current example, the system transitions from the interface 2000 to the interface 2001 of FIG. 20B.

Figure 20B:
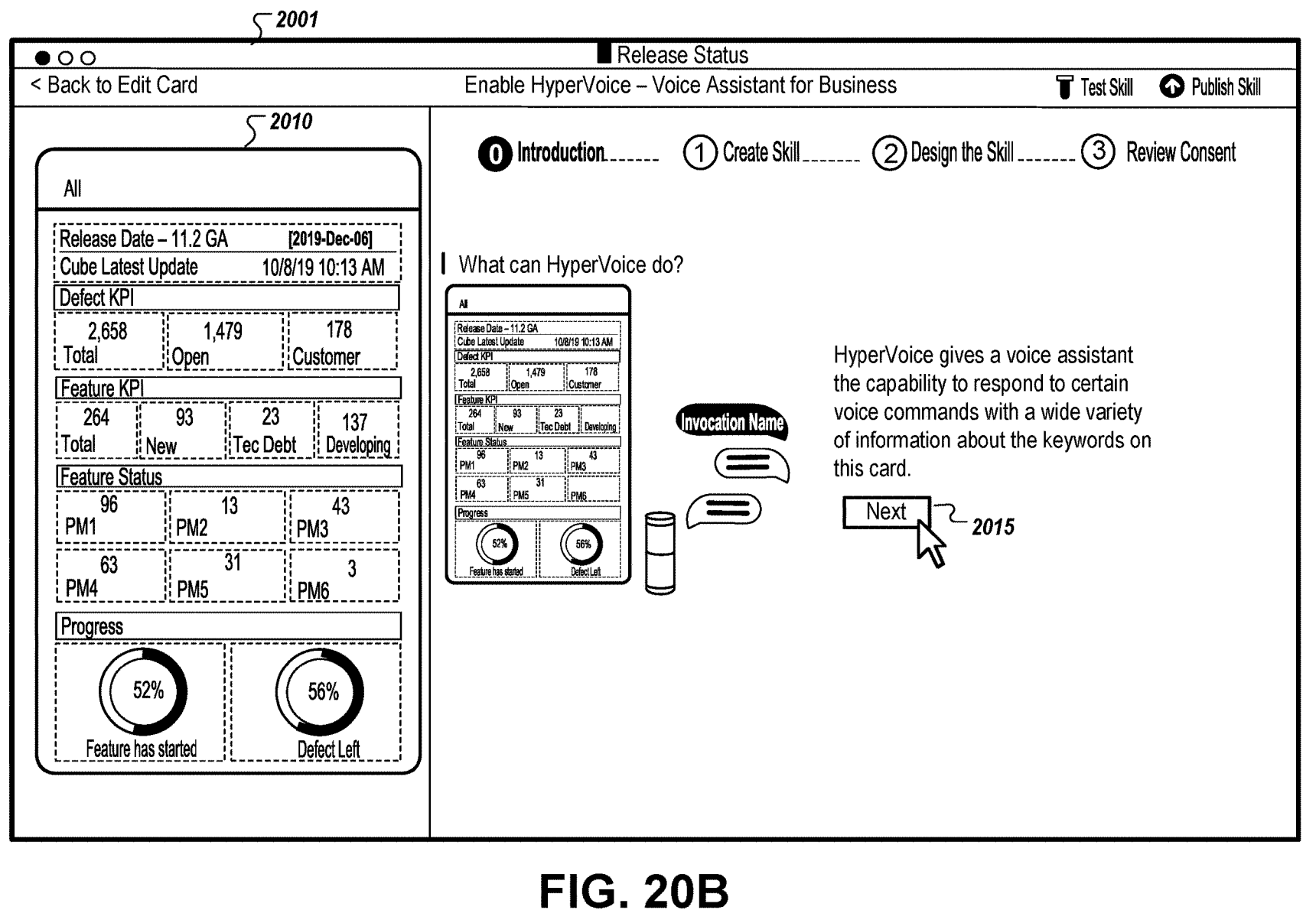

FIG. 20B shows an interface 2001 that includes an explanation of the process for generating the voice response application. This includes explaining that the process gives a voice assistant the capability to respond to voice commands with information related to the keywords and data objects on the information card 2010. In the example, the user selects a control 2015 to proceed with the process.

Figure 20C:
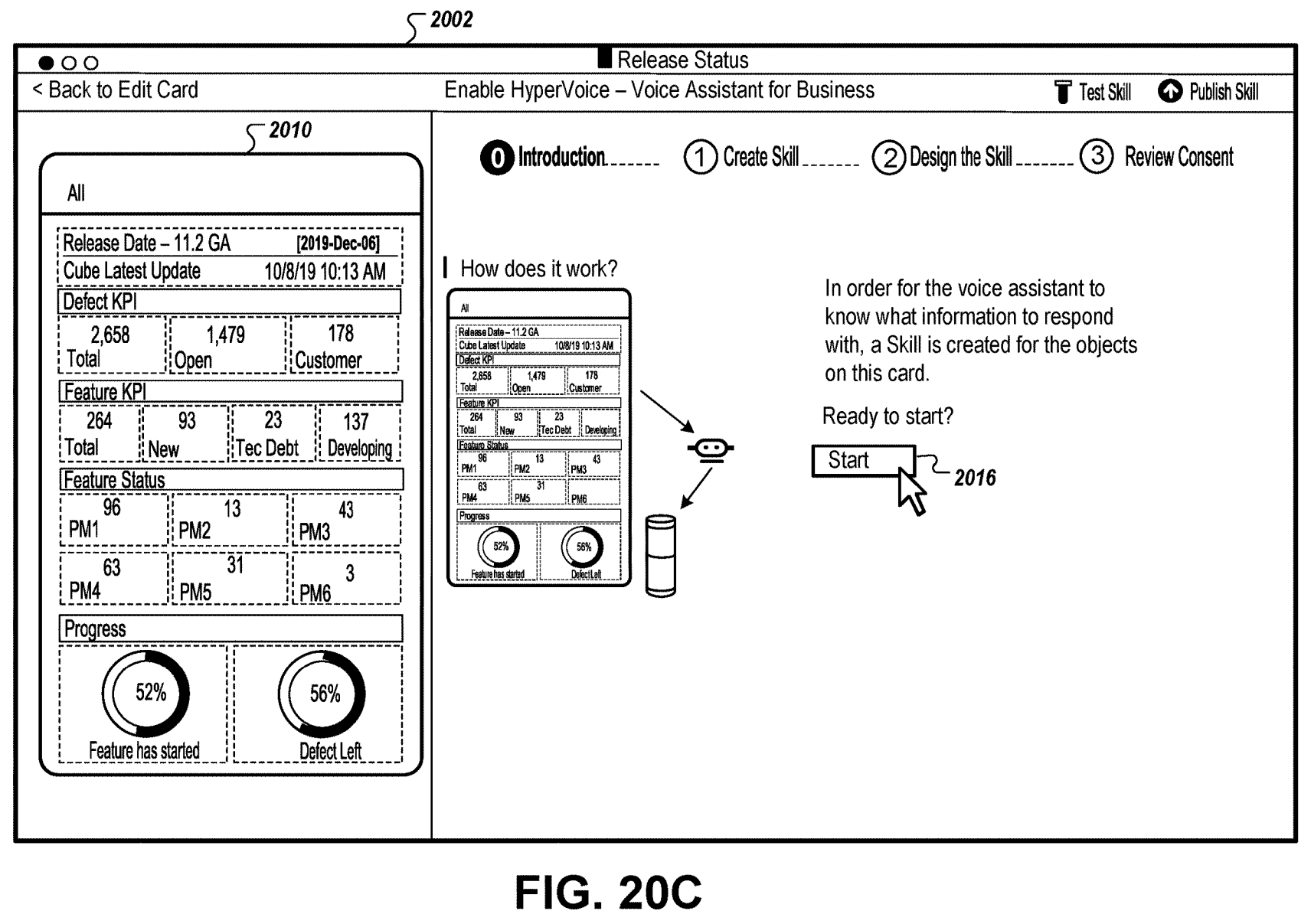

FIG. 20C shows an interface 2002 that explains that the voice assistant functionality can be provided as an application or "skill" that can extend the functionality of a voice assistant. For example, the application can extend the capabilities of a third-party, cloud-computing-based voice assistant platform. The application can be selectively enabled for users in an organization to allow those users to access to an organization's private data through the third-party voice assistant. In the example, the user selects a control 2016 to proceed with the process.

Figure 20D:
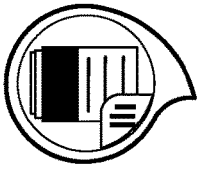

FIG. 20D shows an interface 2003 that includes controls (e.g., text fields, drop-down boxes, etc.) enabling a user to provide information for the application being generated. The controls enable a user to, for example, set a logo, set a name for the application, add a description, select a category, and indicate a keyword type for the application. In the example, the user selects a control 2017 to proceed with the process.

Figure 20E:
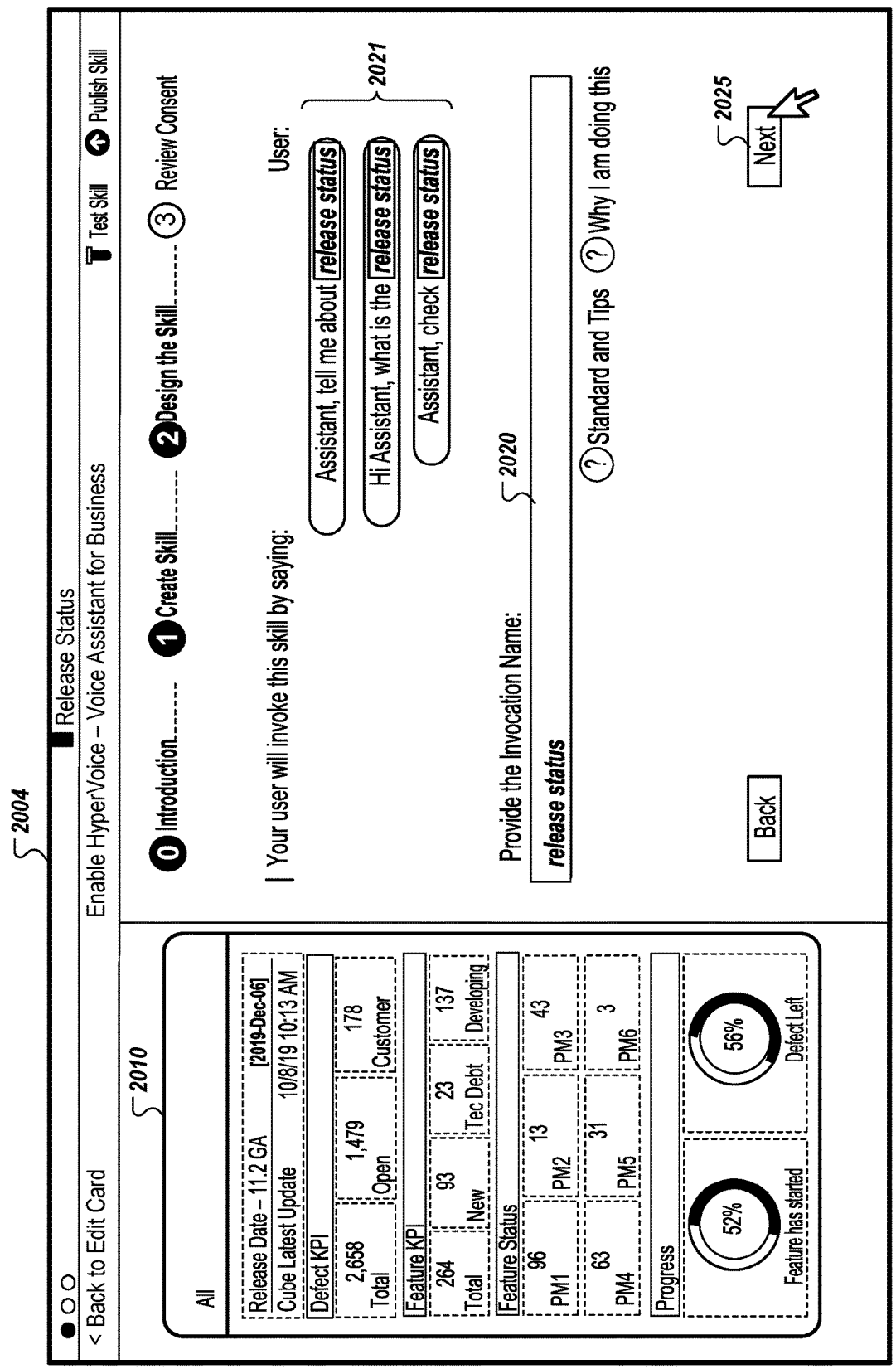

FIG. 20E shows an interface 2004 that includes a control 2020 for entering an invocation name for the application. The invocation name can be a keyword (e.g., a predetermined word or phrase) that can signal that access to the information using the application is desired. In this example, the invocation name is "release status," which indicates the topic associated with the information card 2010, the type of data it presents (e.g., the data in the data set 2012).

The interface 2004 also includes examples of phrases 2021 that a user can speak to invoke the application during a conversation with the voice assistant. As indicated, these phrases 2021 can include a set of standard grammars or language patterns, in which the invocation name (e.g., "release status" here) is inserted.

The invocation name is typically different from the wake word or hotword. For example, the user may use the term "assistant" to wake up a device and initiate a conversation, e.g., to signal that a command or other input will follow. On the other hand, the invocation name for the application, e.g., "release status," can be spoken later during the conversation to signal to the voice assistant the topic or data set to which future voice inputs relate. The voice assistant can store data associating invocation names with corresponding applications and their data sets, so that when a match between an input and an invocation name is detected, the voice assistant loads or uses the appropriate application in response. In the example, after entering the invocation name, the user selects a control 2025 to proceed with the process.

Figure 20F:
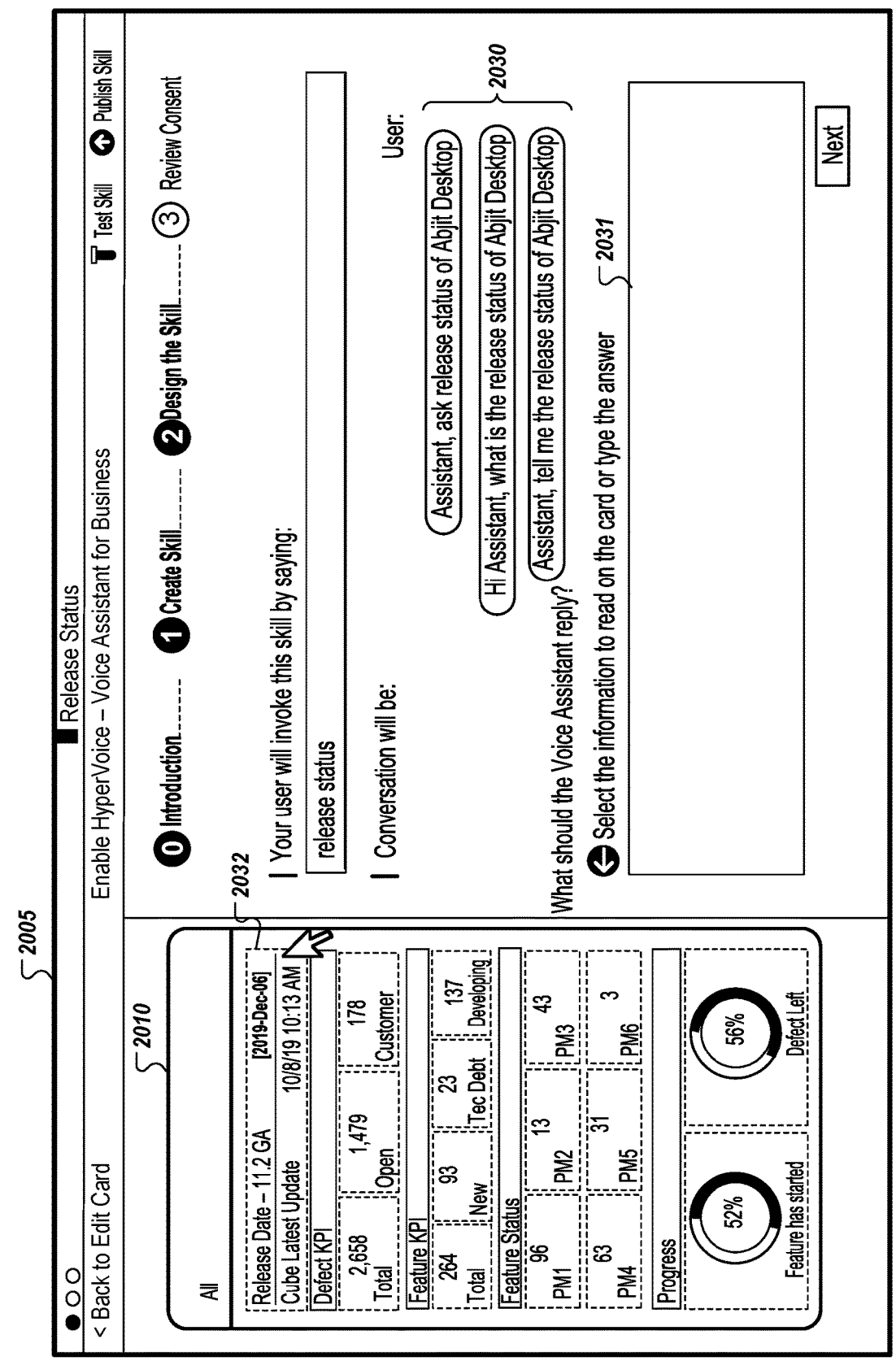

FIG. 20F shows an interface 2005 that shows example interactions that can obtain information based on the information in the information card 2010. For example, example voice inputs 2030 are shown to show different ways a user may request information about a particular entity, in this case, a project called "Abjit Desktop." The interface 2005 provides one or more controls 2031 for a user to specify a response to the example voice inputs 2030. For example, a user can type information to be provided in a text field.

In addition, or as an alternative, the interface 2005 enables the user to select portions of the information card 2010 to insert data objects into the response. The information card 2010 has different regions, shown in dashed lines, which represent different data objects. For example, the region 2032 represents a "release date" data object, which has a value of "[2019-Dec.-06]" for the specific project shown. A user can interact with (e.g., select, tap, click, drag, etc.) the region 2032 of the displayed view of the information card 2010 to cause information for that data object to be added to the response. For example, clicking the region 2032 may insert the text "Release date for [Project_Name] is [Release_Date]," where Project_Name and Release_Date are fields or placeholders to be populated with information about the specific entity (e.g., a specific project in this case) the user is referring to in the conversation.

Figure 20G:
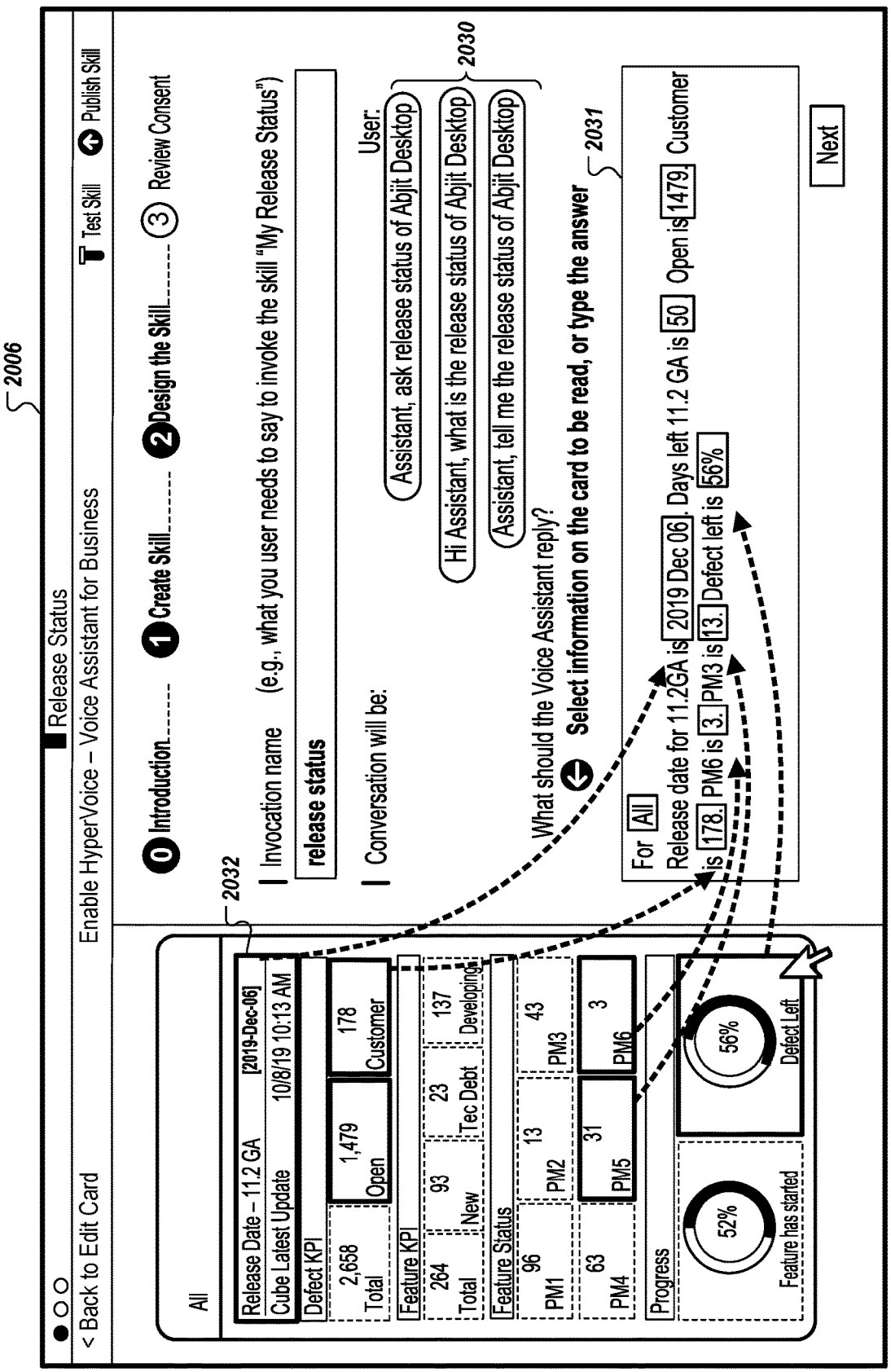

FIG. 20G shows an interface 2006 which shows a sample response that a user populated by selecting regions of the view of the information card 2010. The dashed arrows show a few examples where data values for data objects have been inserted into the text of the sample answer. In this case, specific values for data objects have been presented (e.g., "2019 Dec. 6" for the release date) to illustrate the result for a specific entity, the project "Abjit Desktop." In use, the response format defined in this manner would populate the response with values retrieved from the data set 2012 for whichever entity the user asks about in conversation with the voice assistant.

Note that the interface 2006 shows only one response format defined for one set of voice inputs 2030. Interfaces can be provided so the user can specify other types of voice inputs and corresponding inputs. In some case, the interfaces may enable a user to apply rules to provide context-dependent responses, e.g., to provide different phrasing or different data objects depending on user identity, job role, topic of the conversation, and so on. In some implementations, the user provides a summary-level response for the voice response application, but is not required to provide input and response information for other general interactions.

In addition to enabling user-specified responses, the system can automatically enable responses to voice inputs that reference data objects in the information card 2010. The specification data for the information card 2010 can include metadata that identifies the various data objects and also provides keywords corresponding to the data objects. The system can specify relationships between data objects and extracted keywords (whether from text on the card, from card metadata, or from a data set) and include this as configuration data for the application. Thus, without requiring the user to specify specific question and response patterns for the data objects, the application can be enabled to detect references to specific data objects and provide values for the data objects in response. For example, a user may ask "what is the release date for project 11.2GA?" Based on the configuration data that associated the keyword "release date" with the data object of region 2032, e.g., a Release_Date attribute in the data set 2012, the application can enable the voice assistant to retrieve the value for that attribute for the desired entity (e.g., project 11.2GA) and respond, "The release date for project 11.2GA is Dec. 6, 2019."

Figure 21:
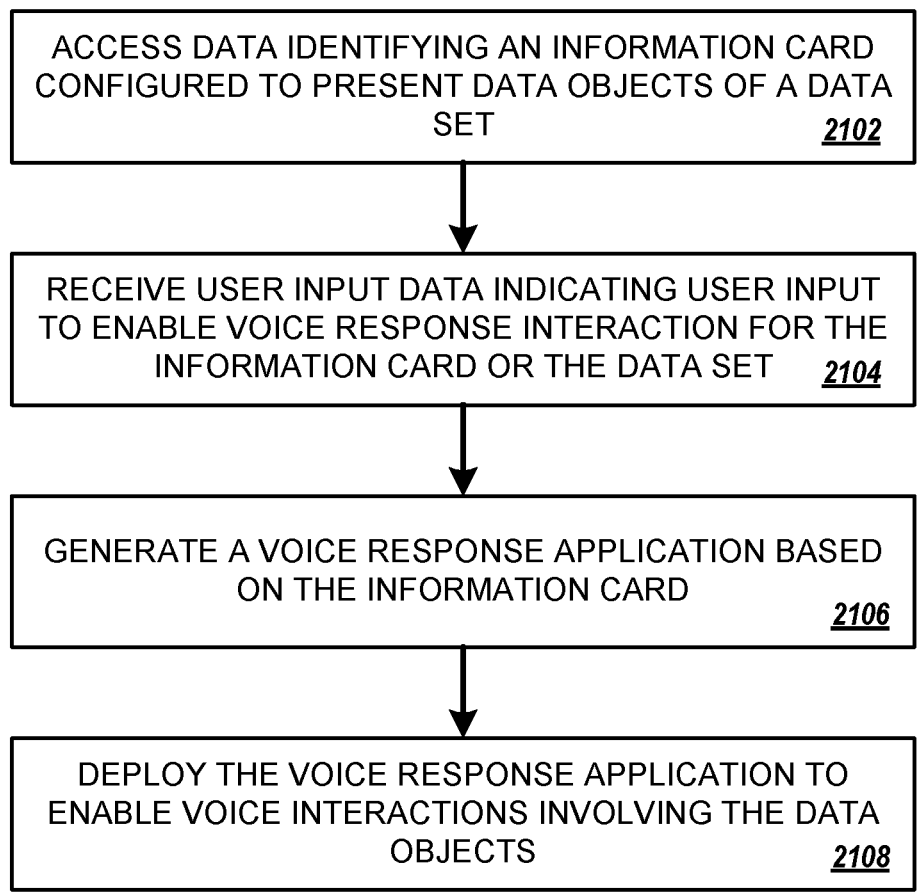
FIG. 21 is a flow diagram that illustrates an example of a process for enabling an interactive interface for analytics.

FIG. 21 is a flow diagram that illustrates an example of a process 2100 for enabling an interactive interface for analytics. The process 2100 can be performed by one or more computers, for example, a server, a client device, a workstation, or a combination thereof. For example, the process 2100 can be performed by the NLP server 120 of FIG. 1 or by the application generation engine 1840 (which can be part of a local server system, a remote server system, a cloud-based server system such as the assistant platform 1850, or another computer system). The functions of the process 2100 may optionally be shared by or distributed among multiple devices or systems.

The process 2100 includes accessing data identifying an information card configured to present data objects derived from a data set (2102). For example, a user can view a user interface on a client device that shows data sets and/or information cards. The user can select an information card or data set to view or load into the interface. As another example, a user may select an information card or data set from a list. When a data set is initially selected, the computer system may identify one or more information cards that rely on the data set and use those information cards to generate a voice response application. The data set can be, for example, a database, a data cube, a data table, a data repository, etc.

The data objects can be, for example, metrics, attributes, or other data elements. For example, the data objects can include one or more attributes included in the data set. An attribute may represent, for example, a column of a database table. The data objects may include one or more metrics, which can representing results of calculations using data in the data set. For example, a metric may have a corresponding equation or function that operates on one or more values (e.g., values for specific attributes) to obtain a value for the metric. Metrics may be stored in a data set or derived dynamically through calculation.

The information card can be an information card template for generating an information card for any of multiple entities of a particular entity type. The information card template can specify a set of data object types that are relevant to the particular entity type. For example, the information card template can specify a predetermined set of data objects from the data set for an entity type, where the data set includes multiple different entities of the entity type and the data objects can be populated with different values for the different entities. For example, an information card can represent an information card template for an "employee" entity type, and one of the data objects can be a phone number data object, so that different phone number values would be populated for the data object for different employees.

The information card can be a customized information card for an organization. Information card specification data for the information card can be customized by the organization. The information card specification data can identify a predetermined set of data objects relevant to an entity type. The information card specification data can also indicate a layout of regions of the information card that are configured to present the data objects (e.g., to present values for the data objects when a view of the information card is generated).

In some implementations, a computer system provides a user interface that includes controls enabling a user to design and/or edit the information card. The computer system can receive, through the user interface, data indicating user input selecting data objects to present in the information card. The interface can enable a user to make various customizations, such as to change which data sets are used to provide the data objects for the information card, to change which data objects are presented in the information card, to change text of the information card, to re-arrange the elements of the information card, to assign keywords to the data objects, and so on. The computer system can generate and/or updating specification data for the information card to include the selected data objects in the information card and make any other customizations indicated by a user. The voice response application can be generated based on the updated specification data for the information card to provide information for the selected data objects, e.g., data objects selected by one or more users to be included in the information card.

The process 2100 includes receiving user input data indicating user input to enable voice response interaction for the information card or the data set (2104). For example, a user may interact with (e.g., click, tap, select, etc.) a control in a user interface to indicate that the data objects presented in the information card or included in the data set should be made accessible through a voice assistant system. A user may provide user input through other means, such as a voice command, e.g., "import data set 2 into the voice assistant" or "enable voice access for the sales information card."

The process 2100 includes generating a voice response application based on the information card (2106). The voice response application can be configured to provide responses to voice queries using values for data objects.

The voice response application can be configured for integration with a third-party voice assistant platform. The data objects may correspond to data in a data repository of an organization that is independent from the third-party voice assistant platform. The voice response application enables a connection between the third-party voice assistant platform and the data repository of the organization to obtain values for the data objects from the data repository of the organization in response to voice inputs to the voice assistant platform.

The computer system can start with an application template or default data set for creating applications. The application template can define typical interactions to support, such as grammars or language patterns that can be updated or supplemented with data objects from the information card and/or data set. For example, sample forms of inputs and corresponding sample outputs can be stored and used for different purposes. One may be used for invoking the voice response application, another may correspond to asking about the value of a data object, another may represent comparing two data objects, and so on.

This can include automatically configuring the voice response application to answer voice requests that match one or more predetermined grammars or language patterns using predetermined response phrases having values for one or more data objects from the information card inserted in the response phrases. The computer system can identify data objects from the information card and associate the data objects with various input and response patterns (e.g., questions and answers) to enable a user to ask about and receive any of the data objects associated with the information card.

As part of generating the voice response application, the computer system can obtain or generate data regarding the data objects. For example, generating the voice response application can include storing, in association with the voice response application, configuration data identifying (i) data objects from the information card that the voice response application is configured to use in responding to voice requests, (ii) keywords corresponding to the respective data objects, and (iii) data repository information for obtaining values corresponding to the data objects. The configuration data enables a voice assistant to (i) identify the data objects referenced by instances of the keywords in voice input and (ii) retrieve values for the data objects from the data repository.

The configuration data enables a voice assistant to recognize instances of the keywords in voice input as corresponding to the voice response application, and the voice assistant is configured to invoice the voice response application based on detecting, in voice input to the voice assistant, one or more of the keywords corresponding to the data objects.

In some implementations, a computer system provides functionality for a user to specify or alter a set of phrases use as input to or as responses from a voice assistant. These changes can be included in the voice response application.

In some implementations, the computer system provides user interface data for a user interface having one or more controls to receive user input indicating (i) text of one or more requests for the voice response application to answer and (ii) text of one or more responses for the voice response application to provide. The voice response application is generated to respond to the one or more requests using the one or more responses, with values corresponding to the data objects used to complete the one or more responses. For example, sample responses or default responses can have fields or placeholders that correspond to data objects, and it retrieves the current value for the object when generating the response.

The process 2100 includes deploying the voice response application to enable one or more users to use the voice response application to initiate voice interactions involving the data objects (2108). In some implementations, deploying the voice response application includes storing the voice response application in cloud computing storage and enabling a voice assistant platform to access the voice response application. The stored voice response application, including any associated metadata or configuration data, may be accessed and used by the voice assistant platform to interpret voice inputs and generate responses. In some implementations, deploying the voice response application comprises assigning the voice response application to be used by a voice assistant for one or more users. For example, an access list can be defined to specify which user devices and/or users (e.g., user accounts or user identities) the voice response application is available to. In some cases, an interface can be provided for an administrator to designate users or credentials (e.g., certain levels of permission or authorization) that receive access to the voice response application. For example, the application can be registered to certain user accounts or credentials.

In some implementations, deploying the voice response application includes transmitting the voice response application to voice interface devices, e.g., client devices such as a smart speaker, phone, etc., over a network. The voice interface devices can store the voice response application and use it to process voice inputs.

In some implementations, user interface data is provided for a user interface having one or more controls to receive an invocation name for the voice response application. The voice response application can be configured to be activated in response to a user speaking the invocation name for the voice response application. The invocation name can be different from wake word or hotword used to activate the voice assistant or voice response interface. For example, the voice response application can be integrated with (e.g., used by) a voice assistant, and the invocation name is different from a command or term for invoking the voice assistant. The invocation name can be designated as a keyword to invoke the voice response application after a conversation of a user with the voice assistant has been initiated.

The computer system can provide user interface data for a user interface that displays the information card. The user interface can be interactive to enable a user to select portions of the displayed information card. In response to selection by a user of a portion of the displayed information card, the computer system can assign one or more data objects corresponding to the selected portion of the displayed information card to be included in future voice responses generated using the voice response application.

In some implementations, the information card corresponds to an entity type, the data set has a plurality of data objects for the entity type, and the information card is configured to present only a proper subset of the data objects for the entity type. The voice response application can be configured to provide responses using only the proper subset of the data objects that the information card is configured to present.

In some implementations, the information card corresponds to an entity type, the data set has a plurality of data objects for the entity type, and the information card is configured to present only a proper subset of the data objects for the entity type. The voice response application can be configured to provide responses using any of the plurality of data objects for the entity type.

Although examples shown in FIGS. 18, 19, 20A-20G, and 21 emphasize creation of an application for voice interactions, the same techniques can be used to create an application or module to provide non-voice interactions, such as through a messaging platform, a chat platform, etc. The custom application 1854 can be generated and configured to support an interface with text inputs and outputs, graphical inputs and outputs, voice inputs and outputs, or any combination thereof.

The application and/or the voice assistant can define various predetermined grammars or language patterns, both for interpreting inputs as well as generating outputs. For example, these may include voice inputs of "what is [data object keyword]" or "tell me about [data object keyword]." Examples of output formats include "the [data object keyword] is [data object value]." More complex formats can be defined as well, including those that call for operations that compare values of data objects or perform calculations of values of data objects.

Figure 22A:
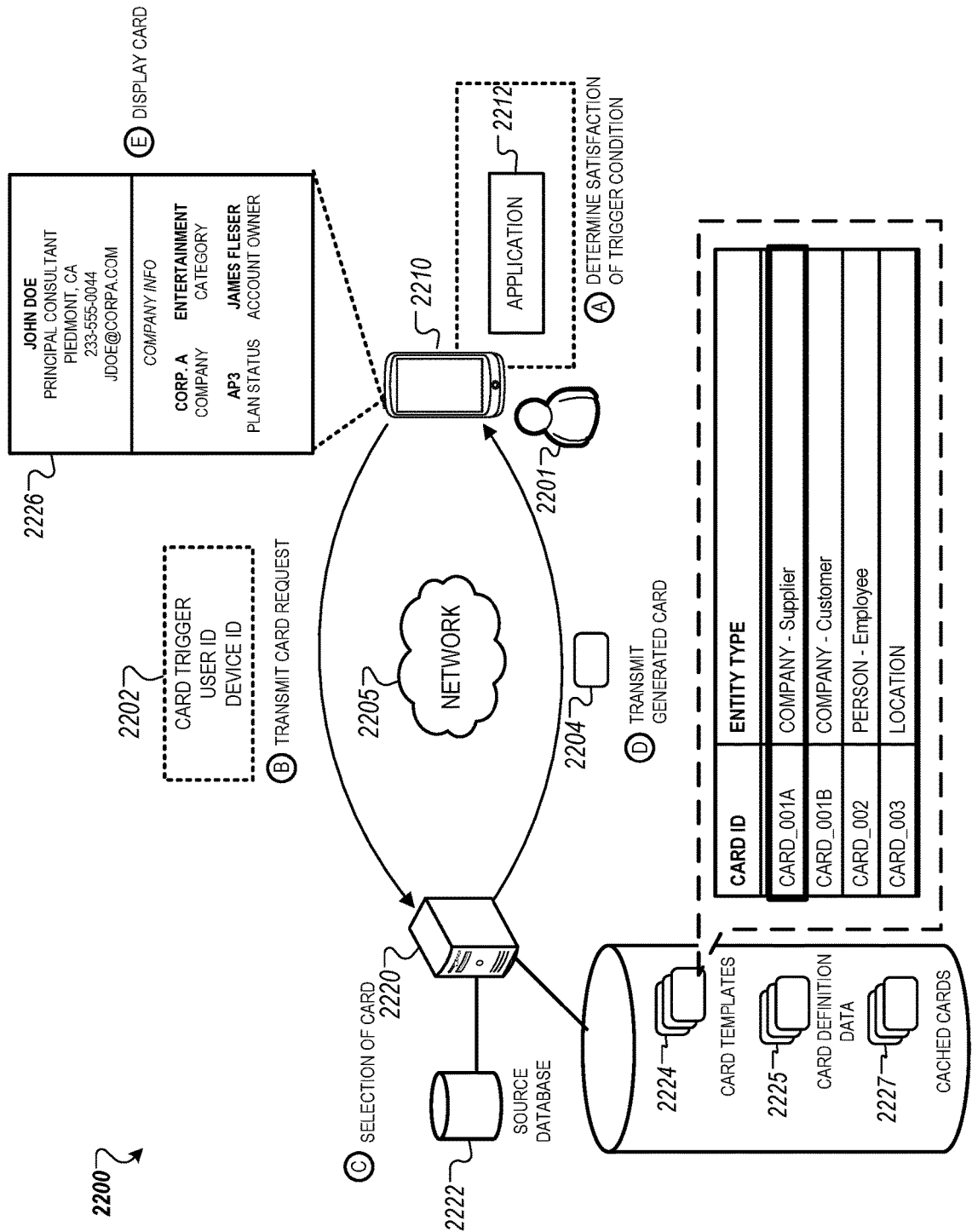
FIGS. 22A and 22B is a diagram showing an example of a system for generating and presenting customized information cards.

FIG. 22A illustrates an example of a system 2200 that is capable of generating and presenting customized information cards. The system 2200 includes a client device 2210, a server 2220, and a network 2205. The server 2220 has access to a source database 2222 for an organization. The server 2220 can be implemented using multiple computers that cooperate to perform the functions discussed below, and which may be located remotely from each other.

The client device 2210 includes an application 2212 that enables the client device 2210 to dynamically generate and display contextually-relevant information cards in response to certain actions being performed on the client device 2210 or certain conditions of the client device 2210 being detected. As discussed below, the application 2212 allows the client device 2210 to obtain and provide information from the source database 2222 through information cards that can be dynamically adjusted based on the actions or conditions detected on the client device 2210. In some implementations, the application 2212 runs in the background, out of view of the user, and monitors conditions of the client device 2210 on an ongoing basis. The application 2212 may interact with an operating system of the client device 2210, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 2210 is associated with a user 2201. When the application 2212 is installed, a user identifier for the user 2201 can be determined. For example, on installation or afterward, the user 2201 may log in using one or more credentials. The application 2212 may then customize various aspects of the system for the user 2201, including the trigger conditions used to detect an appropriate context for providing an information card as well as the type of content included in information cards.

In the example, the user 2201 is a member of an organization, e.g., an employee of a company. The source database 2222 represents database records stored by or for the organization. The records are not publicly available and are subject to data access restrictions, such as requirements that users be issued credentials from the organization that grant authorization to access the records. Different users may be granted different levels of authorization, and the server 2220 enforces access restrictions so that each user is only allowed to access the subsets of information the user is authorized to access.

The system 2200 improves techniques used to provide users with access to information in a more convenient and contextually relevant fashion. Information is presented through information cards that are displayed at specified points in time based on the satisfaction of context-based trigger conditions representing the relevance of specific topics or keywords to the activities of the client device 2210. In this manner, the system 2200 improves the relevance of information that is displayed to a user based on actions performed on the client device 2210 and ensures that the displayed information is likely to represent information that is of interest to the user, at the time information is of interest to the user. Unlike many other systems, the user 2201 does not need to manually submit a query or select from a list to obtain the information. Instead, the application 2212 initiates display of the information as it detects that the information corresponds to the current context of the client device 2210.

In FIG. 22A, information cards are presented on the client device 2210 as cards that include information obtained from the source database 2222. The cards can include dynamically generated information so that they reflect changes to data stored in the source database 2222. For example, the server 2220 can store card templates 2224 that identify, for example, the format and structure of the cards. The specific information that is displayed in the cards can be dynamically populated into the templates at the time the cards are determined to be relevant, so that each display of a card includes information generated from up-to-date information from the source database 2222. Thus, if the same card for the same entity is displayed at different times, the content may be different for each instance of the card as the information in the source database 2222 changes.

The card templates 2224 can include different templates for different types of entities. For example, one template may be used for a person, another template may be used for a company, another template may be used for a location (e.g., a particular store or region), and so on. Different card templates 2224 may also be defined and used for entities having different semantic relationships with the user 2201, the user's organization, or others. For example, a first template may be used for companies that are customers, and may specify a first set of statistical measures to display in a card. A second template for suppliers may specify a different set of statistical measures to display in a card.

The system can also store card-specific information in card definition data 2225 that specifies the parameters of individual cards. The card templates 2224 can each represent characteristics of cards for a particular type of entity or class of entities, and the card definition data 2225 can specify the particular card parameters for specific entities. Although cards for different entities of the same type may use the same card template 2224, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 2224), and so on. For example, a card definition for a company "Example Co." may specify that the "CARD_001A" template should be used, and that the specific set of keywords that trigger display of that company's card are "Example Co.," "Example," and "EC." The card definition data 2225 can include a card definition record for each information card made available in the system, indicating which entities and keywords to the card templates

2224. The card definition data 2225 can also be used to customize (e.g., alter or override) aspects of the card templates.

Briefly, in the example of FIG. 22A, the application 2212 on the client device 2210 detects a context-based condition, such as a keyword representing an entity having corresponding information in the database 2222. The application 2212 causes the client device 2210 to request an information card, and the server 2220 selects an appropriate information card, generates the information card, and sends data for the card back to the client device 2210 for display. The example is explained in further detail below with respect to various stages labelled (A) through (E).

In stage (A), the application 2212 monitors activity on the client device 2210 to detect satisfaction of a trigger condition that specifies display of an information card on the client device 2210. Trigger conditions can represent activity on the client device 2210 indicating that the user 2201 is likely to view or hear information.

The trigger conditions can be monitored passively without requiring the user 2201 to provide input on the client device 2210. For example, detection of an entity term in the text corresponding to an upcoming calendar appointment through a calendar application of the client device 2210 can represent satisfaction of a trigger condition indicating that a user is likely to view information associated with the entity. In this example, the client device 2210 monitors calendar data of the calendar application without the user 2201 actively requesting the information, which reduces the number of user inputs required to display contextually-relevant information (i.e., information for an entity that is a participant to the calendar appointment).

In another example, the trigger condition can represent a location of the client device 2210 being detected to be within threshold proximity (e.g., within 2200 meters) of a conference center that is associated with information cards. In this example, the application 2212 determines that the user 2201 is likely to view conference information based on the location of the client device 2210 and thereby determines that a trigger condition has been satisfied.

In some instances, the trigger conditions can represent action performed by the user on the client device 2210 that relates to a particular entity or topic. For example, detection of message that includes a term corresponding to an entity can represent satisfaction of a trigger condition related to displaying information of the entity. In some other examples, the trigger condition can represent a search query received for an entity term, or some action performed on the client device 2210 that indicates that the user 2201 is requesting information, e.g., performing a web search through a browser application, performing a search using capabilities of the operating system (e.g., for an application, a file, etc.), among others.

In stage (B), the client device 2210 transmits a card request 2202 to the server 2220. The card request 2202 can indicates the term(s) identified as corresponding to an entity, or an indication of the entity determined to be relevant to the current context. Accordingly, the card request 2202 may include monitored data collected at the client device 2210, such as data indicating the trigger condition that was determined to be satisfied by the application 2212. The card request 2202 can also include an identifier for the user 2201 and/or the client device 2210. The identifiers can be used to customize the information that is displayed on the client device 2210. For example, the organization managing the source database 2222 can specify different levels of access to the source database 2222 based on a user classification specified by a user or device identifier. In this manner, the system 2200 can generate and display different information cards for users in response to satisfaction of the same trigger condition.

In stage (C), upon receiving the card request 2202, the server 2220 accesses the source database 2222 and generates one or more information cards that are provided to the client device 2210 in response to the card request 2202. The server 2220 generates information cards that are relevant to entity terms corresponding to the trigger condition detected in stage (A). For example, the server 2220 can generate cards that include information for an entity that the client device 2210 identified in text in a user interface of the client device 2210, such as a calendar appointment, a text message, a search interface, etc., even though the text is found in a user interface of the operating system or an application different from the application 2212. In some situations, the reference to the entity has been detected by the client device 2210 in data that is not part of a user interface, such as the content of a notification, message, or record accessed by the client device 2210. In this example, the selected information cards can include information corresponding to the entity in the source database 2222.

The server 2220 can also perform various text processing techniques in selecting cards to provide for output to the client device 2210. For example, the server 2220 identify terms included in a text message received by the client device 2210 and determine if the text message includes keywords that are associated with information stored in the source database 2222, or are associated with a card definition from among the card definitions 2225. The server 2220 can compare terms in the text message with keywords associated with the source database 2222 to identify matching terms. When server 2220 identifies one or more matches with the keywords associated with the keywords indicated in the card definition data 2225, the server 2220 generates the appropriate card(s) from the card definitions. In some scenarios where keywords match the keywords of multiple cards, e.g., information cards for two employees with the same name, the server 2220 can provide all relevant cards, rank the cards based on applicability or affinity to the user 2201, or alternatively, request the user to provide additional information to determine the correct entity.

Generating an information card can include determining that a keyword matching a particular information card definition record has been found. The matching card definition in the card definition data 2225 can specify an entity identifier for a particular entity, a card template 2224 for generating the card, and locations of information about the particular entity in an appropriate data source. The server 2220 then generates the card using the layout and content types specified by the appropriate card template 2224, with values being populated from the data sources used to define the card. For example, the attributes and metrics specified for fields or regions of a card template 2224 can be populated with values for the particular entity as determined from the source database 2222. Of course, different card templates and even different individual cards may derive their information from different data sources and even from combinations of data sources.

Information cards can be generated on-demand, in response to card requests as noted above. In addition, or as an alternative information cards can be generated (e.g., by populating entity-specific information into the card templates 2224) predictively, in advance of requests for the cards, and then cached. The cached cards can be refreshed periodically, e.g., after a certain time has elapsed or if the underlying data affecting the content of a card has changed. As a result, cached cards 2227 can be made available with very low latency.

In stage (D), the server 2220 transmits an information card 2204 for presentation on the client device 2210. In stage (E), upon receiving the information card 2204 from the server 2220, the client device 2210 presents the information card 2204 for display on a user interface 2226. The information card 2204 can be presented in or with the current user interface of the client device 2210, which may be outside the application 2212. For example, the information card 2204 may be provided through the operating system (OS) functionality of the client device 2210 outside of the application 2212, e.g., as an OS notification. In general, the information card 2204 may be displayed in, alongside, or on (e.g., as an overlay to) the application or interface that has the term(s) that triggered the presentation of the information card 2204, such as the current interface of the client device 2210, whether the current application or interface is one for messaging, search, calendar management, and so on, or even a lock screen or home screen showing general system notifications. In some instances, the information card 2204 can be presented through the application 2212, e.g., as an application message, or a data object presented on a user interface of the application 2212. The information card 2204 can also be displayed in different formats, such as an image, an interactive control configured to initiate display of the information, e.g., a button that displays the information in response to receiving a user input.

In the example depicted in FIG. 22A, the application 2212 detects an upcoming calendar event for an upcoming meeting with an employee of the entity "Corporation A." The application 2212 determines that a calendar event trigger condition has been satisfied based on processing calendar data of the client device 2210 and determining that text corresponding to the calendar event references the entity. The server 2220 receives the card request 2202 from the client device 2210 and selects a card template and specifies the generation of an information card 2204 for a supplier "JOHN DOE" identified in the calendar appointment. The server 2220 obtains information associated with "JOHN DOE" from the source database 2222 in order to populate a card template with information about the particular entity that is relevant to the user 2201.

As shown in FIG. 22A, the information card 2204 displayed on the user interface 2226 includes information for "JOHN DOE," an employee of company that is a supplier for the company of the user 2201. The server 2220 selects information for this employee from the source database 2222 since the calendar appointment detected by the application 2212 identifies "JOHN DOE" in the text of the calendar appointment. In this example, the system 2200 therefore processes calendar data to determine that the user 2201 has an upcoming meeting with "JOHN DOE" and would benefit from receiving employee information prior to or during the meeting.

In some implementations, the system 2200 can be configured to deliver information cards to the client device 2210 based on processing activity or usage data collected on the client device 2210 and determine times when an information card is to be relevant to actions being performed on the client device 2210, such as the user writing an email, the user viewing a calendar appointment, or other scenarios where the user accesses data corresponding to entity-specific information. For example, the server 2220 can collect usage data collected by the operating system of the client device 2210 that indicates application usage times, time periods of frequent device usage, types of applications or webpages being accessed by the user, among other types of usage metrics. The server 2220 can use pattern recognition techniques to process the usage data to predict points in time when certain information cards are likely to correspond to terms that are being accessed during actions being performed on the client device 2210. As an example, if the usage data indicates that the user frequently reads articles between 28 AM and 29 AM every morning that reference certain business entities, then the server 2220 can provide information cards that include information on stocks for the business entities to the user during that time frame. The server 2220 can also adjust the content included in the information cards over time so that only information for entities that are often referenced in the articles read by the user are included in the information cards that are provided to the client device 2210.

Additionally, the application 2212 can configure the client device 2210 to display data representing the information cards in a non-obtrusive manner. For example, the application 2212 can provide an operating system notification on the client device 2210 once the client device 2210 has received an information card from the server 2220 instead of redirecting the client device 2210 to the information card and potentially disrupting the present activity being performed by the user. In some instances, information cards that are received by the client device 2210 over a certain time period can be accumulated by the application 2212. A reminder can then be sent to the client device 2210 at a specified point in time that allows the user to access all accumulated information cards. For example, a reminder can be displayed on the client device 2210 every morning, when then allows the user to view information cards received on the preceding day.

In some implementations, the system is capable of outputting information cards or data associated with information cards while a user accesses various applications running on the client device 2210. In such implementations, the application 2212 can run as a background process and monitor user activity on other applications to detect the satisfaction of trigger conditions. For example, if a user highlights or selects text that is displayed through a web browser application on the client device 2210, the application 2212 can detect that a trigger condition has been satisfied and the highlighted or selected text can be used as entity terms to identify and output information cards corresponding to the highlighted or selected text. In some instances, the user can be provided with a notification that indicates that relevant information cards are available for the highlighted or selected text, and upon selection, the user can be directed to the application 2212 to access the information cards.

Figure 22B:
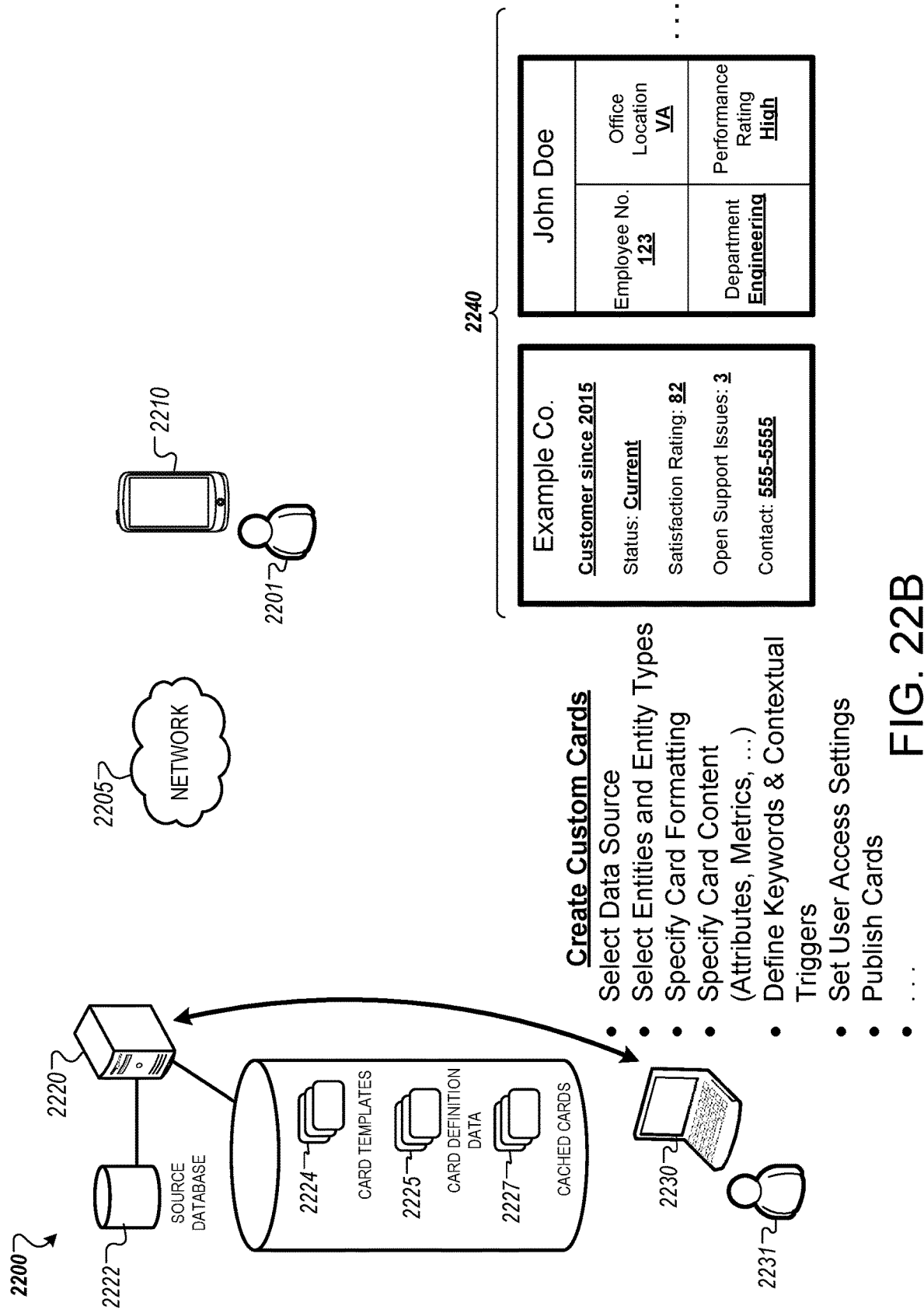

FIG. 22B shows that the system 2200 enables an administrator user 2231 to create and manage information cards using an administrator client device 2230. The client device 2230 interacts with the server 2220 to provide user interfaces for the administrator 2231 to design, manage and publish information cards for an enterprise or other organization. The administrator 2231 can access a card creation user interface using the client device 2230. The user interface can be provided by a webpage, a web application, a native application running on the client device 2230, or other software.

From the user interface, the administrator 2231 can create custom cards and specify both the content and behavior of the cards. For example, the administrator 2231 may select a data source, which may be a specific data set or combination of data sets. From the information in the selected data source, the administrator 2231 can specify entities and entity types for which cards should be created. The user interface can present indications of entities referenced in the data source, e.g., people, places, companies, and other entities. The administrator 2231 can select a specific entity or an entity type to create a card for that entity or entity type.

The user interface includes controls that allow the administrator 2231 to specify the layout and formatting for the card. This can include selecting a template that has regions or fields where data source elements can be inserted. To specify the content of the card, the administrator 2231 can select attributes, metrics, or other information derived from the data set to insert into the regions or fields of the card being generated. For example, if the administrator 2231 has selected a particular company as the entity for the card, the user interface can present a list of data elements that are available based on the content of the data set. For example, if the user has selected a particular company as the entity for the card, the user interface can present a list of data elements that are available based on the content of the data set, e.g., a location for the company, a number of employees of the company, revenue of the company, and industry for the company, and so on. These data elements may be specified directly in the data set, as a field or value of the data set, or may be derived from the data set using functions, equations, or other processing.

In some implementations, the user interface also shows related data that can be brought in from other data sources and incorporated into the card. For example, information about a company from an organization's internal database can be made available for inclusion, as well as suggestions of elements from other data sets that reference the same company. The server 2220 can also find documents, such as reports and dashboards, that refer to the same entity as the card. The user interface can allow the user to include in the card hyperlinks or other controls to access these documents, so that users can quickly call up the information from an instance of the card.

In general, information cards can include a variety of interactive elements, including buttons, hyperlinks, sliders or filters, and so on that may enable a user to take an action, within the interface of the card or outside. For example, controls in a card may be selected to open documents, applications, or modules, or to initiate communication by starting a call or sending a message.

The user interface enables the administrator 2231 to specify aspects of the behavior of the card being created. This includes setting keywords that, when present in the context of user's device, trigger presentation of the card. These keywords can include a name for the entity described by the card, nicknames and variations (such as abbreviations, acronyms, miss-spellings and so on), terms related to the content of the card, terms frequently used with references to the entity and other documents or in queries, etc. The server 2220 may recommend keywords based on text that is associated with the entity in the data set used to generate the card.

The user interface enables the administrator 2231 to specify contextual factors that can trigger presentation of interface enables the administrator 2231 to set presentation of the card. These can include locations, times, the presents of devices or users nearby, and so on.

The user interface enables the administrator 2231 to specify which users, applications, or other functionality can obtain the cards. For example, the administrator 2231 can designate individual users or groups of users to receive the information card. In this case, only users so designated will be presented the card. As another example, the user interface can allow the administrator 2231 to designate all users with a particular role or credential as recipients for the card. In a similar manner, the administrator 2231 may specify that the card may be presented in a web browser through an extension, or through a mobile device in certain settings, such as in search results, on the messaging platform, based on calendar data, in response to detected locations, etc.

Once the card and its desired behavior are specified, the server 2220 saves records of the cards, for example as card definition data 2225 and/or card templates 2224. The user interface enables the administrator to publish the cards, making them available to different users and devices.

Information cards and the data that defines them can be used for various purposes in addition to or instead of showing visual card presentations. For example, the elements defined for an information card can be used to generate audible, synthesized-speech outputs through a voice interface. For example, responses to voice queries from a user can be derived from the data in information cards. Similarly, the content of information cards can be used to identify common words and phrases for understanding users' voice requests as well as generating answers to those voice requests. As another example, the information from the information cards can be used in the process of generating customized natural language conversational agents (e.g., chat bots). Information about these techniques is provided in greater detail in U.S. Patent Application No. 272/802,047, and those techniques can be integrated in whole or in part with any or all of the techniques discussed herein.

The example of FIG. 22B shows examples of cards 2240 that have been generated for different entities, a company "Example Co." and a person "John Doe." The information elements are linked to a respective data source, such as a data set or portion of the source database 2222, so that changes in the values stored in the data source are propagated through to the different presentations of the cards 2240, so that the presented cards reflect current information from the linked data source.

In some implementations, the server 2220 can represent multiple servers that cooperate to generate and provide information cards. For example, completed cards can be published to a representational state transfer (REST) server. This server can make additions, get attributes, filter by attributes, generate HTML, and perform other functions. After being processed by the REST server, card data, reports, and underlying data sets (e.g., data cubes) can be cached in an intelligence server, which has the metadata for all of the cards that have been published. Later, when client devices retrieve cards, the intelligence server can provide a cached copy. In addition, client devices can predictively fetch and cache cards, based on prior usage patterns and/or analysis of a user's current tasks or data. These steps can significantly reduce the latency of the system in being able to detect the applicability of a card and present the card to a user.

Figure 23:
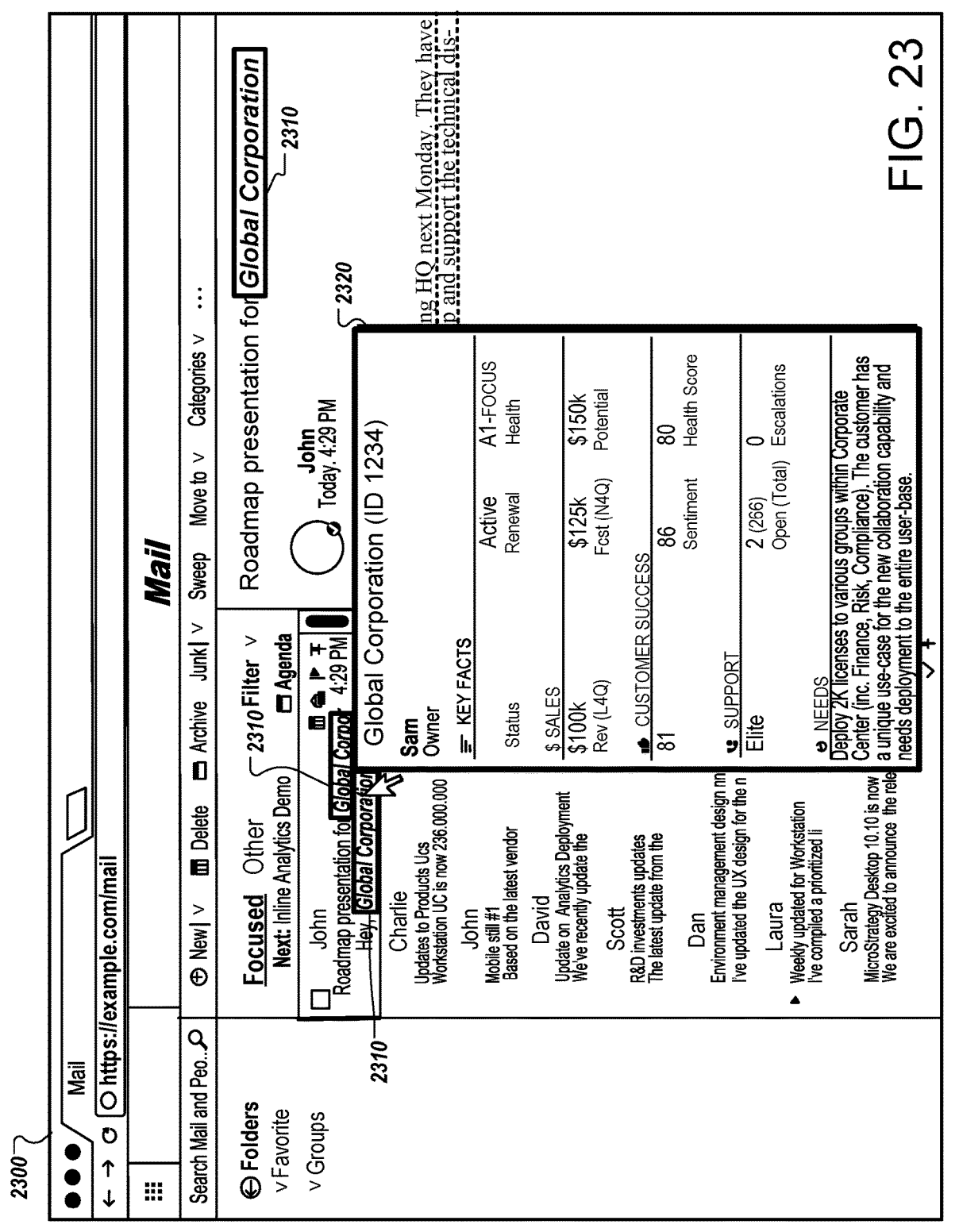

FIG. 23 is a diagram illustrating an example of a user interface 2300 showing an information card provided in response to user interaction. In the example, the user interface 2300 is one that may be provided by a client device. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 23, after navigating to the web page shown in the user interface 2400, the system has determined that the phrase "Global Corporation" is matches an entry in a list of key phrases. In response, the client device annotates each instance 2410 of this term in the user interface 2300, shown here by bold and italic formatting and a box around the term. Other types of annotations can be additionally or alternatively used. Each instance of the key term is also made interactive.

When the user interacts with an instance 2310 of the key term, the client device generates and provides an information card 2320 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 24 seconds, 22 second, 0.5 seconds, etc.).

In some implementations, a browser extension or other software agent on a client device cooperates with a server system to allow detection of appropriate contexts to make information cards available. As an example, first, a browser extension makes a REST API request to obtain the list of topic elements (e.g., keywords or other context identifiers) for one or more data sources. These can be obtained by the server from card metadata, such as identifying attributes specified by card templates 2224 and extracting values for the attributes from the underlying data set(s) used to generate cards. The topic elements can also be specified in other card definition data 2225, in metadata repositories, caches, and so on. Second, the browser extension caches the set of received topic elements. Third, the browser extension monitors content of browsed pages to determine if content of the page matches any of the cached topic elements. When a match is found, the browser extension highlights the matching term and makes the element interactive. Fourth, the browser extension receives data indicating user interaction with the highlighted term, such as a hover over the highlighted term. Fifth, the browser extension makes a REST API call to get the data corresponding to the highlighted element from the source data set for the appropriate card matching the highlighted term. The server provides content, such as HTML data, that provides the content for the card.

Fifth, the extension renders and displays the card based on the received data. Many variations are possible, however, including the pre-loading of card content on the client in response to finding topic elements in a page, before a user interacts with the highlighted term.

Figure 24:
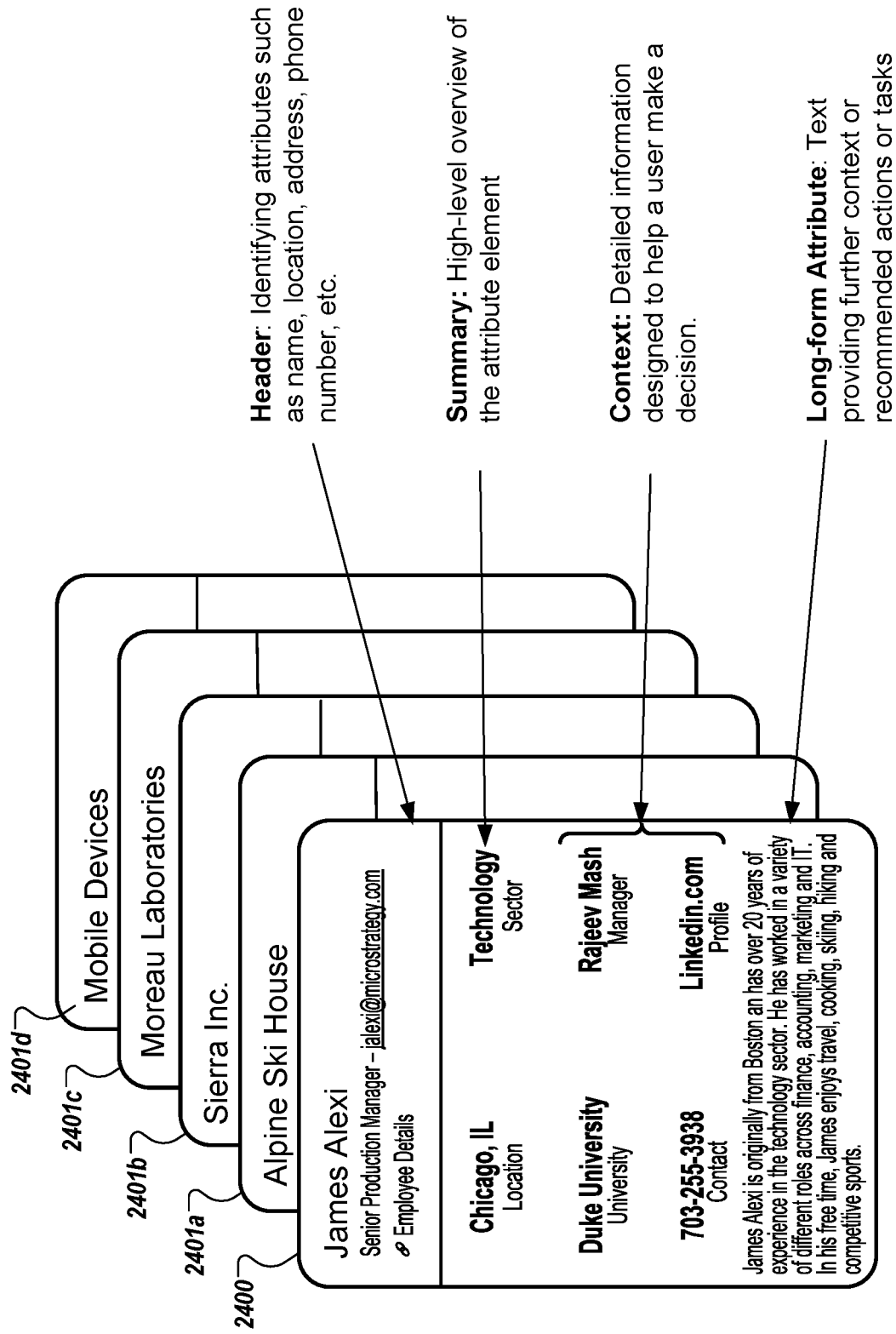
FIG. 24 is a diagram illustrating an example of an information card.

FIG. 24 shows an additional example of an information card 2400. The content and style of information cards can vary from one organization to another, from one entity type to another entity type, and for different entities. Other information cards 2401a-2301d can be defined in a similar manner.

As illustrated, the card 2400 can include a header, which can include identifying attributes such as a name, a location, and address, phone number, and so on. The header may also include interactive elements such as a link to a web page for the entity, a link to initiate sending a message, a control to access one or more documents or database records corresponding to the entity, and so on In some implementations, the main body of the information card includes various indicators, such as values for attributes and metrics, text, visualizations, or other elements derived from one or more data sets. As noted above, these values may be derived from private data sets, but are not limited to information from private data sets. The indicators may include summary elements, as well as context information. In some cases, at least some of the attributes provided as indicators are tailored to the needs of a specific task or role. For example, a card for presentation to a customer service agent may include information to help the agent quickly identify outstanding issues and initiate communication to address them. Information cards may include text, such as a long-form attribute that includes notes, recommended actions, tasks, and other information.

Cards may be defined in terms of attributes or other data elements in an analytics platform. One card can be defined for an entity type or object type, using the attributes of that entity type or object type. For example, in the card shown in FIG. 24, the card for an employee can specify a location attribute, a sector attribute, university attribute, a manager attribute, a contact phone number attribute, and a profile link attribute. After this entity type card has been defined, each time an instance of an employee identifier is found, e.g., in on screen content, and metadata, or in other device context, the entity type card can be used to generate a card for the applicable employee, by populating values for the attributes from one or more data sources.

Figure 25:
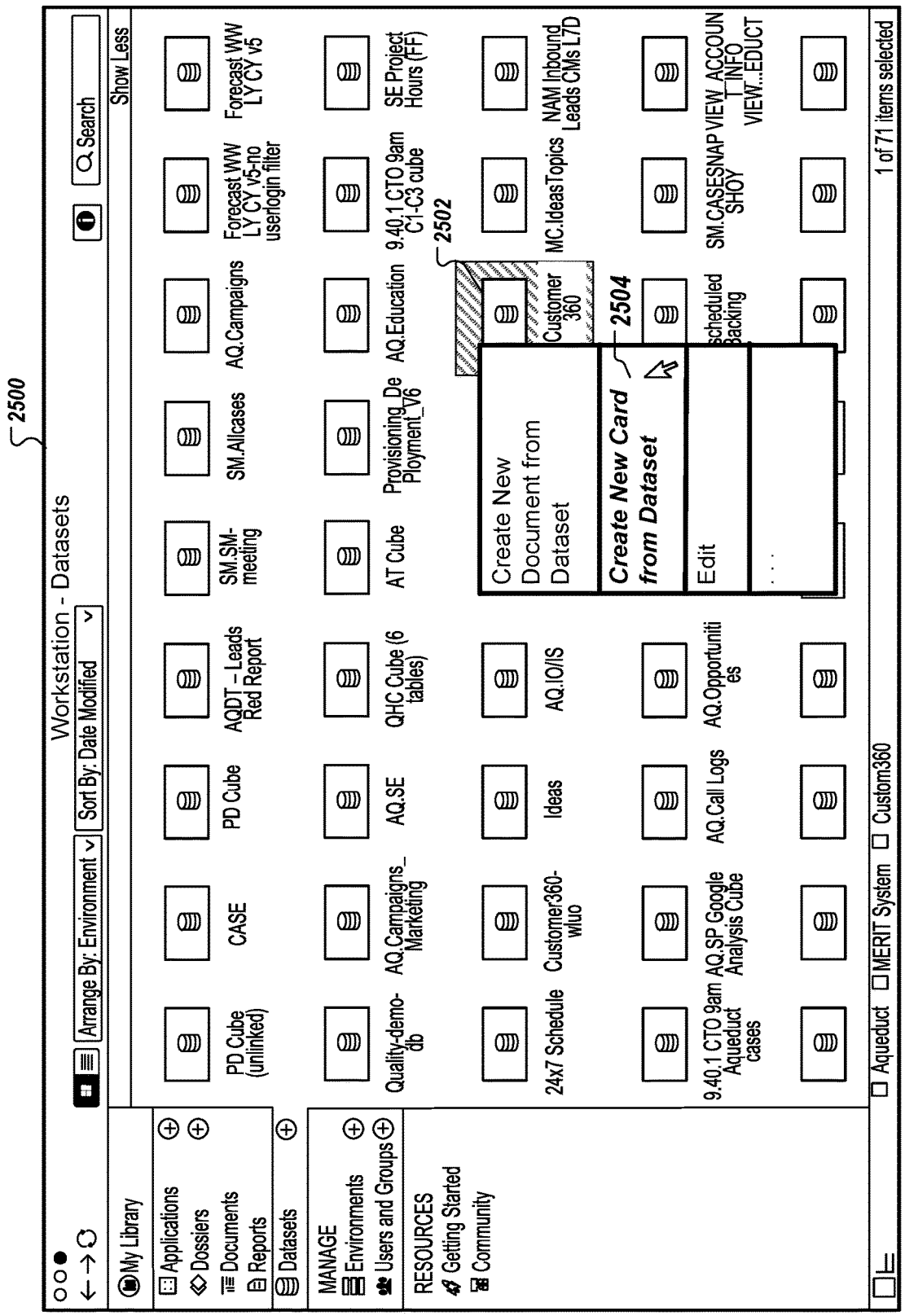
FIGS. 25-27 are diagrams showing user interfaces for creating and managing information cards.

FIG. 25 shows a user interface 2500 of a client device, such as client device 2230 from FIG. 22B, which can be used to initiate the creation of a new card from a data set. The user interface 2500 shows various data sets that are available in an analytics platform.

The process of creating an information card can include a user importing, identifying, selecting, or otherwise accessing a dataset. This can be done through any interface or gateway of an analytics platform. As an example, a user may create or access a data cube (e.g., an online analytical processing cube) or other data set. The user can select the data set and interact with control to begin creating an information card from the cube. In some cases, this can be as simple as a "right-click" or hover over an icon representing the data set, and selecting an option for creating a card, such as an item "create a card" or "publish to extensions" from a context menu that appears. The indication that a card should be made can cause the system to provide a card creation user interface that shows properties of the data set, such as a list of attributes, metrics, entities, or other elements referenced in the data set.

In the example of FIG. 25, a user selects one of the data sets, for example by right-clicking on an icon 2502 for the data set, and in response the system shows a context menu with various options. One of those options is item 2504, an option to create a new card from the data set. Selecting this option causes the system to provide the user interface shown in FIG. 26.

Figure 26:
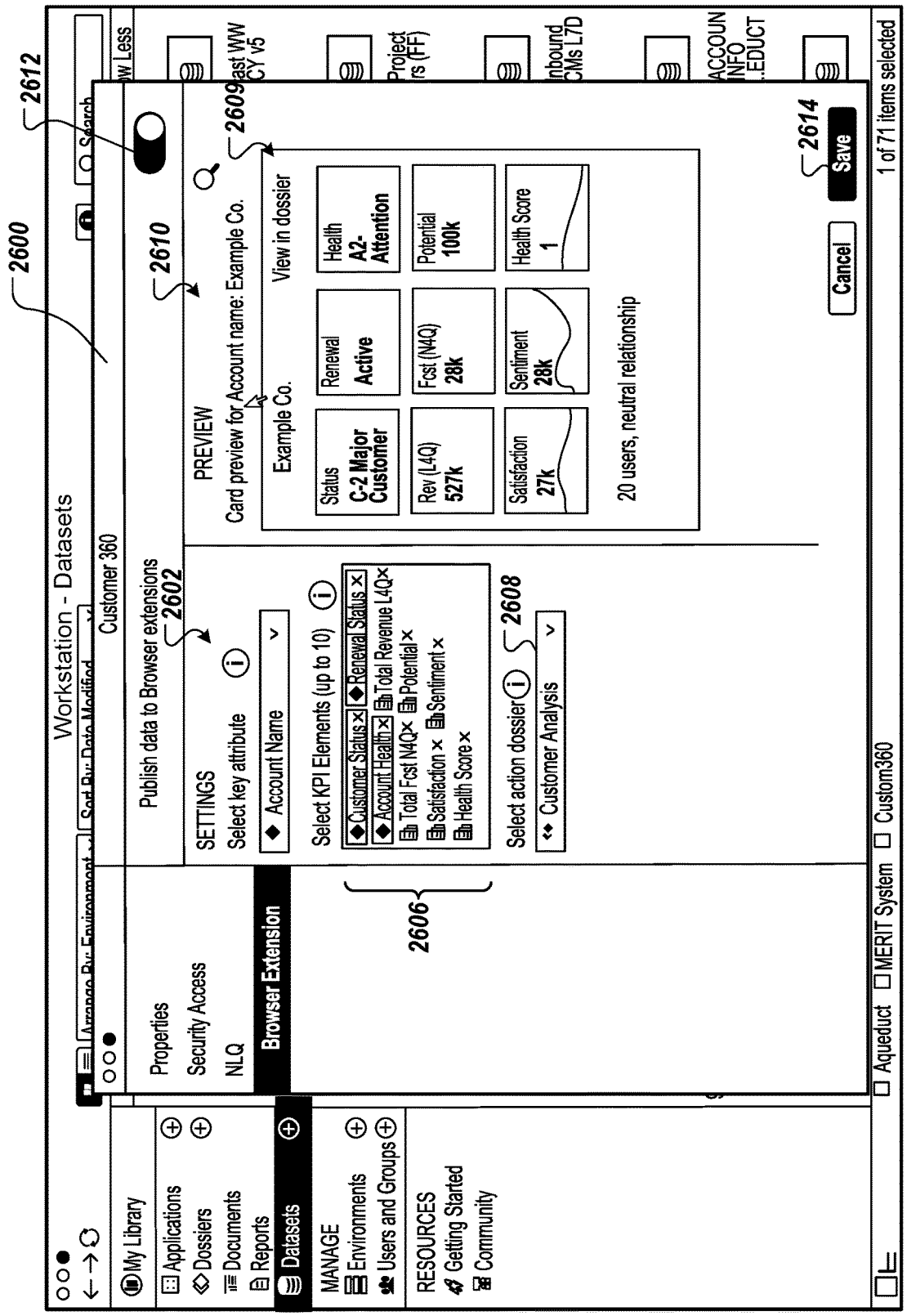

FIG. 26 shows a card creation interface 2600 that allows the user to define the content and characteristics of a card. The card creation user interface 2600 can include a settings pane 2602 showing elements of the data set, as well as a preview pane 2610 that previews how the card will look and can be manipulated to place and organize elements to be displayed in the card.

The user interface 2600 displays data elements from the data set that can be used to define the card. These are shown in a settings pane 2602. One of the data elements can be designated as a key attribute, for example, by selection from a list using a drop-down menu 2602. The key attribute can specify the main entity type for object type that the card will represent. In the example, a key attribute of "account name" is selected, and as a result, the card being generated will be used to create individual cards for different accounts. As another example, selection of "employee name" as the key attribute could be used to generate a card for different employees in the data set. The key attribute may be used to define elements of the card's header, such as the name or title of the card, and one or more initial keywords for triggering presentation of the card.

Once the key attribute is selected, the system populates a set of data elements 2606, e.g., attributes and metrics shown as "KPI elements," that are related to the selected key attribute in the data set. These data elements 2606 can represent the types of data available in the data set for the objects of the type indicated by the key attribute. Each data element 2606 may represent, for example, a column from a data cube or table. Data elements 2606 may also represent the results of applying different functions or aggregations to a data set, e.g., computing a mean, maximum, minimum, or other measure based on the data set that the user selected in FIG. 25. The user can select from these data elements 2606 to add them to the card. For example, the user may drag and drop the data elements 2606 onto locations on a preview pane 2610. As another example, the user may simply select desired data elements 2606, in the system may arrange them.

The settings pane 2602 includes a control 2608 that enables a user to select a document to link to the card. The selected document can be indicated in the card, with a hyperlink or other control 2609 that user can select to initiate opening of the selected document.

On the right hand side of the user interface 2600, the preview pane 2610 shows an example card presentation based on the current selections and settings from the user. Although the card format being defined will be used for each of the different accounts in the data set, the preview pane here shows and example card populated for a specific account, the account of "Example Co." This allows the user to see the effects of changes and selections in real time as parameters of the card are adjusted. As shown in the example, each individual indicator can include a value for an attribute as well as a label or attribute name. For example, the indicator in the upper left corner includes the attribute label "status" and a value "C2—Major Customer." In some cases, other information is provided in addition to or instead of indicator values in text or numeric form. For example, indicators may be represented with colors, icons, animations, images, charts, graphs, and so on. In FIG. 26, the indicators in the bottom row each have a line that indicates how the attributes have changed over a period of time. This effectively includes a graph in the indicator area to show a progression over a period of time (e.g., one month, three months, 22 year, etc.) as well as including the current value for the indicator.

The user interface 2600 or another user interface can include controls to allow or restrict access to the generated card. For example, a control 2612 can set whether to automatically publish the new card to user devices through browser extensions. Similar controls can be included for making cards available through other functionality, such as location-based presentation, e-mail applications, calendar applications, search functionality, messaging platforms, and so on. In addition, user interface controls can be provided to allow the user to specify specific users or user groups that can receive the current card type or, more generally, cards based on the current data set.

After the card is completed, the user can select a control 2614 to save the card. From the selections on the interface 2600, the system will save the card information to allow multiple cards that can be presented—not just a single card for the "Example Co." account, but a displayable card element for each unique value in the data set for the "Account Name" key attribute. As a result, if there are 230 accounts in the data set, saving the card format can allow the defined type of card to be displayed for any and all of the 230 different accounts. Of course, additional interfaces can be provided if desired to customize or adjust individual cards in addition to or instead of adjusting cards as a group.

To facilitate card generation, the system can make available standardized templates that a user can select to apply predetermined combinations of layout and formatting attributes. For example, a template may provide a three-by-three grid of containers, each configured to provide a metric or attribute, so the user can add 9 different data elements. The template can also include other elements such as a header region, a footer region, a title, etc. which can also be populated and customized. Of course, the interface can include controls allowing a user to set or adjust layout and formatting as well. The interface can enable a user to select elements of the data set and assign positions for the selected data elements to be displayed. For example, the interface can enable a user to drag data set elements (e.g., attributes, metrics, etc.) and drop the elements into specific fields or containers of a card template. Doing so can create links between the card and specific portions or elements of the data set, which can be used in an ongoing manner to refresh the content of the card from the current values in the data set.

When adding an element from the data set, the system can automatically configure properties of the card based on the characteristics of the data set. For example, when a user drags an attribute from a data set to a region of the card template, the system can identify a data type for the attribute value (e.g., text, integer, unit of time, dollar amount, geographical location, etc.) and apply formatting for that data type. The system can also look up a human-readable name or explanation for the attribute type, e.g., determining and adding to the card a "Number of Employees:" descriptor for the attribute value if the attribute represents a number of employees. In addition, the system can identify a record or portion of the data set representing that attribute. If the card being generated is for a specific company and the attribute is number of employees, for example, the system can identify and store, in card definition data, a field or set of records used to determine the value of the attribute from the data set for that specific company. In general, the card generation process creates mappings between elements of the card (e.g., portions of the card, or fields of a card template) with portions of the data set.

In some implementations, each information card can be created individually. For example, the process of creating cards can be done for each individual entity, e.g., a first card is created for "Company 22" with a first, custom subset of attributes and metrics included in the card; a second card is created for "Company 23," with second, different custom subset of attributes included in the card; and so on.

In some implementations, cards can be generated in groups or batches, for example, linked to a master card definition or card template that specifies card content types and not only general formatting and layout. This can speed the process of creating cards and can increase efficiency. For example, the system may create one generic entity type card for object type "employee." This entity type card can be used to provide card presentations for all objects of the "employee" type, with the card presentation for a specific employee having card content and metadata (e.g., keywords for triggering) populated from the attribute values for the specific employee.

As an example, the interface can enable a user to create a card representing an entity type (e.g., a supplier company, a customer company, an employee, a person, etc.), and provide indications of the data elements available for entities of that entity type. Once the template or generic entity type card for the entity type is specified by the user, the system can use it to create cards for any entity of the entity type that is in the data set. This can enable many cards to be created quickly, and with uniformity in the content of the cards (e.g., with the same or similar subsets of attributes and metrics for entities of the same type). The system may derive, from the template or generic entity type card, a specific card definition for each entity of the entity type. The individually-defined cards can then be separately customized and edited further, since even for entities of the same type different individual entities may have differing types of information that is most relevant. This can include creating separate card definitions for each entity's card, and specifying in those cards the links to the data set needed to populate each card with the corresponding entity's data. In some implementations, a user may create a card for a single instance of an entity type, and then select to apply the characteristics of that card to other instances of the same entity type. For example, a user may create a card for a first company, then extend the card definition (e.g., the selection of attributes and metrics, the organization and formatting, etc.) to all other companies described in the data set, thus creating a card of the same type for each of the companies. In other implementations, a template or generic entity type card can be stored and can be used repeatedly to dynamically create cards for entities of a particular type, without storing separate individual card definitions for individual entities.

The information cards can include embedded rules or conditions that may vary the content or presentation of the cards based on different conditions. For example, the inclusion of certain content or the formatting of content can be conditional. Thresholds can be set for an attribute or metric, and if the value meets predetermined criteria (e.g., inside or outside of a certain range), that attribute may be highlighted or otherwise emphasized. Rules or conditions defined for a card can also be used to personalize the card for different types of end users. For example, the rules may specify that one attribute is shown for users in one department and a different attribute is shown instead for users in a second department.

The system may use machine learning to automatically generate cards or to suggest content for cards. In some cases, the system can predictively suggest cards to be generated and content for the cards (e.g., subsets of attributes and metrics that are most commonly used). For example, the system can access usage data indicating, for example, rates of co-occurrence of different terms in documents of an organization, query histories from users of the organization, counts of interactions with different elements of documents, time spent viewing or interacting with different documents, and so on. From this usage data, the system may infer which entities referenced in a data set are most significant as well as which attributes and metrics are most often used with those entities or entities of the same types. The system can then recommend the creation of cards for the identified entities, and can recommend that the most commonly used attributes and metrics be presented in the cards. As users view cards and interact with the cards, the system can record further usage information that the system can use to alter the content of cards and to provide better recommendations in the future.

As noted above, each card can be designed with one or more key terms (e.g., words, phrases, numbers, data points, patterns, etc. referred to generally as "keywords" herein) specified for the card, so that the occurrence of the one or more keywords can trigger the presentation of the card. Users may manually enter these keywords, select them from values taken from the data set linked to the card, or enter them in other ways. In some implementations, the keywords are values corresponding to attributes associated with a card. The system may suggest keywords to the user for inclusion as well, based on characteristics of the data set and other cards. The card creation user interface can provide information about an attribute of an entity as well as synonyms. For example, a user may define a card for a person, and specify that the card title (e.g., a primary key) is the person's name (e.g., a "name" attribute from the data set). This selection can also cause the system to import other attributes as keywords to trigger presentation, such as an "initials" attribute in the data set, a "nickname" attribute, and others, and link these attributes with the same card. The values of all of these attributes can be set as keywords that can be used to trigger presentation of the card. In some cases, the related attributes may be taken from a data set different from the data cube or other data set that a user selects as the basis for the card. For example, the system can use an entity identifier from the data cube or even as manually specified by the user creating the card to retrieve other information from a different data source, which can be added to the user interface and used to define the card.

The keywords for a card may or may not appear visibly in the card. For example, the name of an entity may appear in the card, and the name may be a keyword for the card. In addition, any of the other values in the card may also be potentially used as keywords for the card, automatically or through manual selection of the card's creator. As a result, keywords are not required to match only to the name or primary attribute for a card. As an example, a card for a person may include the name of a company the person works for as an attribute derived from a data source and displayed in the card. Similarly, the occurrence of a keyword that triggers display of the card may or may not include display of the keyword on a display of a client device. In many instances, at least some keywords that can trigger presentation of a card are not displayed in the card and instead are stored in metadata.

In some implementations, cards are designed with specified conditions for presentation instead of, in addition to, and/or in combination with keywords. For example, each card can have metadata, such as hidden fields or associated parameters that are not visually displayed in the card but are stored and evaluated by the system. This metadata can specify contextual attributes that specify when a card should be displayed or otherwise made available. These contextual attributes can include locations, times, the presence of certain devices or users (or devices or users of certain types or classifications), the occurrence of an event related to an entity, an attribute or metric for the entity meeting particular thresholds or having a particular status (whether the attribute or metric is shown in the card or not), and so on. With these contextual attributes defined, a card can be automatically presented or made available when, for example, a user's device is near any person from a specific department, when the user's device is near a specific person, or when the user's device is in a specific geographical area or in a specific type of geographical area (e.g., within a retail store). There can be multiple different contexts or conditions that each separately trigger displaying of a card, and each context may be defined in terms of multiple contextual attributes (e.g., time, location, conditions or thresholds for data about the organization being met, etc.).

These contextual triggers defined for cards can be especially helpful for use with mobile devices. Some attributes or contextual factors may be focused specifically on use cases for mobile devices. As an example, a card may have embedded metadata of location (e.g., a GPS coordinate or other location data) so that the mobile device receiving the card knows the location corresponding to the card. The mobile device then can move from place to place, and if the mobile device detects that it is within a particular range of the specified location can surface the card for the location.

A mobile device can periodically refresh the set of cards it stores based on its current location, so that the mobile device had available the set of cards applicable for nearby locations. In some cases, the system or a user defines a radius of interest (e.g., a 220-mile radius). When an application on the mobile device is opened, the mobile device will download and cache various points of interest cards. The mobile device compares its location to the locations for the cards, and when it detects sufficient proximity to one of the locations, the mobile device presents the corresponding card. As an alternative, a mobile device can send data indicating its location to a server, which can then determine that the mobile device is near the location corresponding to one of the cards and send the card to the mobile device for presentation.

When a user creates a card, the card is linked to the data source(s) that the user selected, such as a specific data cube. As a result of this linkage, data security and access control for the underlying data source(s) flow through to the content of the card. Access restrictions are enforced for each user, each card, and each time the card is displayed. By applying identity-based or object-level security policies, if a user is not authorized to access data for any of the different information elements within the card, the system will generate the card to show a dash, a blank area, or other indication that the data is not available. This allows for control of security at a fine-grained level.

In some implementations, different cards may be created for different user roles or different groups of users. For example, for a given company, a different card or card template may be used to generate cards shown to users in an engineering department than have different content (e.g., show different attributes and metrics) than cards shown to users in the finance department. When multiple cards are available, the different cards can be targeted to different users based on, for example, a user's role, interests, user profile, usage history, and so on.

Cards that are created can be published to allow access to specific users and sets of users. For example, the system may provide an interface that identifies users and available cards, and that allows an administrator to manually add or remove users from an access list. This can be done for individual users and with respect to individual cards or at a higher level of aggregation. For example, the system may group cards by entity type (e.g., supplier company, customer company, location, etc.), by author, by data source, by keyword or subject matter, by types of metrics and attributes included, and so on. Similarly, the system may group users by user type, role, location, access privileges or credential type, department in an organization, similarity in usage patterns, and so on. The interface to the system may indicate one or more of these different aggregations of cards and users, and can provide controls that allow an administrator to select a card or group of cards to be made available for a group of users. The system can also certify card content (e.g., with certificates, signatures, etc.) to indicate the information is trusted, and can verify the certification on presentation to ensure that only legitimate content appropriate for the user is provided by the system.

Figure 27:
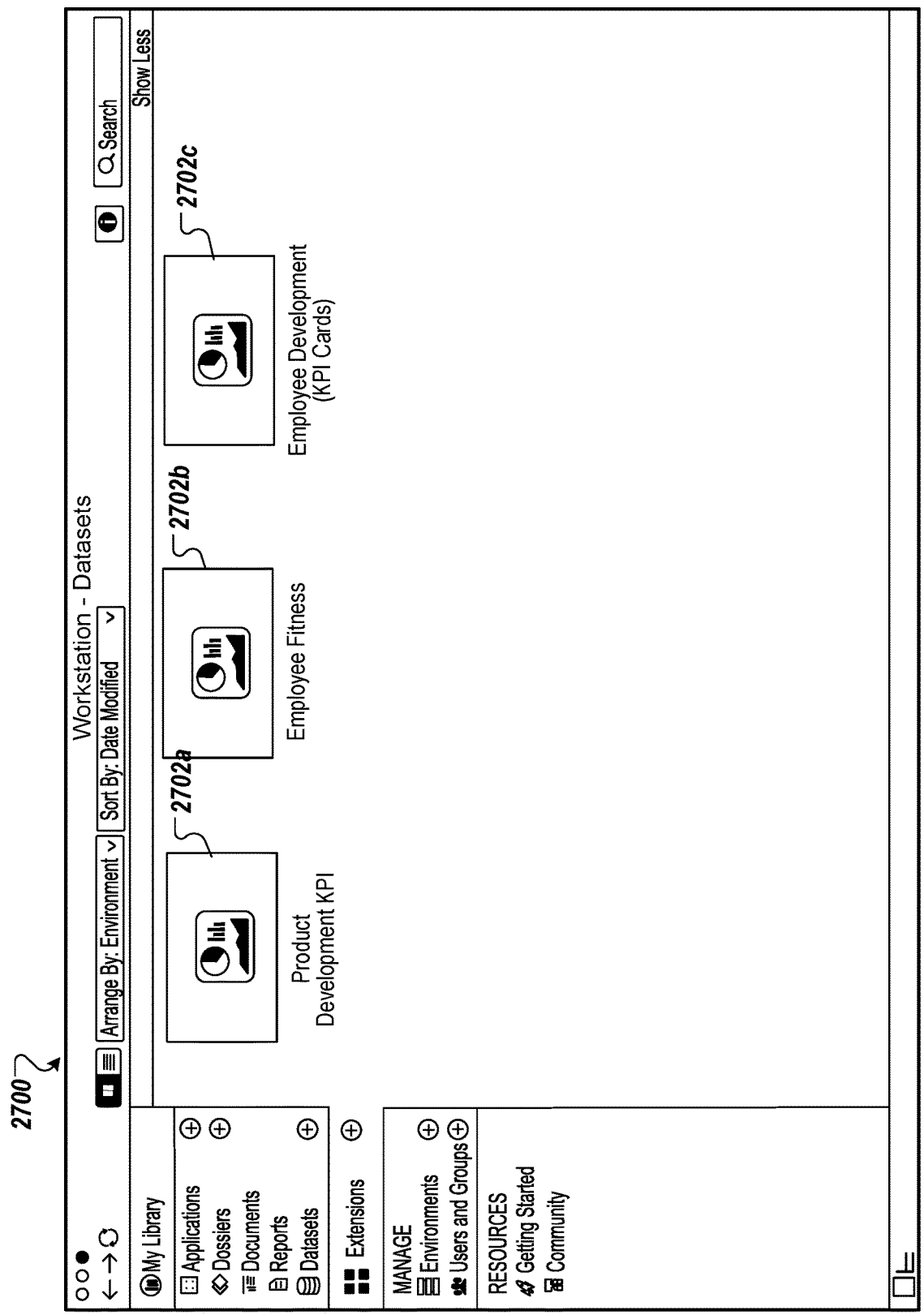

FIG. 27 shows a user interface 2700 that the system can provide to allow management of created cards. The user interface 2700 can provide a central interface to author and manage all embedded and extended content. The interface 2700 shows objects 2702a-2702c, each of which represent a card or collection of cards. From this interface 2700, the user can drag and drop cards to different computing environments to make them available on different servers and to different sets of users. The user interface can also allow the user to set access control restrictions, assign cards to specific users or user groups, adjust the keywords or contextual factors for presentation of cards, and adjust other parameters of the cards. In addition, the interface 2700 may include controls that adjust how the cards 2702a-2702c are managed by the server and client devices, such as to specific whether and to what extent a card or its underlying data set should be cached at the server or client devices, a frequency that cached data should be refreshed, and so on.

Figure 28A:
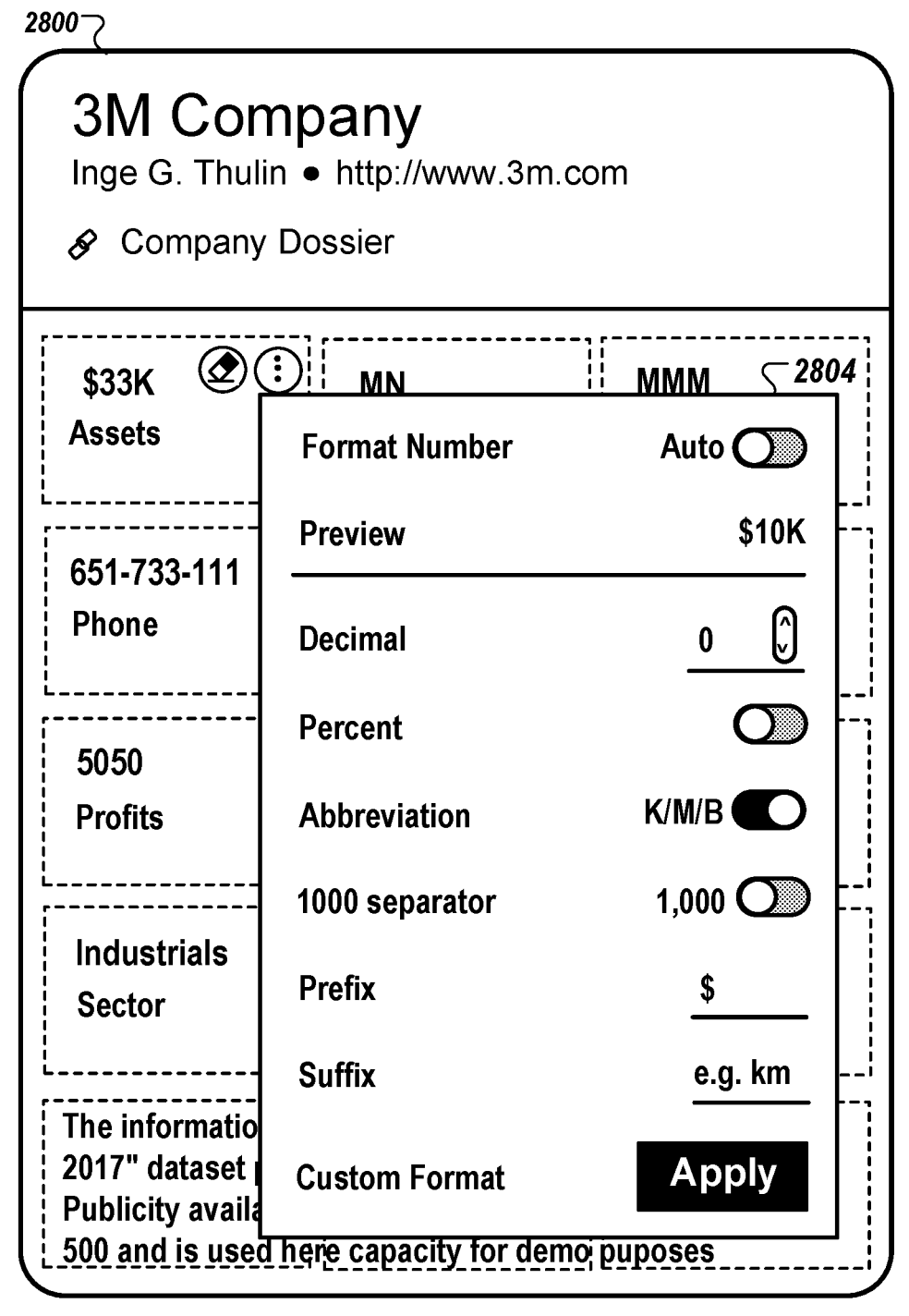

FIG. 28A shows an example of a card 2800 being generated or edited. The card includes several regions for the placement of indicators (e.g., attributes, metrics, etc.), with the various regions being designated with dashed lines. A first region 2802 represents an "Assets" element, and a user has selected a control in the region 2802 to edit the formatting or display properties. This interaction caused an overlay panel 2804 to be displayed, with various controls for adjusting how the data values for the attribute will be displayed. Options include setting the number of digits, including abbreviations, punctuation, a prefix, a suffix, and so on. The content of the overlay panel for an indicator can vary based on the data type of an attribute value as well as metadata from the data set from which the attribute is derived. In addition to the adjustments shown on the panel 2804, the contents of the different regions 2802 can altered, for example, the indicator specified can be deleted, replaced with a different indicator, can be expanded or restricted to cover a different time range, and so on.

FIG. 28B shows another example of a card 2810 being generated or edited. The interface shows a panel 2812 that allows an interactive control, such as a hyperlink, to be added and edited, to provide access to other content within or outside the analytics platform.

Figure 29:
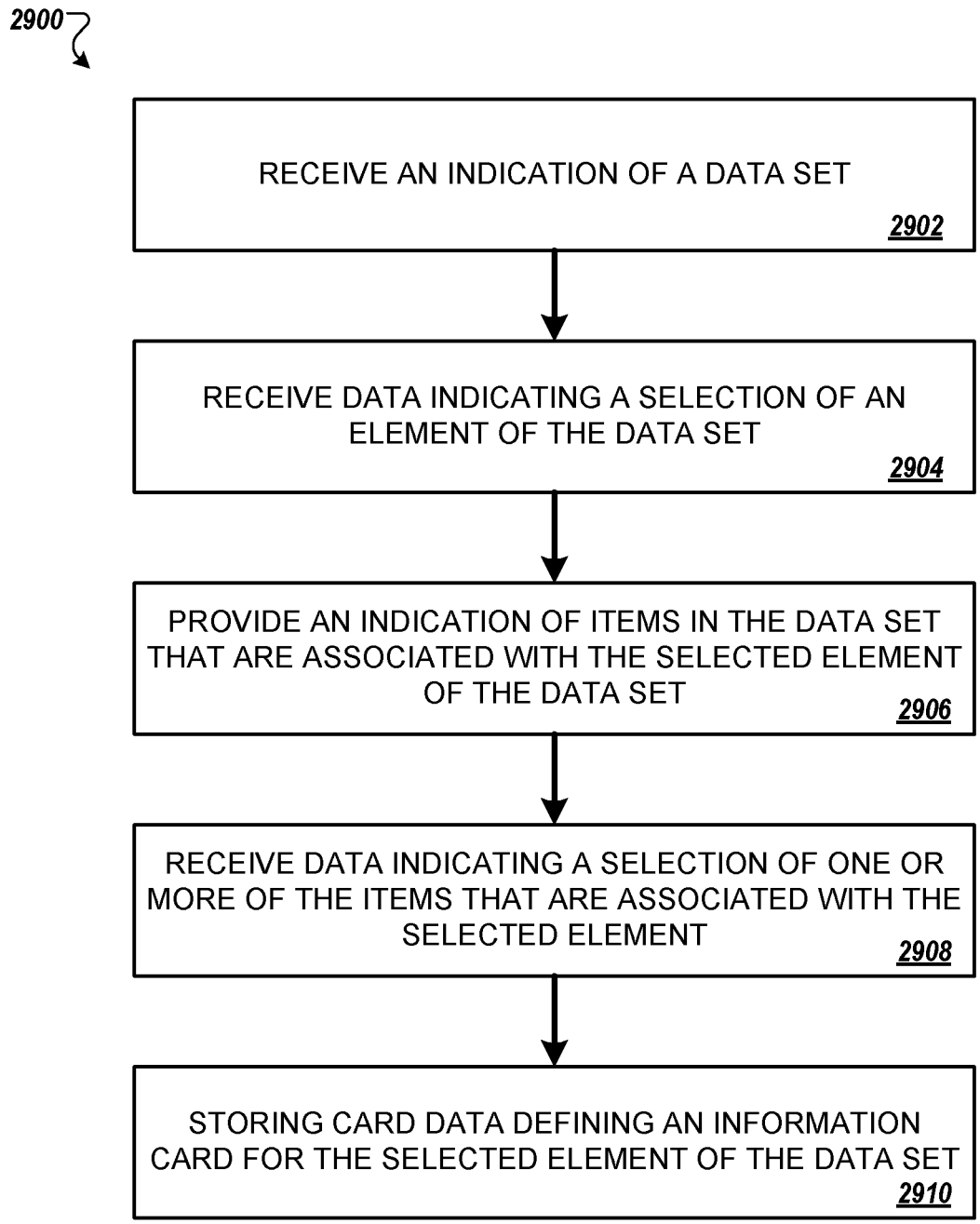
FIG. 29 is a flow diagram that illustrates an example of a method for generating and presenting information cards.

FIG. 29 is a flow diagram that illustrates an example of a method 2900 for generating and presenting information cards. The method 2900 can be performed by one or more computers, for example, the server 2220 discussed above.

The one or more computers receive an indication of a data set (2902). For example, the indication of a data set can be a selection of the data set by a user. A user may select a data set or file using a user interface. The data set can be a data cube, a database, or a collection one or more data files.

The one or more computers receive data indicating a selection of an element of the data set (2904). For example, an element of the data set can be selected, for example, an entity such as a person, place, company, product, device, etc. In some implementations, the selection of the element is made by a user. In some implementations, the selection of the element is made by a machine learning module.

The one or more computers provide an indication of items in the data set that are associated with the selected element of the data set (2906). For example, the items can be attributes or metrics of the data set. An attribute can refer to an entity, concept, or object, such as a product, employee, month, and so on. Attributes can be data fields or descriptive entries or values for a subject. For a person, an attribute could be, for example, a name, address, phone number, education level, user name, job title, etc. In some cases, an attribute can refer to a static value in data field or a label. A metric can be a measure or key performance indicator. For a company, examples include revenue, profit, employee headcount, and probability of purchase. From a practical perspective, metrics are the calculations performed on data stored in a data set, the results of which are displayed or used in other ways. Accordingly, a metric can refer to a calculated value or the result of evaluating expression that is based at least in part on records in the data set.

The one or more computers receive data indicating a selection of one or more of the items that are associated with the selected element of the data set (2908). In some implementations, the selection of the one or more items is made by a user. In some implementations, the selection of the one or more items is made by a machine learning module. The machine learning module can be one that has been trained to identify data items that are most commonly used (e.g., requested, viewed, copied, shared, etc.) by a set of users, such as users in a group, department, organization, or geographical area. Based on access logs and/or other usage records showing how portions of the data set and/or other data sets have been used, the machine learning model can be trained to identify the data items with the strongest affinity to a data element. Given characteristics of a data element, such as an element type (e.g., person, location, device, etc.) and other characteristics of the data element, the trained machine learning model can provide output indicating a relative importance of various data item types, and the items given the highest importance scores can be selected for inclusion in the information card. In some implementations, selections by the machine learning model can be presented on a user interface and then confirmed or altered by a user.

The one or more computers store card data defining an information card for the selected element of the data set (2910). The card data can indicate (i) data indicating the selected one or more items (e.g., attributes or metrics), and (ii) a reference to the data set. The card data can be card definition data that specifies the content of an information card to be displayed for an entity, such as an entity represented by the element of the data set. The card data can specify the type of content, e.g., the types of measures or indicators to be included in the information card when it is generated. The reference to the data set is configured such that generating the information card based on the card data causes values for the selected one or more items to be derived from the data set and included for presentation in the information card. The reference to the data set can be configured so that a device generating or presenting an information card based on the card data can refer to the data set and obtain current information to populate the card, e.g., by retrieving or calculating up-to-date values based on the current contents of the data set at the time the information card is presented. For example, the reference can be a link, file name, universal resource indicator (URI), etc. The card data can include presentation data indicating a layout or formatting for the selected one or more of items. The card data can include an indication of a user or group of users authorized to receive the information card.

The card data can also indicate triggers and/or conditions that may cause the information card to be displayed. For example, the card data can indicate a first element of the data set designated for triggering display of the information card. The one or more computers can later obtain data indicating a term corresponding to a context of a device, determine that the term matches at least one value for the first element of the data set, and in response to determining that the term matches at least one value for the first element of the data set, provide the information card for display by the device.

In some implementations, the selection of an element of the data set includes a selection of a particular attribute in the data set, wherein the data set includes multiple different values for the particular attribute. The card data enables generation of an information card instance for each of the different values for the particular attribute, the information card instances respectively having the selected one or more items populated with values corresponding to the different values for the particular attribute.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

The invention claimed is:

1. A method performed by one or more computers, the method comprising:
   accessing, by the one or more computers, data identifying an information card configured to present data objects of a data set;
   receiving, by the one or more computers, user input data indicating a user selection that instructs voice response interaction to be enabled for the information card or the data set;
   in response to receiving the user input data indicating the user selection that instructs voice response interaction to be enabled for the information card or the data set, generating, by the one or more computers, a voice response application based on the information card, the voice response application being configured to provide responses to voice queries using values for the data objects that the information card is configured to present, wherein generating the voice response application comprises storing, in association with the voice response application, configuration data identifying (i) data objects from the information card that the voice response application is configured to use in responding to voice requests, (ii) keywords corresponding to the respective data objects, and (iii) data repository information for obtaining values corresponding to the data objects, and wherein the configuration data enables a voice assistant to (i) identify the data objects referenced by instances of the keywords in voice input and (ii) retrieve values for the data objects from the data repository; and deploying, by the one or more computers, the voice response application to enable one or more users to use the voice response application to initiate voice interactions involving the data objects.

2. The method of claim 1, wherein the information card is an information card template for generating an information card for any of multiple entities of a particular entity type, wherein the information card template specifies a set of data object types that are relevant to the particular entity type.

3. The method of claim 1, wherein the information card is a customized information card for an organization; and wherein the method comprises accessing information card specification data customized by the organization, wherein the information card specification data identifies a predetermined set of data objects relevant to an entity type and indicates a layout of regions of the information card configured to present the data objects.

4. The method of claim 1, comprising:

providing a user interface comprising controls to design and/or edit the information card;

receiving, through the user interface, data indicating user input selecting data objects to present in the information card; and generating and/or updating specification data for the information card to include the selected data objects in the information card;

wherein the voice response application is generated based on the updated specification data for the information card to provide information for the selected data objects.

5. The method of claim 1, comprising:

providing user interface data for a user interface having one or more controls to receive an invocation name for the voice response application; and configuring the voice response application to be activated in response to a user speaking the invocation name for the voice response application.

6. The method of claim 5, wherein the voice response application is integrated into a voice assistant, the invocation name being different from a command or term for invoking the voice assistant, the invocation name being designated as a keyword to invoke the voice response application after a conversation of a user with the voice assistant has been initiated.

7. The method of claim 1, comprising:

providing user interface data for a user interface having one or more controls to receive user input indicating (i) text of one or more requests for the voice response application to answer and (ii) text of one or more responses for the voice response application to provide;

wherein the voice response application is generated to respond to the one or more requests using the one or more responses, with values corresponding to the data objects used to complete the one or more responses.

8. The method of claim 1, wherein generating the voice response application comprises automatically configuring the voice response application to answer voice requests that match one or more predetermined grammars or language patterns using predetermined response phrases having values for one or more data objects from the information card inserted in the response phrases.

9. The method of claim 1, wherein the configuration data enables a voice assistant to recognize instances of the keywords in voice input as corresponding to the voice response application, and the voice assistant is configured to invoice the voice response application based on detecting, in voice input to the voice assistant, one or more of the keywords corresponding to the data objects.

10. The method of claim 1, wherein the voice response application is configured for integration with a third-party voice assistant platform, wherein the data objects correspond to data in a data repository of an organization that is independent from the third-party voice assistant platform; and wherein the voice response application enables a connection between the third-party voice assistant platform and the data repository of the organization to obtain values for the data objects from the data repository of the organization in response to voice inputs to the voice assistant platform.

11. The method of claim 1, wherein the data set is a data cube, a data table, a database, or a data repository.

12. The method of claim 1, comprising providing user interface data for a user interface that displays the information card, the user interface being interactive to enable a user to select portions of the displayed information card;

in response to selection by a user of a portion of the displayed information card, assigning one or more data objects corresponding to the selected portion of the displayed information card to be included in future voice responses generated using the voice response application.

13. The method of claim 1, wherein the information card corresponds to an entity type, wherein the data set has a plurality of data objects for the entity type, and wherein the information card is configured to present only a proper subset of the data objects for the entity type; and wherein the voice response application is configured to provide responses using only the proper subset of the data objects that the information card is configured to present.

14. The method of claim 1, wherein the information card corresponds to an entity type, wherein the data set has a plurality of data objects for the entity type, and wherein the information card is configured to present only a proper subset of the data objects for the entity type; and wherein the voice response application is configured to provide responses using any of the plurality of data objects for the entity type.

15. The method of claim 1, wherein deploying the voice response application comprises storing the voice response application in cloud computing storage and enabling a voice assistant platform to access the voice response application.

16. The method of claim 1, wherein deploying the voice response application comprises assigning the voice response application to be used by a voice assistant for one or more users.

17. The method of claim 1, wherein the data objects comprise at least one of:
one or more attributes included in the data set; or
one or more metrics representing results of calculations using data in the data set.

18. A system comprising:
one or more computers; and
one or more computer-readable media storing instructions that, when executed by the one or more computers, cause the one or more computers to perform operations comprising:
accessing, by the one or more computers, data identifying an information card configured to present data objects of a data set;
receiving, by the one or more computers, user input data indicating a user selection that instructs voice response interaction to be enabled for the information card or the data set;
in response to receiving the user input data indicating the user selection that instructs voice response interaction to be enabled for the information card or the data set, generating, by the one or more computers, a voice response application based on the information card, the voice response application being configured to provide responses to voice queries using values for the data objects that the information card is configured to present,
wherein generating the voice response application comprises storing, in association with the voice response application, configuration data identifying (i) data objects from the information card that the voice response application is configured to use in responding to voice requests, (ii) keywords corresponding to the respective data objects, and (iii) data repository information for obtaining values corresponding to the data objects, and
wherein the configuration data enables a voice assistant to (i) identify the data objects referenced by instances of the keywords in voice input and (ii) retrieve values for the data objects from the data repository; and
deploying, by the one or more computers, the voice response application to enable one or more users to use the voice response application to initiate voice interactions involving the data objects.

19. One or more non-transitory computer-readable media storing instructions that, when executed by one or more computers, cause the one or more computers to perform operations comprising:
accessing, by the one or more computers, data identifying an information card configured to present data objects of a data set;
receiving, by the one or more computers, user input data indicating a user selection that instructs voice response interaction to be enabled for the information card or the data set;
in response to receiving the user input data indicating the user selection that instructs voice response interaction to be enabled for the information card or the data set, generating, by the one or more computers, a voice response application based on the information card, the voice response application being configured to provide responses to voice queries using values for the data objects that the information card is configured to present,
wherein generating the voice response application comprises storing, in association with the voice response application, configuration data identifying (i) data objects from the information card that the voice response application is configured to use in responding to voice requests, (ii) keywords corresponding to the respective data objects, and (iii) data repository information for obtaining values corresponding to the data objects, and
wherein the configuration data enables a voice assistant to (i) identify the data objects referenced by instances of the keywords in voice input and (ii) retrieve values for the data objects from the data repository; and
deploying, by the one or more computers, the voice response application to enable one or more users to use the voice response application to initiate voice interactions involving the data objects.

* * * * *